United States Patent [19]

Lewis, Jr. et al.

[11] Patent Number: 6,026,172

[45] Date of Patent: Feb. 15, 2000

[54] SYSTEM AND METHOD FOR ZOOM LENS CALIBRATION AND METHOD USING SAME

[76] Inventors: Clarence A. Lewis, Jr., P.O. Box 410, Dublin, N.H. 03444; Richard D. Lewis, 105 Kendall Pond Rd., Windham, N.H. 03087

[21] Appl. No.: 08/924,595

[22] Filed: Sep. 4, 1997

Related U.S. Application Data

[60] Provisional application No. 60/025,592, Sep. 6, 1996.

[51] Int. Cl.[7] .......................................................... G06K 9/00
[52] U.S. Cl. .................. 382/106; 250/559.01; 250/559.2; 356/3
[58] Field of Search ..................................... 382/106, 112, 382/255; 250/201.2, 559.01, 559.04, 559.2; 359/379, 380; 356/3, 429; 396/85, 104

[56] References Cited

U.S. PATENT DOCUMENTS

| | | |
|---|---|---|
| 2,802,666 | 8/1957 | Crosfield . |
| 3,264,983 | 8/1966 | Lewis, et al. . |
| 3,958,509 | 5/1976 | Murray et al. . |
| 3,986,007 | 10/1976 | Ruoff, Jr. . |
| 3,988,535 | 10/1976 | Hickman et al. . |
| 4,136,950 | 1/1979 | Labrum et al. . |
| 4,146,907 | 3/1979 | Jessen et al. . |
| 4,160,263 | 7/1979 | Christy et al. . |
| 4,208,675 | 6/1980 | Bajon et al. . |
| 4,232,336 | 11/1980 | Henry . |
| 4,233,625 | 11/1980 | Altman . |
| 4,253,111 | 2/1981 | Funk et al. . |
| 4,301,470 | 11/1981 | Patany . |
| 4,322,802 | 3/1982 | Lewis et al. . |
| 4,389,669 | 6/1983 | Epstein et al. . |
| 4,482,972 | 11/1984 | Lewis et al. . |
| 4,567,506 | 1/1986 | Shinodea et al. . |
| 4,736,680 | 4/1988 | Wales et al. . |
| 4,794,453 | 12/1988 | Gnuechtel et al. . |
| 4,887,530 | 12/1989 | Sainio et al. . |
| 4,932,320 | 6/1990 | Brunetti et al. . |

*Primary Examiner*—Matthew C. Bella
*Attorney, Agent, or Firm*—Kevin Mark Klughart

[57] ABSTRACT

Using marks of known dimensions and size, and spacing, a zoom lens may be calibrated in either or both the X and Y spatial directions. A system comprising an image capture device, positioning means, position encoder means, operator interface, and processing unit permits this method to be advantageously applied to a wide variety of web inspection/control functions, including but not limited to initial web registration, multiple color ink registration, lateral web positioning, repeat length calculations, image capture synchronization, thermal/mechanical differential compensation, and accurate registration of objects within an image to other objects within an image or to a mechanical reference on a machine. Since the Zoom Calibration method permits a system to be constructed with both wide/variable field of view and accurate distance measurement positioning and calibration, all of the web inspection/control functions traditionally used in the web printing industry may be implemented with a single inspection/control system using a multitasking approach with the same inspection/control hardware. This permits rapid implementation of old and new web inspection/control functions at a greatly reduced cost as compared to traditional fixed lens systems, as well as permitting a degree of automation, remote access, diagnostic control, quality assurance, and product quality control heretofore not possible with conventional web inspection/control systems.

55 Claims, 40 Drawing Sheets

SYSTEM AND METHOD FOR ZOOM LENS CALIBRATION AND METHOD USING SAME

CROSS REFERENCE TO RELATED APPLICATIONS

This application incorporates by reference provisional patent application specification SYSTEM AND METHOD FOR ZOOM LENS CALIBRATION AND METHOD OF USING SAME, U.S. PTO Ser. No. 60/025,592 filed on Sep. 6, 1996 by present Applicants Clarence A. Lewis, Jr. and Richard D. Lewis.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted tot he extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The general field of the disclosed invention relates to the use of image processing techniques to effect distance calculations in the context of web printing and manufacturing processes to permit the accurate measurement of distances without the need for multiple camera and optical sensing instrumentation.

The basic teaching of this document is the method of calibration of a zoom lens so that it can be used for accurate distance measurement at any position within the zoom range. Combined with image processing techniques, accurate distance measurement is possible for objects within an image. Image processing techniques useful in this application include that of edge detection algorithms and other standard digital filtering techniques as typically detailed in published image processing texts. See William K. Pratt, DIGITAL IMAGE PROCESSING, ISBN 0-471-85766-1 (1991); F. M. Wahl, DIGITAL IMAGE SIGNAL PROCESSING, ISBN 0-89006-227-7 (1987); John C. Russ, THE IMAGE PROCESSING HANDBOOK, ISBN 0-8493-4233-3; Christopher Brown, ed., ADVANCES IN COMPUTER VISION—VOLUME 1, ISBN 0-89859-648-3 (1988); Christopher Brown (ed.), ADVANCES IN COMPUTER VISION—VOLUME 2, ISBN 0-8058-0092-1, (1988).

The commercial implications is that a web manufacturer can use a very high powered image processor with software to perform a number of tasks simultaneously with the same equipment. This eliminates the need for a variety of fixed camera systems to monitor process quality and control manufacturing, resulting in a dramatic cost reduction in overall manufacturing equipment.

The zoom lens can be calibrated by moving the camera using a camera traversing mechanism to one side where a calibrating plate with known precision marks are located. The zoom lens is first calibrated using the known marks, and then positioned (without moving the zoom lens) to the area of interest. Other exemplary embodiments of the disclosure teachings include incorporation of the calibrating marks within a mark pattern as when used for a register control system. Register control systems are generally used to perform color registration alignment in a multi-pass web printing process.

DESCRIPTION OF THE PRIOR ART

The prior art applicable to the present invention disclosure includes the following:

Register Marks Prior Art

Printed marks used for measuring distances have been used since U.S. Pat. No. 2,802,666 issued Aug. 13, 1957 to John F. Crosfield for REGISTER CONTROL SYSTEM FOR MOVING WEBS. Numerous register (ink deposition alignment) controls have been developed around this patent including the following United States patents by Applicant Clarence A. Lewis, Jr.:

U.S. Pat. No. 3,264,983 issued Aug. 9, 1966 for REGISTRATION SYSTEM FOR A MOVING WEB. This invention relates to registration system for operations to be performed on a moving web, typically for multicolor printing. This system concentrates on the combination of analog and digital techniques to reduce measurement of error in web registration. The system concentrates on the use of photocells and conventional fixed-lens systems of image inspection to perform the registration function. The general registration system disclosed in this patent is the basis for many of the following patents mentioned in this application.

U.S. Pat. No. 4,322,802 issued Mar. 30, 1982 for CONTROL APPARATUS FOR ADJUSTING THE POSITION OF A WORKPIECE. This patent details an apparatus for adjusting the initial web position so as to minimize the overall material waste in the press setup initial register operation.

U.S. Pat. No. 4,482,972 issued Nov. 13, 1984 for DISTANCE SENSING APPARATUS AND METHOD. This patent describes a method by which web length distances may be calculated referenced to a registration mark placed on the web. Note that the application here is very specific and targeted towards the use of photosensors to perform the image detection. All of the inherent problems and limitations discussed later in the Sainio patent are applicable to this approach. While the distance method described in the U.S. Pat. No. 4,482,972 deal with rotational distance measurement, no attempt is made to provide support for both length and width measurements, nor is there any support for incorporating wide field of view or multifunction web inspection/control functions. This patent, like the others described herein, is for a single-purpose apparatus.

All of these patents use a photocell and incandescence lamp which require that the printed web be moving in order to obtain pulses which are then decoded to detect variations in the distances between marks.

These systems tend to be rather crude in their register control, as the sensitivity and accuracy of the systems depends on the use of a photocell as the detector element. Additionally, multiple spatially disparate registration marks require the use of separate detector systems, requiring a multiplication in hardware expense as well as consideration of mechanical drift issues as the web manufacturing equipment wears with time.

Television and Image Processing Prior Art

In the late 1950s television technology was used first to monitor register marks. These early systems used a standard television camera of the tube type. A strobe was employed and was fired by an encoder attached to a printing cylinder to illuminate the same position of the web. A high persistence monitor screen was used to retain the image which with repeated strobe cycles would provide an image of the printed web. The system was used to visually monitor register marks. A mark printed by each color station was when in register centered in a box printed by the first printed color station. Thus, by viewing the monitor it was easily determined if the image was in register (i.e., with proper color dot alignment) in both the lateral and circumferential directions.

Distance Measurement Prior Art

Other United States utility patents that focus on distance measurement using video technology are as follows:

U.S. Pat. No. 3,958,509 issued May 25, 1976 to James E. Murray, et. al., for IMAGE SCAN AND INK CONTROL SYSTEM. This patent describes a system for predetermining appropriate settings for the ink flow control devices of a printing press in dependence upon the average inked area in each of a plurality of image zones whose ink supply rate is controlled by a respective one of the ink flow control devices.

While this patent does involve lithographic printing, it remains primarily an inspection and quality control method as compared to a manufacturing control system. Specifically, while the ink deposition rate is controlled with the teaching of this patent, there is no method to perform accurage register control, an important and costly aspect of any manual printing process.

U.S. Pat. No. 3,986,007 issued Oct. 12, 1976 to Carl F. Ruoff, Jr., for METHOD AND APPARATUS FOR CALIBRATING MECHANICAL-VISUAL PART MANIPULATING SYSTEM. This patent describes a system for generating conversion factors used to translate positions in the vision system coordinates into the manipulating system coordinates. This system deals primarily with coordinate transformations which may be used to translate between the vision system coordinates and that of the mechanical manipulating system. The disclosure fails to mention any method of calibrating a moving camera system with zoom lens.

U.S. Pat. No. 3,988,535 issued Oct. 26, 1976 to Henry H. Hickman, et. al., for AUTOMATED POSITIONING. This patent describes a system in which beam-lead chips are held to a magnetic carrier and incident light is reflected by the shiny beam leads and detected by a TV camera. The reflection intensity is used to detect the beam-lead edges and from this information the center of the beam leads is determined.

This system operates on stationary materials, a significant constraint when compared with moving web manufacturing processes. Registration marks in the context of the U.S. Pat. No. 3,988,535 patent are essentially fixed in time and space, whereas in moving web printing the targets move and there is a significant issue of repeatable registration which must be addressed that is not present in beam-lead chip bonding.

U.S. Pat. No. 4,136,950 issued Jan. 30, 1979 to Joseph H. Labrum, et. al., for MICROSCOPE SYSTEM FOR OBSERVING MOVING PARTICLES. This patent describes a microscope system for observing moving particles that makes use of a television camera for producing a continuing series of images of such particles. Light pulses are used to strobe the particle position in a double-exposure, with time and distance differentials used to determine the particle movement.

No mention is made in this patent of the use of image signal processing techniques to perform edge detection or distance measurements for the disclosed applications. Additionally, the strobe method may allow calculation of travel distance for individual particles, but provides no method of determining the proper registration of a web printing process. Furthermore, the use of a microscope in a production web printing application would be inappropriate, as the required field of view would require significant movement of the microscope by precision mechanical stepper motors, or alternatively, a multiple number of fixed microscopes.

U.S. Pat. No. 4,146,907 issued Mar. 27, 1979 to Gerald A. Jensen, et. al., for MULTIPLE FRAME PROJECTOR FOR TV VIEWING SYSTEM. This patent describes a photographic packaging system including a monitoring system which permits the operator to compares frames of film negatives with prints which are being cut so as to ensure that the proper prints will be packaged with the corresponding film negatives. Again, the optics system described here is intended for manual quality control of the production process.

U.S. Pat. No. 4,160,263 issued Jul. 3, 1979 to Harold Christy, et. al., for DUAL OR MULTIPLE OBJECTIVE VIDEO MICROSCOPE FOR SUPERIMPOSING SPACED IMAGES. This patent describes a video microscope with wide potential range of magnification powers (10–1000) whose separate images originating from multiple objective lenses are combined on a half-silvered mirror and focused into a vidicon camera tube to produce a two-dimensional composite image. While this patent discloses the combination of multiple images into a single video image, it does not disclose any method by which the camera positions may be moved or calibrated across moving web material. No additional processing of the image data other than translation and combination is performed by this patent disclosure.

U.S. Pat. No. 4,208,675 issued Jun. 17, 1980 to Jean Bajon, et. al., for METHOD AND APPARATUS FOR POSITIONING AN OBJECT. This patent describes a method and apparatus for positioning an object in space in such a manner as to permit duplication of the positioning in a precise position using synthesized points on a television screen.

While this patent does deal with distance measurements, it is a fundamentally different task to position an object in space and to determine the object's position relative to other objects, as must be done with the web printing process during the initial registration procedure.

U.S. Pat. No. 4,232,336 issued Nov. 4, 1980 to James W. Henry, for INSPECTION OF ELONGATED MATERIAL. This patent describes an apparatus and method for inspecting elongated material such as strands, sheets, bundles or webs for the presence of surface irregularities. The method allows the count of irregularities within a given length of material and the angle of irregularities such as in the case of crimped fiber to be determined.

This patent describes the use of a TV camera to view the material and then electronically analyze the video image for alternating light and dark areas within a given length. This technique essentially replaces the use of photocells in the U.S. Pat. No. 2,802,666 Crosfield patent with the updated technology of television video. Note that no signal processing techniques are used in this patent save for crude edge detection algorithms.

U.S. Pat. No. 4,233,625 issued Nov. 11, 1980 to Norman G. Altman, for TELEVISION MONITORING SYSTEM FOR AUTOMATICALLY ALIGNING SEMICONDUCTOR DEVICES DURING MANUFACTURE. This patent describes a system for aligning successive configurations of minute semiconductors during manufacture, the configurations being carried on a table which is under automatic control of a standard TV camera, pattern-recognition and motor control circuitry that corrects for TV camera geometrical and shading distortions, and a monitor which may be used by an operator to supervise the system.

Note that this patent is primarily concerned with determining the orientation of a given item of manufacture as it is processed, rather than determining the relative position of two marks within a given product of manufacture as is the case in a web printing process. The major difference here is that individual alignment relative to other manufactured product is irrelevent in the U.S. Pat. No. 4,233,625, whereas in web printing applications it is the primary focus of interest.

U.S. Pat. No. 4,253,111 issued Feb. 24, 1981 to Ernest J. Funk, et. al., for APPARATUS FOR BONDING LEADS TO SEMICONDUCTOR CHIPS. This patent describes a bonding apparatus which corrects for misalignment of semiconductor chips during the wire bonding process. Note that this patent specifically limits itself to a limited zone of consideration in the semiconductor chip. Additionally, there is no possibility of misalignment between the bond pads of a semiconductor chip—they are always in the same relative distance to one another. Such is not the case in a web printing process. Therefore, this patent can ignore the initial register problems associated with the web printing process.

A significant aspect of this and other similar patents is that they are designed solely as a post-manufacturing step or as a quality-assurance measure, and never as a method to provide feedback to a prior manufacturing step. Just the opposite is true of the web printing process. Here the misalignment of register marks must be fed back to previous printing stages to adjust for ink deposition, ink deposition timing, etc., to ensure that future manufactured product is in correct register.

U.S. Pat. No. 4,301,470 issued Nov. 17, 1981 to Volker Pagany, for ALIGNMENT APPARATUS. This patent describes the use of a TV camera to align semiconductor bars positioned on an X-Y table. This patent does describe a method by which individual bars may be realigned, but fails to incorporate any method by which the relative distances between the bars may be accurately calculated.

As stated previously, the web printing process is fundamentally different than the manufacture or positioning of piece parts, in that the initial register required by web print processes is a close manufacturing loop in which final web product material is manufactured according to data obtained from prior manufactured web material.

U.S. Pat. No. 4,389,669 issued Jun. 21, 1983 to Daniel Epstein, et. al., for OPTO-VIDEO INSPECTION SYSTEM. This patent describes a system for inspecting miniaturized solid state devices, such as may be found in semiconductor chips. The premise behind the system is the comparison of a good and bad part via a stereo video inspection process.

This system would not be applicable to the web printing process since to generate a comparison web product suitable for inspection would require that the web process be properly registered, which is exactly the purpose of the comparison operation. Thus, the use of stereoscopic inspection techniques is limited to instances in which a "good" product may be relatively easily generated.

U.S. Pat. No. 4,567,506 issued Jan. 28, 1986 to Morimasa Shinoda, et. al., for MONITORING APPARATUS FOR COLOR PRINTING. This patent describes a visual camera and strobe system used for manual inspection of a web printing process. The technology surrounding this patent deals primarily with synchronization of the camera to the web material with the use of a strobe system, and has no method of providing for distance measurement or the use of a movable zoom camera system.

U.S. Pat. No. 4,736,680 issued Apr. 12, 1988 to R. Langdon Wales, et. al., for CLOSED LOOP REGISTER CONTROL. This patent describes a closed loop register control system used in association with a printing press and comprising a television camera in combination with a strobe light and a solid state imaging device which enables continuous scanning of the sheet web.

This system permits comparison of a television image and the desired web image to be made and then adjustments can be made to the web printing process to compensate for the detected differences. While this is a closed loop system as describe in the disclosed exemplary embodiments in this application, the Wales patent still requires that a reference be provided for comparison with the television imaging system. The disclosed method and apparatus in this application dispenses with this requirement and permits initial register to be performed without the requirement of comparison web material. This has a significant time and cost savings for manufacturing, as the generating of an acceptable comparison web sample can take time and waste material. Note the following issues concerning this patent:

(A) This is the only combination television-strobe patent dealing with web manufacturing.

(B) This patent cites the U.S. Pat. No. 4,389,669 Epstein patent which covers all television cameras including strobes and digital to analog (D to A) conversion of RGB.

(C) The Wales patent specifically uses a fixed lens, making initial register across a wide web material require multiple cameras for full-product monitoring.

(D) The Wales patent requires "proof" sheets, or target comparison material to be generated in order to perform proper comparisons and generate the required feedback control for the web printing operation.

U.S. Pat. No. 4,794,453 issued Dec. 27, 1988 to Herman C. Gnuechtel, et. al., for METHOD AND APPARATUS FOR STROBOSCOPIC VIDEO INSPECTION OF AN ASYNCHRONOUS EVENT. This patent describes an apparatus and method particularly suited for use with the closed loop color-to-color registration system of a commercial web printing apparatus utilizing a CCD camera having an image sensor and a synchronization generator circuit which generates periodic scan pulses which trigger the image acquisition scan of the image sensor. This process results in a highly stable and reliable acquisition of a low noise image of registration marks on a printed web that may be later processed by a registration control system.

The Gnuechtel patent, like the Wales U.S. Pat. No. 4,736,680, describes a closed-loop registration control system in which optical data is sampled by means of a strobe and processed to control the overall production of the printed web material. The Gnuchtel patent does illustrate a moveable camera inspection station. However, there is nothing in the Gnuchtel patent which describes methods or apparatus by which one may calibrate the position of the image sensors or provide a method of determining the relative positioning error in the camera location. The Gnuchtel patent also fails to allow the use of wide field of view lenses or zoom lenses to provide the ability to locate web registration marks over a wide field of view. This capability requires a more sophisticated approach to the calibration of the actual camera position with respect to the web material and is disclosed later in this document.

In short, the Gnuchtel is a first order manual solution to a much more complex problem of automatic initial register control. The Gnuchtel patent essentially brings new technology to the Wales patent but goes no further in improving the overall accuracy of the camera positioning techniques disclosed by Wales.

In contrast, the present invention and associated embodiments permit multitasking of functions described in the Gnuchtel and Wales patent using multiple field views over the entire width of the printed web and using the same inspection device (lens/camera/processing unit). Furthermore, the teachings of the present invention go far beyond that in the Gnuchtel patent in that the disclosed Zoom Calibration method may be utilized to implement in a multitasking fashion any number of features in the Gnuchtel patent in combination with other web inspection/ control functions which are not possible with the Gnuchtel/ Wales technology.

U.S. Pat. No. 4,887,530 issued Dec. 19, 1989 to Jeffrey W. Sainio, et. al., for WEB REGISTRATION CONTROL SYSTEM. This patent describes a system for generating indicia of registration error between the respective printing units of a web-fed, four-color printing press. An optical line scanner is disposed over a web to generate signals indicative of the brightness level of successive nominal pixels along a line traverse to the motion of the web. The respective printing units each generate registration marks on the web, the relative positions of which are indicative of the relative cyclical (rotational) and traverse (lateral) positions of the printing units with respect to the web.

As the web moves past the scanners, successive line scans generated by the scanner provide the equivalent of a two-dimensional raster scan of a strip of the web centered on the expected center line of registraton marks produced by the respective printing units. The centers of the respective registration marks are determined, and the cyclical (rotational) and traverse (lateral) positions of the printing unit adjusted in accordance with deviations from expected relative positions. The Sainio patent specifically describes the use of symmetrical, right-angle diamonds for facilitating the calculation of the center of the registration marks.

Note, however, that Sainio only claims the use of photo-optical line scanner sensors (using a tungsten-halogen lamp as the illumination source) and does not make use of any zoom lens technology to obtain wide field registration or provide any method of overcoming the need for multiple cameras to perform wide-field registration operations. Sainio's method and disclosure are limited to sensor arrays which are positioned perpendicular to the direction of web travel, meaning that the method described can only be used when the press is operating. The reason behind this requirement is that the sensor array must see a registration mark pass its position to enable the edge detection algorithms described by Sainio to operate properly. Sainio's specific mention of diamond-shaped registration marks is designed in fact to aid this process and provide a method of overcoming inherent deficiencies in the image sensing method disclosed in this patent. However, the fact that Sainio's method does not permit a wide field of view with accurate distancing restricts the use of this apparatus to low-resolution registration applications. To accurately perform high-quality print registration requires a variable field of view which not possible with the Sainio invention.

A significant issue in this type of sensing apparatus is that of press web jitter. Press web jitter can be defined as variations in the web velocity as it passes through the press due to mechanical characteristics of the press and resonating interactions between the web material and press mechanics as the web progresses through the manufacturing process. This jitter makes sensing as described in the Sainio patent troublesome, as it becomes difficult to accurately determine the exact relative position of the registration mark center because of this inconsistency in web velocity. For example, if the web velocity suddenly increases during traversal past the sensing device, then the resulting image will generate a signal signature which is different than a normal registration mark. As mentioned previously, Sainio used a diamond-shaped registration mark to help offset this problem, but this approach is insufficient to correct the problem of web jitter over the range of permissible web manufacturing processes. It is clear from modern production criterion that another approach to solving this problem is dictated.

Note, however, in contrast to Sainio, the presently disclosed invention makes use of stroboscopic synchronization of the image capturing device, and as such does not require that the press be moving. Additionally, the use of image processing techniques in conjunction with the Zoom Calibration method disclosed herein permits a wide variety of registration marks to be used with no loss of accurate distance calculation measurement control. Another significant difference in the presently disclosed invention as compared to the Saino disclosure is that with image processing it is possible to achieve registration with arbitrarily configured registration marks. Image processing can, when coupled with the Zoom Calibration method, permit the use of patterns within the web product to be used as registration marks for distance calculations. No prior art system claims to permit this type of registration using the final product itself as the registration mark. Finally, the stroboscopic synchronization of the presently disclosed invention combined with image processing techniques and accurate distancing provided by the Zoom Calibration method permit press jitter to be compensated for in the web inspection/ control function.

U.S. Pat. No. 4,932,320 issued Jun. 12, 1990 to Michel Brunetti, et. al., for METHOD AND DEVICE FOR REGISTERING COLORS IN AN OFFSET ROTARY PRESS. This patent describes a system for positioning objects relative to one another comprising taking an image of a group of marks formed on the medium, and analog-to-digital converter connecting the image-taking equipment to digital recording memories, and a data processing system for measuring the mark separations relative to two perpendicular axes and for generating separation correction signals for displacing the object.

Of significant note in the Brunetti patent is the lack of any support for wide-field zoom lenses which permit the location of widely disparate registration marks. Furthermore, Brunetti neither claims nor discloses any method to calibrate the accurate position of a camera or image capture device in respect to the web material registration marks. No method is provided to compensate for mechanical wear in the system as well as permit compensation for registration drift across a wide width web.

As with previously discussed patents, the Brunetti patent address only a single-function inspection system. The disclosed Zoom Calibration method, in contrast, permits a multi-function capability within the same optical camera system. This would not be possible with the Brunetti teaching, as it discloses no method by which wide-field variations may be captured, nor is there any camera distance calibration method to permit accurate distance measurements across the web width.

U.S. Pat. No. 5,329,466 issued Jul. 12, 1994 to Patrick Monney, for REGISTRATION CONTROL DEVICE FOR USE IN A ROTARY PRINTING MACHINE. This patent describes a registration control device which makes use of a row of discrete photosensitive elements arranged perpendicular to the traveling direction of the print web and in a plane situated above and parallel to the web. Though the Wales patent was cited in the Monney application, the approach taken in the Monney patent is conceptually different than Wales since the fixed sensor array approach in the Monney patent assumes that the sensor will be fixed, and that access to the entire width of the web must be accomplished at the expense of using additional linear rows of photosensors.

While the use of an integrated row of image sensors is an advancement in technology as applied to web registration control, it suffers from the same drawbacks as other conventional camera/microscope single-lens systems, or systems with a single mobile camera. The problem of accurate camera positioning with respect to the web medium is still an issue and one that is not fully addressed by any of these approaches. Additionally, the Monney disclosure lacks the capability of a wide field of view, requires that the press be moving to operate effectively, and suffers from the same press jitter problems as the Sainio invention.

Register Control Patents

The Monney and Sainio patents use a linear array fixed scanner dedicated register control, and thus no strobe movement is required for their operation. As stated previously, this does produce a limitation on the width range with which these systems may operate. Typically, the wider field of width inspection required, the higher the cost of these systems.

All other register control patents are of the analog type, photocell and incandescence lamp. There are many of them but they all use marks are relate back to the Crosfield patent of 1953.

The patents cited above trace the use of a television camera for visual inspection and control. Digital to analog conversion and sophisticated algorithms are used for inspection, identification of components on circuits boards and integrated circuit chip carriers. In all cases fixed lenses are used making the system configuration tailored to a single, fixed-position inspection purpose. This restriction is too limiting for many printing operations, especially those who have many customers or customers with stringent quality control requirements which dictate full-width inspections of manufactured web material.

The later patents, including Wales, register control advanced to the use of both a camera and strobe for registration mark detection, but in no case has there been any use of movable zoom lenses with wide-field inspection capability. The teaching to accomplish this is the focus of the disclosure in this patent application.

Prior Art Summary

The use of register marks for distance measurement and television technology for distance measurement are in the public domain. However, the combination of this technology with distance calibration over the width of the printed web is new to the art. Additionally, the prior art teaches only of measuring distances in a single direction, whereas the disclosed Zoom Calibration method permits accurate distance measurement in one, two, or three spatial dimensions.

While several patents, such as the Wales U.S. Pat. No. 4,736,680 and Gnuechtel U.S. Pat. No. 4,794,453 disclosure, describe a traverse mechanism on which the register mark scanning device is mounted, these implementations are necessarily semi-manually controlled because of the lack of accurate traversal distance calibration inherent in these systems. None of these systems have web inspection capability as they are register control devices only and dedicated solely to this function. The so-called traverse in these instances is used only to position the web scanner over the registration marks laterally. The traverse was never meant to move after initial positioning by the operator.

As such, the traverses, while motorized, are essentially manually positioned by an operator over the printed web during press operation. Lateral adjustments in this context are always accomplished via manual operator control. Note that the narrow field of view in both these implementations (inherent in any fixed magnification lens system) restricts the ability of the system to compensate for lateral web shift as the press heats up or the web material shifts during manufacture.

Thus, the manual positioning aspect of these systems means that it is impossible for the web printing system to be fully automated or controlled remotely. All of the register systems noted are single purpose systems used only for register control. They have neither the field of view nor the image processing capability to be used for any type of web inspection. Additionally, the use of fixed lens systems means that any distance measurements obtained by the Wales and Gnuechtel systems is inherently a relative distance measurement, and not an absolute distance, since there can be no calibration standard by which to compared the measurement on a two dimensional web surface, since in most cases printing on the web surface is subject to thermal and mechanical forces that are not predictable. A significant disadvantage of the Wales/Gnuechtel systems and their counterparts is an inability to obtain automated absolute distance measurements from a given printed web reference and the edge of the web. This lateral alignment problem is a very common web press setup issue, and as such there is great economic incentive to automate it without the need for constant human intervention. The Wales/Gnuechtel technologies are inadequate to solve this common problem in the art.

The use of a zoom lens with accurate calibration for distance measurement throughout its entire range is novel and solves several of the existing problems associated with fixed-lens systems, including high cost, long-term accuracy and repeatability degradation, and the capability to perform wide-field analysis of web materials rapidly and at several different levels of image resolution and fields of view.

Additionally, while a variety of web inspection/control functions have been documented in the prior art, there is no single system that discloses or claims an apparatus or procedure for integrating all of these functions into a single hardware/software system. The field of view limitations and lack of distance calibration in the prior art relegates all of these systems to single-use applications. As a result, the overall system cost to implement a variety of web inspection/control functions increases linearly with the number of web image inspection (image capture) sites and web inspection/control functions to be implemented.

BACKGROUND OF THE INVENTION

Overview

The disclosed apparatus and method relates generally to the field of automated position sensing and automatic inspection control of printing and manufacturing processes.

In manufacturing control systems comprising image capture optics and electronics, positioning of the image capturing mechanism is accomplished via the use of stepper motors or motors with encoder feedback which move the image capturing mechanism in an absolute X and/or Y position over the article of manufacture being inspected. A typical scenario is illustrated in FIG. 1, in which web material (typically paper, but often other items of linear manufacture) are manufactured with perforated punches along either side of the material and rolled in the Y direction beneath a stationary inspection station which includes an optical image capturing device. Mechanical encoders connected to the perforation rollers permit determination of the Y position of the material as it moves past the image inspection station. In the illustrated example of FIG. 1, the image capturing device is movable in the X direction laterally across the surface of the web material.

Once properly positioned over the article of manufacture, images may be captured of the article as it progresses along the manufacturing or assembly line process and these images may then be processed to detect and correct manufacturing flaws or make adjustments in the pre-inspection manufacturing controls to optimize product characteristics.

Critical Issue

A critical aspect of this inspection and manufacturing feedback control system is determining the absolute position of the image capturing mechanism with respect to the article of manufacturing being inspected. This position sensing function is complicated by the following issues:

(1) Encoder Accuracy. With conventional positioning mechanisms and encoder resolutions, the accuracy for each of the X, Y, and Z axis are determined by the individual components which make up the positioning mechanisms. The placement actuator motors with encoder feedback used to move the image capturing device have a typical encoder resolution of 0.001 inch (1 mil). While this degree of accuracy is acceptable for most manufacturing applications, this accuracy is not maintained over the life of the motor positioning actuator.

For example, the typical traverse for lateral positioning of the camera has a 0.001 inch encoder resolution but a repeatability of the positioning mechanism of ±40 mils. Thus, the accuracy of the positioning mechanism is limited by the repeatability and is thus ±40 mils for a total variation of 80 mils or 0.08 inch.

(2) Mechanical Wear. Due to mechanical wear of the positioning mechanism used to place the image capture mechanism, in time additional errors creep into the positioning process. These errors due to mechanical wear are extremely difficult to predict and are heavily dependent on the specific use of the positioning mechanism. For example, specific movement of the image capture device in a particular area may induce more wear at some (X,Y) coordinate areas than others, making compensation for this type of mechanical error very difficult if not impossible to incorporate into a practical image capture positioning mechanism.

(3) Thermal Variations in Space and Time. It must be understood that the typical web manufacturing process is a spatially diverse system, and as such there will be variations in temperature at various stages and within various apparatus of this system. This variation in thermal topography is both geographic and temporal. That is, temperature differentials within press equipment will vary both as to the piece of equipment and the amount of time the press has been operating. All these factors are virtually impossible to compensate for using conventional calibration techniques, in which a distance measurement instrument is calibrated by an operator to a fixed calibration standard and then used in web production. Note that even in systems which use the web as the calibration source, there is no method currently available to compensate for thermal variations in the printed web as it progresses through the manufacturing process.

When both mechanical wear and thermal variations are combined, it is seen that the overall web production system has a moving measurement dynamic, and as such any effective and accurate calibration procedure performed to support web inspection/control functions (i.e. initial register, repeat length) must include the calibration procedure as an integral part of the web inspection/control function. The Zoom Calibration method described herein is designed specifically to be incorporated within the context of any practical web inspection/control protocol, thus enabling rapid and accurate distance measurement calibration before the web inspection/control function is performed.

Prior art approaches to distance calibration do not take this approach, as all conventional calibration procedures are manual and performed with the use of an operator. As a result, none of the prior art is capable of compensating for both thermal and mechanical variations in web manufacturing equipment. While it is possible for an operator to perform manual calibration procedures on an accelerated schedule (as is done in some manufacturing lines), these extra calibration procedures only serve to reduce the overall efficiency of the manufacturing process and increase the overall cost of web production.

While the requirement for frequent calibrations of any mark detection device is dictated by the realities of the web production system, it is clear from the cited patents that the prior art teaches away from this method for economic reasons. As a result, conventional web manufacturing processes rely almost exclusively on initial operator calibration of register mark detection devices.

(4) Positioning Speed/Accuracy Tradeoff. With conventional encoder positioning mechanisms, there is always a tradeoff of positioning speed and positioning accuracy: in general, the faster the positioning speed, the poorer the positioning accuracy. Thus, fine positioning accuracy may be achieved using high precision encoders and stepper motors, but at the sacrifice of positioning speed.

So, even if highly accurate encoder and positioning mechanisms are employed with conventional calibration technologies, the results are economically impractical due to the overall slow positioning speed of the image capture device (camera). This slow positioning speed also makes multitasking of the image capturing device impractical, since the key to multitasking is amortizing the image capturing/processing cost over a wide range of web inspection/control functions. If the time required to perform a given web inspection/control function is too large, then the total time to cycle through all web inspection/control functions will be prohibitive.

Thus, the speed/positioning tradeoff inherent in conventional web inspection designs explains why these systems have been exclusively single-purpose, as well as explaining why web press manufacturers have been reluctant to include more than a very minimal set of web inspection/control functions in a particular press configuration. The key capability of rapid distance calibration has been lacking in these previously disclosed systems. The economics of including a multiplicity of web inspection/control functions on a single press quickly increases the press cost to be economically prohibitive using these previous approaches. As a result, much of the manual operative nature of these web presses has remained unchanged for decades.

Note that if the speed of the traverse and/or zoom is increased, then the positioning accuracy is sacrificed, and can reach a ±20% error at high positioning/zoom rates, eliminating any benefit to be had from the use of more expensive encoders and positioning mechanisms. Thus, an infusion of money into the quality of the encoders/positioners in a given inspection system will not necessarily produce more accurate results as would be posited by conventional wisdom.

Note, however, that the use of more accurate encoders and positioning mechanisms in conjunction with the Zoom Calibration method described herein can, when combined with sufficiently accurate image capturing mechanics, provide improved accuracy commensurate with the increase in encoder/positioner accuracy. The key to this improvement is the ability of the Zoom Calibration method to compensate for variations in all the system inaccuracies (encoder, positioner, lens, mechanical wear, thermal expansion, image capture distortions, etc.).

The speed/position tradeoff described above is not unknown in the prior art, and can only be corrected by dynamically calibrating the speed and position of the image capture device during the measurement process as described in the disclosed Zoom Calibration method detailed later in this document.

(5) Repeatability. The lack of repeatability of the zoom positioning mechanism in commercially available motorized lenses limits their theoretical accuracy for measurement purposes. All commercially available zoom lens such as obtained from Fujinon, Cannon and others employ small analog DC motors with position feedback from a potentiometer. Positioning repeatability when new is about 1% which with age, wear, and dirt accumulation, can deteriorate to 10% or more. At maximum zoom with a field of view of 0.5 inches, a 1% positioning error represents 0.005 inch with a 10% variation representing 0.050 inch. At the full field of view of 8 inches these figures increase to 0.080 and 0.8 inch respectively.

Some methods to reduce this error have been tried including running the zoom to a stop and removing backlash by always approaching a position from the same direction. Running the zoom to a stop restricts the use only to the ends of the zoom. Removing backlash has not proved successful in commercial practice. Reasons for this are well known in the art, but include limited accuracy with analog positioning mechanisms, gear backlash and wear, as well as the ever present variations caused by temperature variations within the positioning system. Additional sources of error can include limited encoder resolution as well as stepper motor wear and differentials in analog encoder output due to potentiometer contamination.

OBJECT OF THE INVENTION
Variable Field Calibrated Distance Measurement

The teaching of this document is the method of calibration of a zoom lens so that it can be used for accurate distance measurement at any position within the zoom range. Combined with image processing, accurate distance measurement is possible for objects within an image.

Function Multitasking and System Cost Reduction

The commercial implication of the disclosed teachings is that web manufacturers can use a very high powered image processor with software to perform a number of measurement and inspection tasks simultaneously with the same equipment.

The use of a calibrated zoom lens system enables a single very high quality and reliable optics system to perform a number of web manufacturing control and inspection functions which at present each require an individual inspection apparatus. For example the disclosed Zoom Calibration method and system allows diverse web functions such as automatic register control, automatic inspection, color monitoring, line hole inspection, repeat length calculation, and other control functions (each of which require different fields of view at diverse positions on the web surface) to be performed by a SINGLE set of optics, image capturing hardware, and image processing hardware/software. The higher cost of a single-use conventional approach to this system using methods in the prior art when spread over a number of the functions performed by a single zoom lens system results in a lower overall cost for the zoom lens system with a substantially greater capability of the powerful image processing engine and reliable traversing mechanism.

This system function multitasking permits the overall cost of a system using the Zoom Calibration method to be a small fraction of the conventional system cost as given by the following relationship:

$$ZoomCalCostSavings = \frac{\left( \sum_{k=1}^{N} WebFunctionCost(k) - ZoomCalSystemCost - \sum_{k=1}^{M} WebFunctionsNotPerformedByZoomCalCost(k) \right)}{\sum_{k=1}^{N} WebFunctionCost(k)} \times 100\% \quad (1)$$

Where
  N is the number of discrete web functions to be implemented using the Zoom Calibration system,
  M is the number of discrete web inspection/control functions implemented using conventional (prior art) methods,
ZoomCalCostSavings is the overall percentage of system cost savings using the Zoom Calibration,
WebFunctionCost(k) is the particular cost of implementing a particular web function (k),
ZoomCalSystemCost is the cost of implementing the hardware and software associated with the Zoom Calibration system (typically just the hardware/software components illustrated in FIG. 2 and FIG. 3),
  Note that in the above equation (1) that while it is possible to multitask several web functions in conjunction with conventional web function approaches, a primary goal of the invention as described is to force M=0 (indicating no web functions are performed in a conventional manner as taught by the prior art) so as to completely subsume all conventional web control/inspection functions into the Zoom Calibration system, thus maximizing the cost savings of the Zoom Calibration system and reducing equation (1) above to the following optimal cost expression:

$$ZoomCalCostSavings_{OptimalSystemCost(M=0)} = \qquad (2)$$

$$\frac{\left(\sum_{k=1}^{M} WebFunctionCost(k) - ZoomCalSystemCost\right)}{\sum_{k=1}^{N} WebFunctionCost(k)} \times 100\%$$

As an example of the above optimization, if the WebFunctionCost and ZoomCalSystemCost parameters are for the sake of argument equivalent to an arbitrary cost C (an economically realizable system objective in some hardware configurations), and N=5, meaning that there are five WebFunctions performed by the multitasking Zoom Calibration system, then the overall cost savings would be $$ZoomCalCostSavings_{OptimalSystemCost(M=0,N=5)} = \frac{(5C-C)}{5C} \times 100\% \qquad (3)$$
$$= 80\%$$

Of course, as the number of WebFunctions performed by the Zoom Calibration system is increased, the cost savings increases accordingly. It would not be unreasonable for the disclosed Zoom Calibration method to be used to implement ten or more conventional web inspection/control functions in a given web printing control system.

Thus, the Zoom Calibration method results in an 80% cost savings over conventional prior art methods. Note, however, that this cost savings may be even greater if the above calculations were modified to reflect that each conventional web function requires a separate optics system for each position to be inspected and for each varying field of view. The Zoom Calibration system has as an objective the folding over of these multiplied costs into a single integrated system capable of performing all conventional web functions over a wide field of view with a single optics system. This greatly reduces overall system costs by reducing maintenance, initial system costs, and the size of the inspection station illustrated in FIG. 3. Note that the size of this station is a function of the number of cameras required to perform inspections. The Zoom Calibration method reduces this camera count as compared to conventional prior art methods.

Another subtle but important advantage of the Zoom Calibration method as applied to a multitasking system context in which a variety of web inspection/control functions are integrated in a single system is that of the integrated control features available with such a system. Since the Zoom Calibration method permits a multitasking system to share the hardware and software associated with web inspection/control functions, it is possible to easily integrate the web production controls into a single operator interface such as the touch screen display 204 illustrated in FIG. 2. Previously, if a production web control system was to provide such a level of integration, the operator interface would have had to deal with a variety of individual systems (all different) to provide the level of overall production control that is desirable in a modern web production environment.

However, even if such an integrated system were constructed, it would still lack much of the needed inspection functionality that is made possible only with the Zoom Calibration method as applied to a variable field of view image processing system. This drawback with a conventional system approach to implementing multiple web control functions contrasts directly with the ability of the Zoom Calibration method to permit a fully modular approach to web inspection/control functions, in which both hardware and software resources may be shared among a limitless number of web applications. This full integration of the web inspection/control framework is the key to the economic success of the Zoom Calibration method as applied to the systems which embody its teachings.

New Approach to Optics/Image Calibration

It is important to differential the method of calibration used in the disclosure from the normal method of calibration for any instrument. The normal procedure for the calibration of an instrument is to adjust the instrument until the desired reading is obtained. This usually is a manual process, performed by a production operator or some other individual.

A commercial zoom lens is designed to position rapidly at the expense of repeatability and positioning accuracy. Thus, it is not possible nor with the disclosure is it desired to pursue the conventional method of calibration as it simply is not possible to accurately position and adjust the zoom lens with the positioning motors which are currently available. Instead, the zoom lens is positioned to a nominal position and then calibrated using the calibration plate of FIG. 23. Thus, each time the zoom lens is positioned to the same nominal position the actual position can be off by ±10% or more. This does not matter as the new position will be calibrated and a new inch/pixel position calculated using the Zoom Calibration method. As long as the zoom position is not changed, this new inch/pixel value can be used. The speed of calibration is extremely fast and completely automatic. Whenever the zoom position is changed, an automatic calibration cycle will occur either before or after the measurement has been made.

The zoom lens can be calibrated by moving the camera using a camera traversing mechanism to one side where a calibrating plate (an exemplary embodiment of which is illustrated in FIG. 23) with known precision marks are located. The zoom lens is first calibrated using the known marks, and then positioned (without moving the zoom lens) to the area of interest. Another refinement is to incorporate the calibrating marks within a mark pattern as when used for a register control system.

Thus, a significant objective of the disclosed Zoom Calibration method is to position the image capture device (camera) and perform lens zoom operations as fast as possible, and use image processing and process Zoom Calibration reference marks to compensate for the degradation in image capture positioning while operating at fast positioning speeds. This objective is consistent with utilization of the Zoom Calibration system in conjunction with a multitasked web inspection/control function, and enables the system to perform a variety of functions at a reduced overall system cost as discussed above.

With the availability of high quality CCD solid state color cameras and powerful computers it is possible to perform all of the automatic control and inspection functions described above using the same image processor and traversing camera with appropriate software.

Summary

Accordingly, the object of the invention is to provide a single high speed image processor in combination with a traversing camera that will perform all of the above-mentioned inspection and manufacturing control functions with a single integrated system. Several elements of this objective include the following:

The ability to calibrate a zoom lens across a wide field of movement with the stated purpose of using this calibration information to accurately determine distances in a web printing production material.

The ability to use a single sensor system to fully inspect the area of web manufacture, relying on calibrated distances to determine the correct position at which the inspections occur.

The ability to perform initial register operations in which a web production line is tuned so as to achieve multi-color ink registration in a rapid manner so as to minimize web printing setup time and eliminate pre-production material waste.

The ability to accurately measure the web width and compensate accordingly for position measurement with respect to areas of quality control inspection.

The ability to perform accurate repeat length measurements, in which the length of a particular web section is accurately measured using the calibration information obtained above. The ability to accurately calculate repeat length measurements is a critical factor in compensating and adjusting the web printing process for tension in the web material as it flows through the multi-stage printing process.

The ability to use the accurate distance measurement obtained above to perform register control of printing to perforation, line hole, or sheeter cut functions. It has been traditionally a problem to automate the mechanical relationship between the printed surface of a web and the ink deposition process. With accurate distance measurements obtained from zoom lens calibration, it is now possible to register both the ink deposition as well as the relationship between the printed image and mechanical web controls. This level of control has previously eluded the web printing industry because to properly detect both mechanical and printing aspects of the web manufacture requires image processing techniques with a wide field zoom lens that can be accurately positioned over the entire web surface.

The ability to calibrate the zoom lens to either marks placed on the web or alternatively to a known calibration standard plate that is placed beside the longitudinal web print flow. This dual-mode of lens calibration permits the distances on the web to be compared to a standard that does not change with humidity, tension, web material, or mechanical wear in the web printing equipment.

The ability to multitask the web inspection/control functions, using a single inspection system with a variable field of view that has been calibrated using the Zoom Calibration method, so as to drastically reduce the overall system cost of web inspection/control while optionally permitting simultaneous additional web inspection/control functions to be implemented that were not heretofore possible using conventional methods. This objective of mutifunctionality will be generally described in terms of the example embodiments of register control, repeat length calculation, and web inspection in this disclosure. However, it must be understood that ANY combination of conventional or novel web inspection/control techniques which require a range of inspection accuracy are covered by this objective of the disclosed invention. Thus, it is the object of this invention to allow the combination of any conventional web inspection/control techniques, as implemented with the Zoom Calibration method, to generate a new system which surpasses the capabilities of any existing control/inspection function while providing simultaneous overall system cost savings.

Other ancillary system objectives include:

A single touch screen integrated graphical interface greatly simplifying the operation of all web control/inspection functions.

A single high performance image processing system, as part of the Zoom Calibration hardware, is available to greatly enhance those web control/inspection functions which were formerly limited due to the cost of processing. The signal processing methods which are an integral part of the Zoom Calibration system provide at no additional cost the capability of other transformation and inspection functions as part of the calibration process.

Communication through remote telecommunications for both service and training. The system as described can be connected to a telecommunications network to permit remote inspection of and control of automated web printing operations.

Remote diagnostics eliminating the need for in plant service. Web press manufacturers or plant personnel can run web printing diagnostics remotely to determine the source of faults in automated web printing systems.

Lower cost than distributed web inspection controls, due to the reduction in multiplicity of image detection hardware. The movable nature of the zoom lens system as detailed in FIG. 3 permits the entire web width to be inspected using a single set of optics. Additionally, the zoom feature of the optics system permits differing fields of view to be obtained, which is important in some applications that require coarse fields of view to detect complex objects, yet also require high magnification to correctly process detail within the same object.

Complete production and quality control data is easily available in real time. The Zoom Calibration system permits the entire web width to be inspected for variations in product quality. Previous systems required fixed lens or sensor apparatus at varying positions across the web to achieve this functionality. Note that these older systems had fixed fields of view and as such it was not possible to inspect detail at the same site that coarse inspections were made. A major objective of the disclosed Zoom Calibration method is to permit accurate magnification of a given field of view so as to permit a wide range of granularity in permissible inspection detail.

BRIEF SUMMARY OF THE INVENTION

A zoom lens provides magnification of an image directly related to the zoom factor. That is, a 16:1 zoom lens has the capability of magnifying the image by a factor of 16 times. The zoom capability is provided by a motorized lens system where a small motor drives the lens through gears to provide the entire range of zoom from 1:1 to 16:1, or 16× magnification and all intermediate magnification values. The lack of an accurate positioning means to provide repeatability and accuracy has limited the zoom lens to purely visual purposes such as teleconferencing and in the printing industry to visual inspection.

In the herein disclosed invention any position in the entire zoom range can be calibrated to within one pixel resolution for any commercially availability zoom lens.

Printed marks of known dimensions are used to scale the zoom position in either the X or Y direction. The X and Y direction are related by form factors in both NTSC and PAL video standards. For a discussion of NTSC/PAL video standards, see Curtis J. Chan, Television and Video Production Systems, THE ELECTRONICS HANDBOOK, ISBN 0-8493-8345-5, pp. 1575–1598 (ed. Jerry C. Whitaker, 1996). Thus, scaling either the X or Y direction provides the correct scaling in the other direction.

A known mark length of 1 inch for example is printed. For any zoom position this known mark length can be measured as a number of pixels using well known image processing techniques. If for example this one inch mark were measured as 100 pixels, than each pixel would represent 0.010 inch for that zoom position. For any other measurement this would be true providing the zoom position were not changed.

Advantages of the disclosed system and method include:
(1) The combination of the Zoom Calibration and encoder positioning device on the traverse provides an accuracy of measurement in the lateral direction within one encoder pulse or one pixel whichever is smaller irrespective of the positioning accuracy or repeatability of the traversing mechanism.
(2) The combination of the Zoom Calibration and encoder positioning device mounted on the machine provide an accuracy of measurement in the circumferential direction of one pixel irrespective of the encoder resolution.

X Circumferential Direction Correction

With Zoom Calibration the repeatability inaccuracy of ±0.040 inch is not important with the ultimate accuracy equal to one pixel or one encoder pulse whichever is less. At full zoom one pixel is equal to 0.001 inch. With Zoom Calibration, the accuracy in the X direction has been increased from 0.080 inch to 0.001 inch for this example.

Y Circumferential Direction Correction

For some applications as in flexographic printing, the encoder is a gear tooth sensor which provides a pulse for about every $\frac{1}{16}$ of an inch or 0.060 inch. Even where an optical precision encoder is used, a 1000 pulse encoder will provide one pulse for every 0.040 inch for a 40 inch repeat. Thus a position can be encoded to the nearest pulse or from 0.060 to 0.040 in the above examples.

Two Dimensional Application

One use of the invention to be described is in the printing industry where marks are printed for the purpose of measuring and controlling color registration. In this example the invention is used for both obtaining initial register and for maintaining accurate registration of a number of printing units where each printing unit prints one color.

For this example, a motorized zoom lens is attached to a camera and mounted on a traversing mechanism 109 (FIG. 1) which moves the camera across the entire web width. An encoder 316 (FIG. 3) is mounted on the traversing mechanism which provides information of the position of the camera across the web in the X direction at all times.

Another encoder 132 illustrated in FIG. 1 is attached to the machine in a manner so that the encoder will recycle every revolution of the printing cylinder. This encoder is used to synchronize or trigger the camera to provide an image at any position around the printed image as the Y position.

An image can be obtained anywhere in the area (X,Y) of the printed image which is the printed area defined by the width and circumference respectively of the printing cylinders. The zoom position (Z) provides for magnification within the zoom range for any (X,Y) coordinate position.

With Zoom Calibration the same position can be encoded to within one pixel or 0.001 inch for both examples above using a commercial 16:1 variable field of view zoom lens. With Zoom Calibration, the accuracy in the Y direction has been increased from 0.060 inch to 0.001 inch for this example.

Z-Zoom Position

At present the best commercially available zoom lens has a 16 to one range of field of view. In the fully zoomed in position this represents about a 0.5 inch in the X direction and about 0. 4 inch in the Y direction. With a camera resolution of 500 pixels, each pixel represents about 0.001 inch in the X direction and slightly less in the Y. This resolution is adequate for the measurement of printing parameters such as color register and any process register such as print to cut or print to perf in either the X or Y direction. Thus as a magnifier the zoom lens provides extreme measurement accuracy for printing parameters.

In the fully zoomed out position the field of view is about 8 inches by 6.4 inches. However, the resolution has been decreased by the zoom factor. That is each pixel will now represent 0.016 inch. In this position the zoom lens provides a large field of view but at reduced resolution.

It is desirable to use all zoom positions for a variety of functions from the measurement of distances from printed objects to points of reference on the machine such as a sheeter knife, perforating cylinder, etc.

It is desired to be able to use different fields of view and resolutions for a variety of functions. Initial registration where initial register errors are very large require a large field of view to be able to obtain all marks within the same image. Where the utmost accuracy is required the maximum resolution of 0.001 inch is desired with small marks required to fit into the small fields of view. For both obtaining initial register and for maintaining accuracy two mark patterns may be required, a large one for initial register, and a small one for maintaining accurate register.

Thus the invention enables the use of commercially available zoom lens as precision distance measurement devices for all zoom positions with the following advantages:
(1) An accuracy of repeatability in the X and Y direction stated previously.
(2) A method for measuring any distance within any image or series of images by:
   First calibrating the zoom position from a reference mark according to the invention
   Moving to another image and measuring a distance between two or more objects without moving the zoom position and using the already calibrated position. An example would be the measurement of a bar code or the perforation relative to a printed mark using image processing techniques and the calibrated zoom position.

BRIEF DESCRIPTION OF THE SEVERAL VIEWS OF THE DRAWINGS

In general

FIG. 29 and FIG. 30 teach the inherent positioning inaccuracies present within conventional zoom lens technologies and are used to (1) illustrate why zoom lens technologies have heretofore not been accepted in web printing applications, (2) provide a method of quantifying the positioning errors which may be present within this type of image capture device, and (3) provide a range of possible field of views (FOVs) possible with such an image capturing system.

DESCRIPTION OF THE PRESENTLY PREFERRED EXEMPLARY EMBODIMENTS

Figure 1:
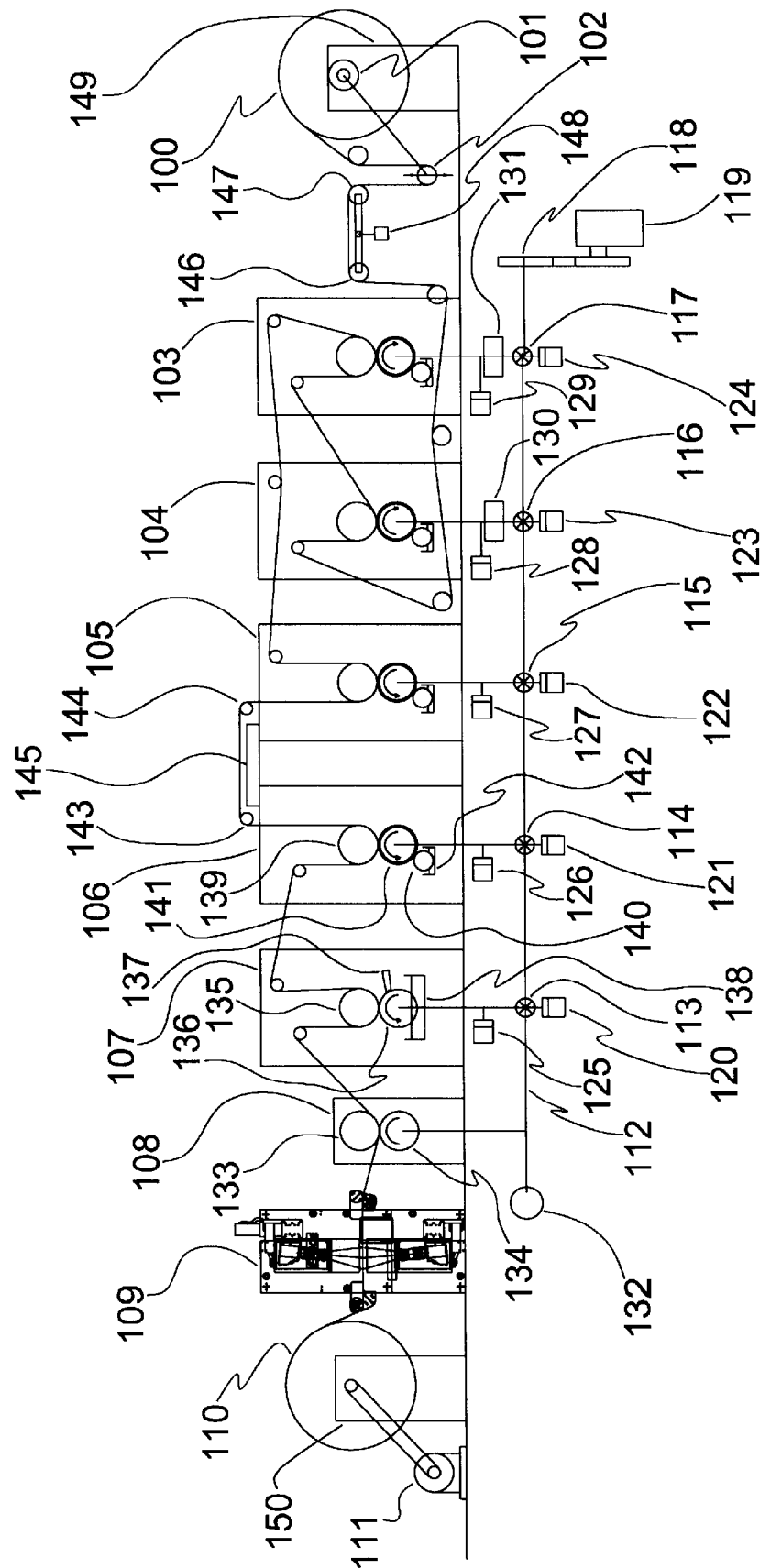
FIG. 1 illustrates a complete web printing and converting machine on which the invention is illustrated for the purposes of performing automated web inspection/control functions.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

While the following discussion uses as the preferred embodiment an optical image capturing system comprising standard optical lenses and image capturing mechanism, note that throughout this document the term "image capture mechanism" or its equivalent may refer to any method or mechanism of backscatter radiation measurement, including infrared, ultraviolet, microwave, or any other method in which electromagnetic radiation may illuminate an article of manufacture and be detected electronically.

Mechanical Components
Printing and Converting Machine For Invention Demonstration The following discussion concerns FIG. 1 which shows a General Printing Machine complete with printing, coating, and dieting. As depicted, the printing machine has provisions for printing two colors on each side of the press. It is understood that any number of colors can be added to provide for additional colors on both sides of the web. Additionally, it must be understood that the teachings of this invention apply to all manner of printing and web manufacturing processes, and should not be so limited to just the exemplary processes illustrated in FIG. 1.

An unwind stand 149 and rewind stand 150 are illustrated in FIG. 1 for material handling of the web material which is in roll form. Note, however, that this is representative of only one of the many possible system contexts in which the disclosed Zoom Calibration method may be used. It is possible, for example, for the Zoom Calibration method to be used in the calibration of stationary XY web surfaces. In these applications the traversal mechanism 109 would incorporate XY and possibly Z axis positioners instead of the single X-axis positioner as exemplified in FIG. 2.

Referring to FIG. 1, the unprinted material in roll form (100) proceeds through the movable roller (102) which controls the brake (101) attached to the center of the unwinding roll of material. Roller (102) is air loaded to provide a constant tension in the web material prior to entering the first printing station (104).

The web material proceeds under printing stations (104) and (103) which then print two colors on the under side of the web. The web proceeds to station (105) and (106) which print two colors on the bottom of the web. Print stations 103, 104, 105, and 106 are shown as flexographic printing stations, however, they could be of another printing processes including rotogravure or web offset. Print cylinder 141 is a printing cylinder including a flexographic printing plate of either rubber or photo polymer composition. Analox roller 140 is shown immersed in the ink tank 142. Ink is transferred to Analox roller 140 which in turn transfers its ink to the raised image on the printing plate of printing cylinder 141. Ink on the raised image of the printing cylinder 141 is transferred to the web substrate.

The web substrate proceeds through station 107 which can apply either an overall coating, a pattern coating, or ink acting as another printing station. Station 107 is shown as a rotogravure printing station with the printing cylinder 136 immersed into ink tank 138 with doctor blade 137.

The web material proceeds through station 108 which can be a die cutting or scoring machine to be performed in register with the printing.

Station 109 is a double camera traversing system arranged to view or scan both sides of the printed and coated web.

The final stage of the process is rewinding of the processed web material into rolls 110. Motor 111 acts as a constant torque device to provide tension in the roll.

Motor 119 is connected to drive shaft 112 via either gears or a belt 118. Drive shaft 112 is connected to gear boxes 113–117 driving printing units 107–103 respectively. Each gear box is connected to printing stations 107–103 through differential gear boxes 113–117. The differential gear boxes provide for continuous or 360 degree of correction ideally suited for implementing rough initial register.

Correction motors 120–124 are connected respectively to differential gear boxes 113–117 and provide longitudinal rotation of each printing cylinder as required to initially put all cylinders into register and for correcting register during the process. Motors 125–131 provide for lateral correction of each printing cylinder as required to obtain and maintain lateral register.

Gear boxes 130 and 131 provide for reversing printing units 104 and 103 respectively to enable printing on either side of the web material.

Die cutting unit 108 consists of cutting cylinder 134 and mating anvil cylinder 133. Although there are usually lateral and circumferential motors on the cutting cylinder the drawing purposely does not show them in order to demonstrate rough initial register, one of the unique features of the disclosed exemplary invention embodiments. It should be understood that while 360 degree differential gearboxes are shown as the means for adjusting circumferential register, compensator mechanisms (motorized movable rollers one between each two color units) can accomplish the same purpose providing the range is equal to or more than one repeat length of the press.

Encoder 132 is attached to the line shaft so that one complete revolution of the encoder represents one complete revolution of the printing cylinder. Encoder 132 encodes one complete revolution of the image represented by the circumference of any of the five printing cylinders 103 through 107 which are registered to each other. All printing cylinders and cutting cylinders have a one to one relationship with encoder 132.

Rollers 146 and 147 are mounted on a movable mechanism of conventional design which are moved by motor 148 in a manner as to steer the web laterally to align it to the printing units.

The printing machine describes a combination registered printing process on both sides of the web with a registered coating process and a registered cutting process. All of the features of the machine are of conventional design and known to those skilled in the art. FIG. 1 will be used to describe the contextual framework in which the many novel features of the invention may be utilized.

Exemplary Embodiment Components Description

Figure 2:
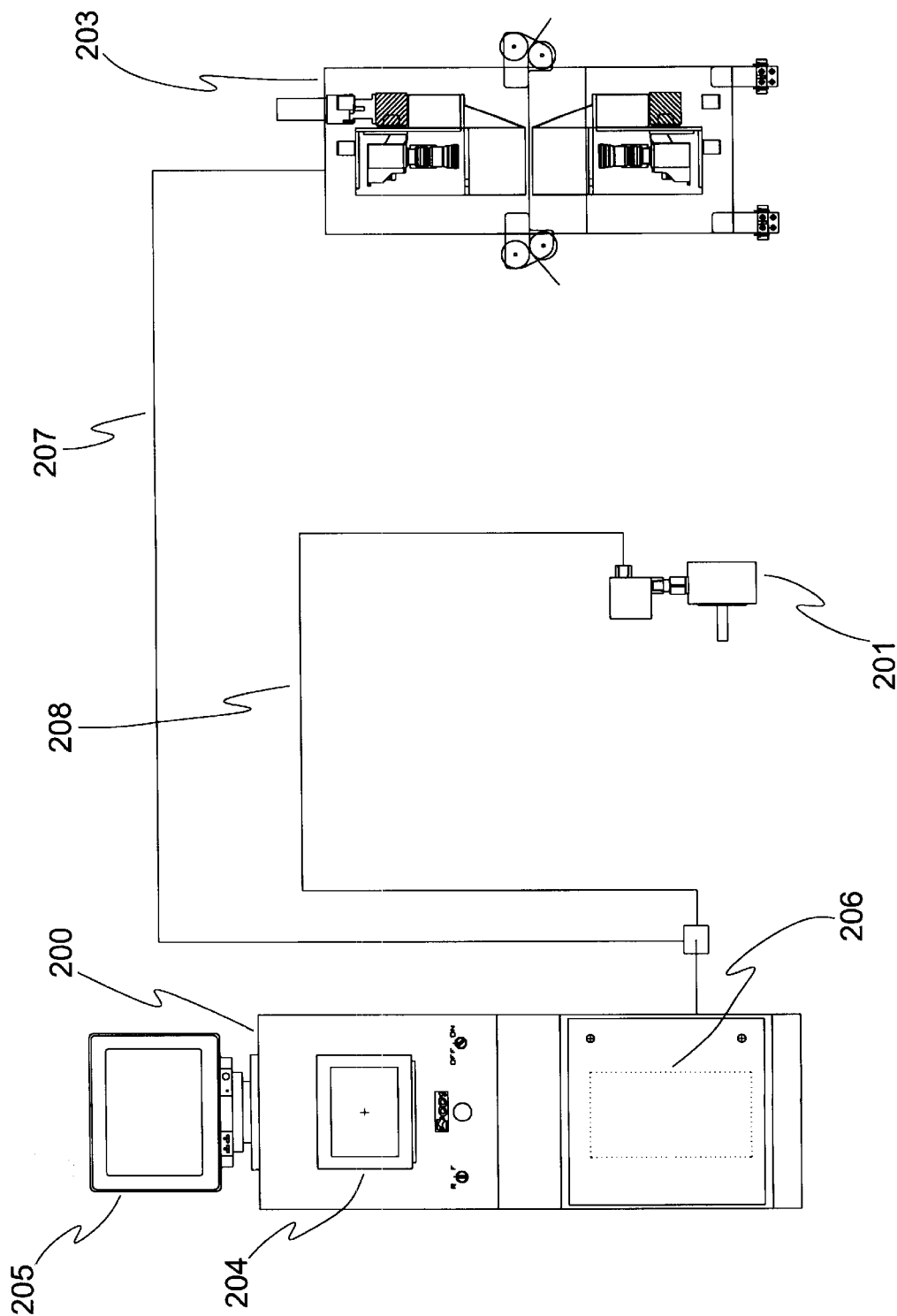
FIG. 2 illustrates the main components used to practice an exemplary embodiment of the invention.

The following discussion concerns FIG. 2 which shows the three main components, console 200, machine mounted encoder 201, and camera traverse 203 used to practice the invention. These components are equivalent to commercially available components from CC1 of Manchester, N.H., USA and sold as their Model 100HP Image Processor. Other exemplary commercial sources of this equipment include Fife Corporation, P. 0. Box 26508, Oklahoma City, Okla. 73126, as well as BST Pro Mark, 650 W. Grand Ave., Elmhurst, Ill. 60126-9359.

Figure 4:
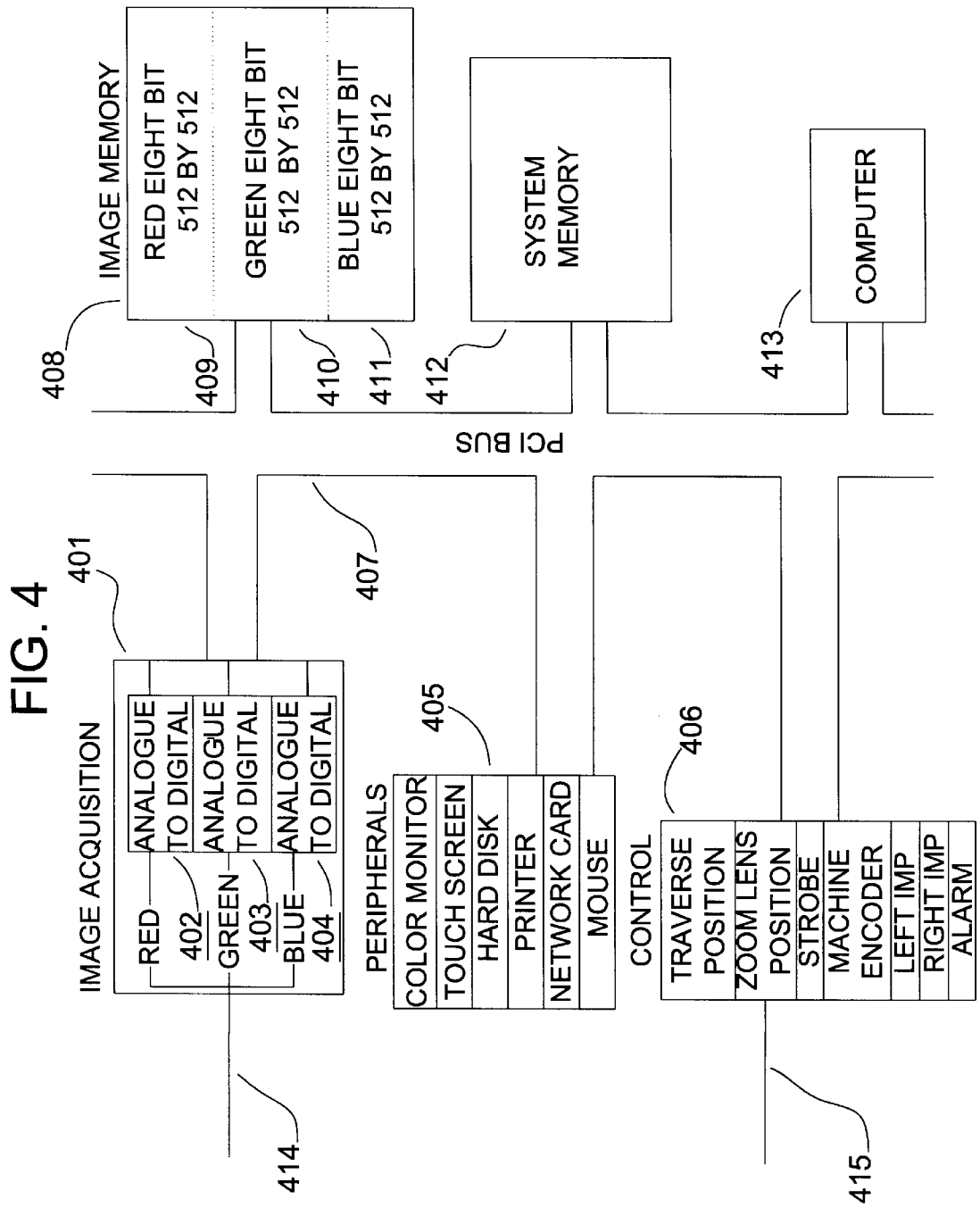
FIG. 4 illustrates the computer system interface used in the currently preferred exemplary invention embodiment.

Console 200 comprises a touch screen operator interface 204, a high resolution color monitor 205 for viewing images, and a powerful image processing computer 206 further detailed in FIG. 4. The console is electrically connected 208 to encoder 201 and also electrically connected 207 to camera traverse 203. Encoder 201 is mechanically mounted on the machine one-to-one with the repeat operation of the machine as illustrated via the shaft 112 and encoder 132 combination in FIG. 1. That is, one revolution of the encoder equals one revolution of the printing cylinder or mechanical operation such as a sheeter, diecutter, or perforation unit, which is exemplified as 108 in FIG. 1. A double camera traverse 203 is mounted on the printing machine and electrically connected 207 to console 200.

Camera traverse system 203 corresponds to 109 in the FIG. 1 general printing system and is typically mounted in a location where all operations that are performed on the printed material can be viewed by a web production operator. These operations can include lateral and circumferential register of printed colors, as well as mechanical operations performed on the printed web (cutting, punching, perfing, etc.).

Camera and Strobe Image Traversing Mechanism

Figure 3:
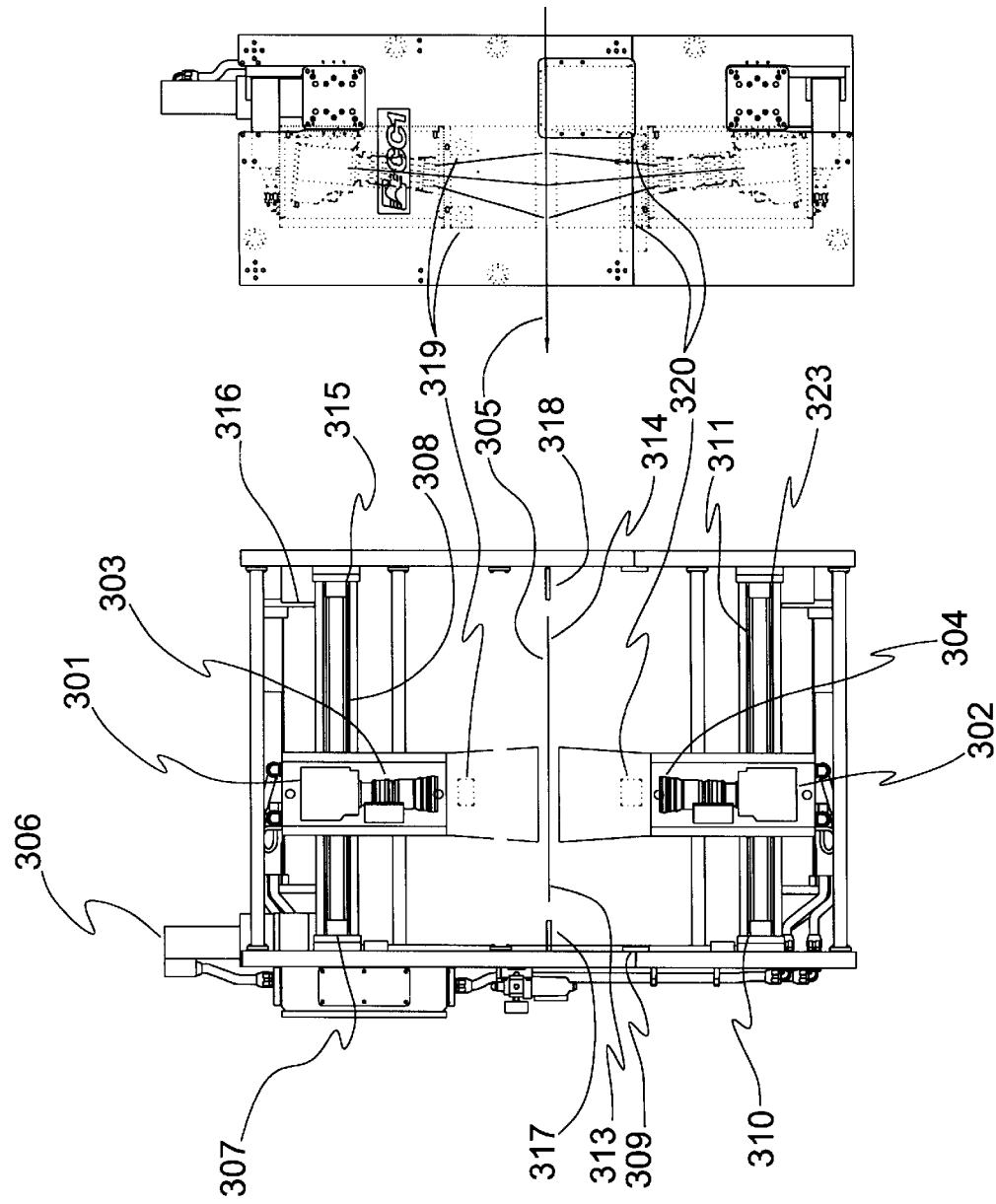
FIG. 3 illustrates a more detailed view of a typical image capture position traversing mechanism. In this exemplary embodiment the image capture device is a camera system with zoom lens.

FIG. 3 shows a more detailed drawing of the two camera system 109 shown in FIG. 1 and 203 in FIG. 2. The two camera traversing mechanism is equivalent to that manufactured by CC1, Inc. of Manchester, N.H., USA and sold as their Model IP-100HP. Two cameras 301 and 302 are mounted so that they can view either side of the printed or coated web substrate 305. Zoom lens 303 is attached to camera 301 and zoom lens 304 is attached to camera 302.

The zoom lens is a commercially available motorized unit as manufactured by Fujinon or Cannon with a 16:1 zoom ratio. Note that while a 16:1 zoom lens ratio is used in the exemplary embodiments disclosed herein, nothing in the spirit of the invention limits the zoom lens to this configuration. In fact, different zoom lens ratios may be used within the same inspection/control system, depending on the range of their multifunction use. The presently preferred embodiments use a 16:1 ratio because these lenses are readily available at reasonable cost, while higher zoom ratios are considerably more expensive.

Note that the use of image processing in conjunction with the lower zoom lens ratios permits an effective increase in usable image resolution for the purposes of center registration calculation. This combination of inexpensive hardware coupled with image processing software helps to improve the overall cost/benefit ratio of the disclosed system embodiments implementing the Zoom Calibration method in conjunction with web inspection/control functions.

The cameras are commercially available cameras manufactured by Sony Corporation such as their DXC 950. This camera is preferred as it has the highest resolution camera available using three solid state charge coupled devices (CCD) which provide full RGB (Red, Green, Blue) color.

Stroboscope 319 is mounted in a manner to illuminate the maximum field of view of top camera assembly 301 and zoom lens 303 and stroboscope 320 is mounted in a manner to illuminate the maximum field of view of the lower camera assembly 302 and zoom lens 304.

While 319 and 320 indicate only two stroboscopes (one for top web inspection and one for bottom web inspection), the presently disclosed invention embodiments envision configurations in which there may be fewer or additional stroboscopes. Applications in which this may be useful are cases in which filters are placed over the stroboscopes to permit individual detection of RED, GREEN, and BLUE colors. In this configuration, firing an stroboscope covered with a given color filter would allow color discrimination with the same image capturing device. This disclosure envisions no restriction on the type and spectral transparency characteristics of the filter used in combination with the stroboscopes. Thus, a variety of filter types may be useful in circumstances which require special spectral detection methods, such as in multi-color security printing.

Cameras 301 and 302 are mounted on traversing mechanisms 308 and 311. Each traverse includes a precision continuous steel impregnated belt driven by sprockets 307 and 315 for upper traverse 308 and sprockets 310 and 323 for the lower traverse 311. The two traverses are linked together by drive shaft 309 and driven laterally by motor 306. The traverse width is selected to provide sufficient lateral travel to view the maximum web width plus sufficient additional travel to view each of the reference sample Zoom Calibration plates 317 and 318. While two Zoom Calibration plates are shown in FIG. 3, there is in theory no upper or lower limit to the number of Zoom Calibration reference plates which may be used in conjunction with a given traverse. Furthermore, the Zoom Calibration reference plates may be of different configurations to provide different types of calibration standards for a given traverse configuration.

While two motors could be supplied enabling each camera to be positioned separately, there are a number of significant advantages of mechanically linking both cameras. With robust traversing mechanisms and with the cameras linked together, they will track the entire lateral distance phased together. By taking simultaneously images and with the center pixels of each camera mechanically aligned, front to back register can be viewed and using Zoom Calibration reference mark patterns (illustrated in FIG. 6, FIG. 7, FIG. 8, and FIG. 9) an automatic front to back register can be achieved. Another advantage of linking the cameras together is that this enables the complete initial register of all back printing stations to the front printing stations as will be explained.

Zoom Calibration reference mounting plates 317 and 318 are mounted at each extreme end of the traverse beyond the maximum travel required to view each end of the web material. These mounting plates are included and used to attach a precision reference for calibrating the zoom position. Two reference plates are included to provide the shortest distance for the traverses to move. That is, if the register marks are located at the left side of the web, reference marks mounted on reference mark plate 317 would be used, if the register marks are located at the right side of the web, reference marks mounted on reference mark plate 318 would be used.

Note that with respect to phasing of the camera systems 303 and 304, the use of Zoom Calibration reference plates 317 and 318 permits the origin/extent coordinates of each camera system to be initialized at either end of the traverse. This reference, when used in conjunction with subsequent teachings in this disclosure, enable accurate distance differentials between the 303 and 304 camera systems to be determined over the entire range of phased traverse motion.

Optical encoder 316 is attached to the center of sprocket 315 so as to encode the lateral position of both traverses. The number of counts per revolution of the encoder is selected at 1000 counts per revolution which enables encoding the lateral position of the cameras to within 0.001 inch which is sufficient for this application.

The two camera assembly is positioned by the computer 206 and appropriate software with the final or stopped position read from the encoder to the nearest 0.001 inch.

Calibration of the zoom lens is performed from stationary reference samples mounted on Zoom Calibration reference plates 317 and 318 at each side of the traverse. Whenever the zoom ratio is changed, the traverse will be positioned over the accurately known Zoom Calibration reference marks taking an image from which Zoom Calibration will be performed according to the disclosed invention teachings.

Conventional Zoom Lens Construction/Positioning

Figure 29:
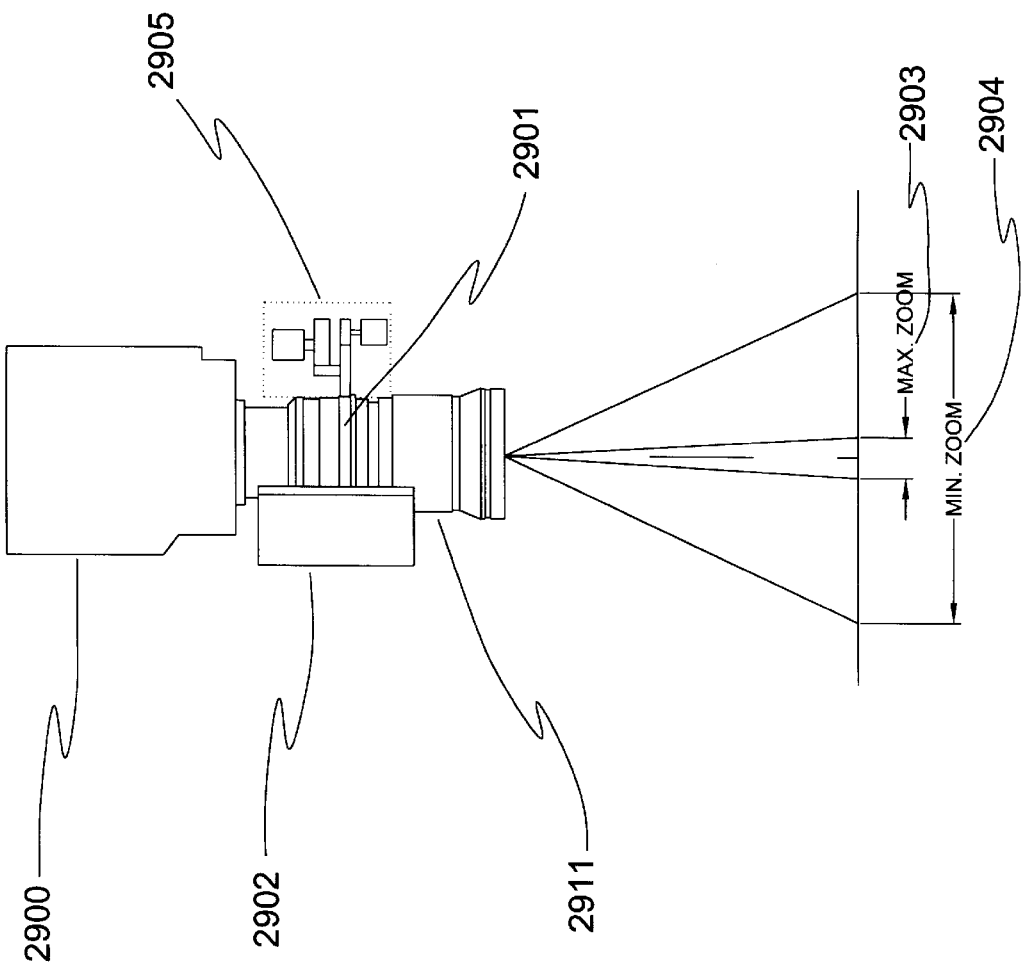
FIG. 29 and FIG. 30 illustrate an expanded view of a typical zoom lens camera system used in the exemplary image capturing invention embodiment of FIG. 3 (303 and 304).

FIG. 29 illustrates one preferred zoom lens system and image capture device, a Fujinon S16X 6.7 BMP-D18 Zoom Lens and 2911 a Sony 950P 3 CCD camera. This lens will provide a 16× magnification and as used provides for a 0.5 inch to 8.0 inch field of view in the X direction. Motorized assembly 2902 provides for remote movement of the zoom, focus, and iris. The dotted outline 2905 is a gear schematic of the gear drive to the zoom lens contained in housing 2902. This assembly meshes with the zoom drive gear 2901.

Figure 30:
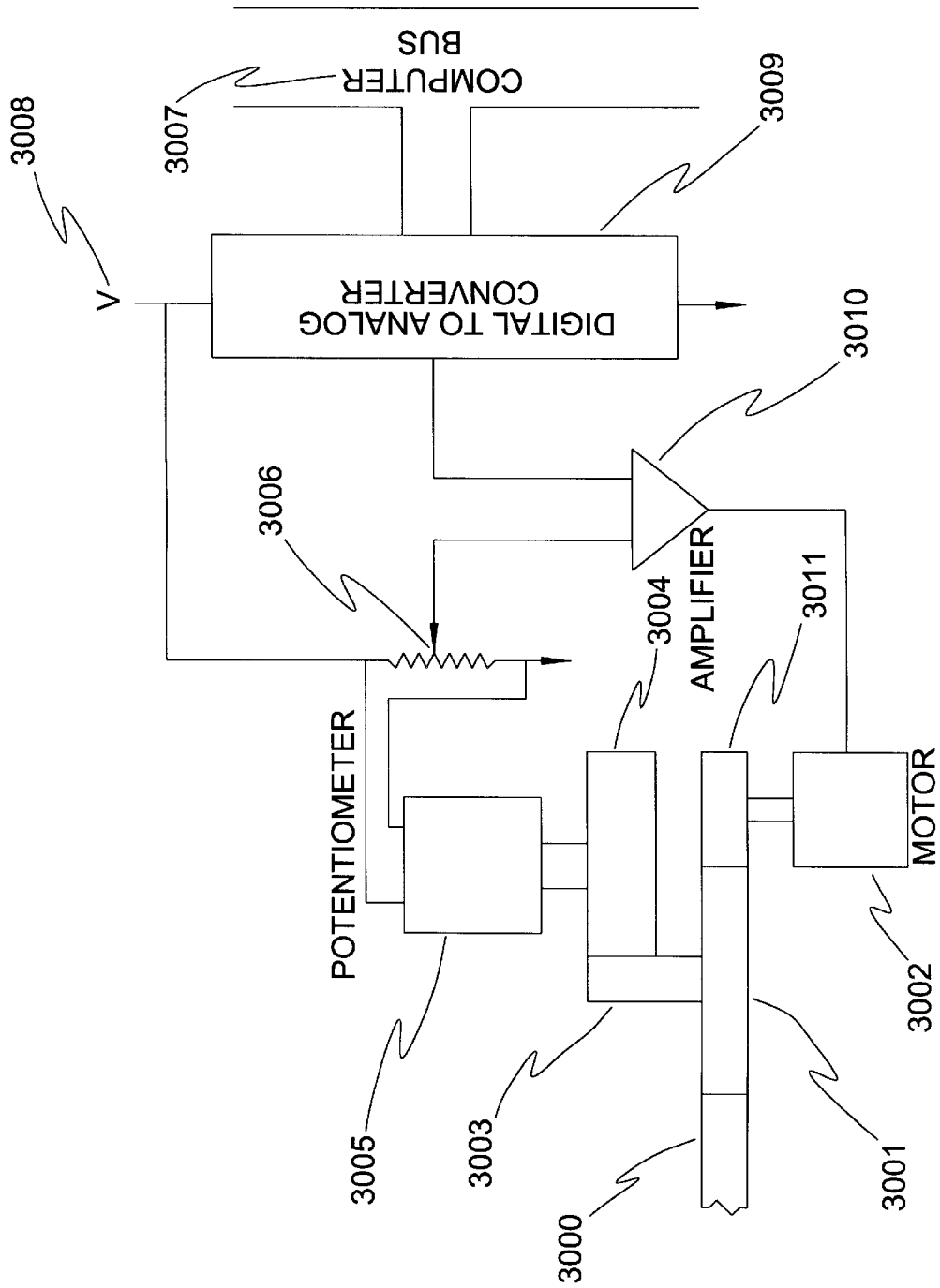

FIG. 30 is an enlarged view of gear schematic (2905 FIG. 29) showing gear 3001 engaging zoom gear (2901 FIG. 29) shown partially as 3000. Intermediate gear 3001 engages gear 3011 attached to servo motor 3002. Additional gears 3003 and 3004 are required to provide the correct ratio for the feedback potentiometer 3005.

Note that there are two gear meshes between zoom lens gear 3000 and the potentiometer gear 3004. They are between zoom gear 3000 and gear 3001 and between gear 3003 and 3004. The gears are made of nylon. The servo motor 3002 is a small high speed DC motor driven by amplifier 3010. The circuitry is of conventional design with an analog output voltage from converter 3009 as one input to amplifier 3010 and the other a voltage from feedback potentiometer 3006. The motor will drive zoom lens based on the voltage from feedback potentiometer 3006 which is very nearly equal to the voltage from the digital-to-analog converter 3009.

The input to converter 3009 is an eight bit digitally encoded number which is converted to an analog voltage with 256 discrete steps from zero to the maximum voltage provided by the voltage V at node 3008. This same voltage is applied to the winding of potentiometer 3006 so that any variation in V is canceled. This mechanism is quite crude and subject to accelerated wear. Accelerated wear, temperature and inaccurate positioning do to the crude positioning mechanism are important factors why the zoom lens cannot be used for accurate distance measurement without calibration as disclosed and taught in the Zoom Calibration method.

The drive and feedback system chosen in FIG. 29 and FIG. 30 results in rapid but inaccurate image capture device positioning. The fast lens positioning speed is ideal for this application as it minimizes the loss of real time in positioning the lens. With Zoom Calibration of the lens an accurate distance measurement can be achieved as well as fast response.

Computer System and Interface Architecture

FIG. 4 is a schematic representation of the computer interface to all components associated with the disclosed invention exemplary embodiments. The computer is a standard personal computer such as manufactured by Intel including the high speed PCI bus 407. This computer includes a preferred high speed processor 413 which is the Intel Pentium Pro or Pentium II with MMX architecture for very high speed image processing.

The computer processor 413 controls all of the electromechanical components listed in 406 which together provide images as required for analysis. These controls are of conventional design including bus controlled stepper motor drivers for positioning the traverse, digital-to-analog (D to A) converters for positioning the zoom lens, machine encoder, and strobe driver all controlled through the PCI bus from instructions stored in the hard disk of peripherals 405. A touch screen control peripheral in 405 is the preferred method of operator interface as it is graphical and easily understood by the operator.

The camera is connected by cables 414 directly to a conventional frame grabber which captures images stored in computer memory 408 as Red, Green, and Blue.

All of the other components are connected via appropriate wiring interfaces 415.

All computer system components cited and their interface are conventional and easily understood by one skilled in the art of computer control and video digital technology.

Coordinate System Nomenclature

Figure 5:
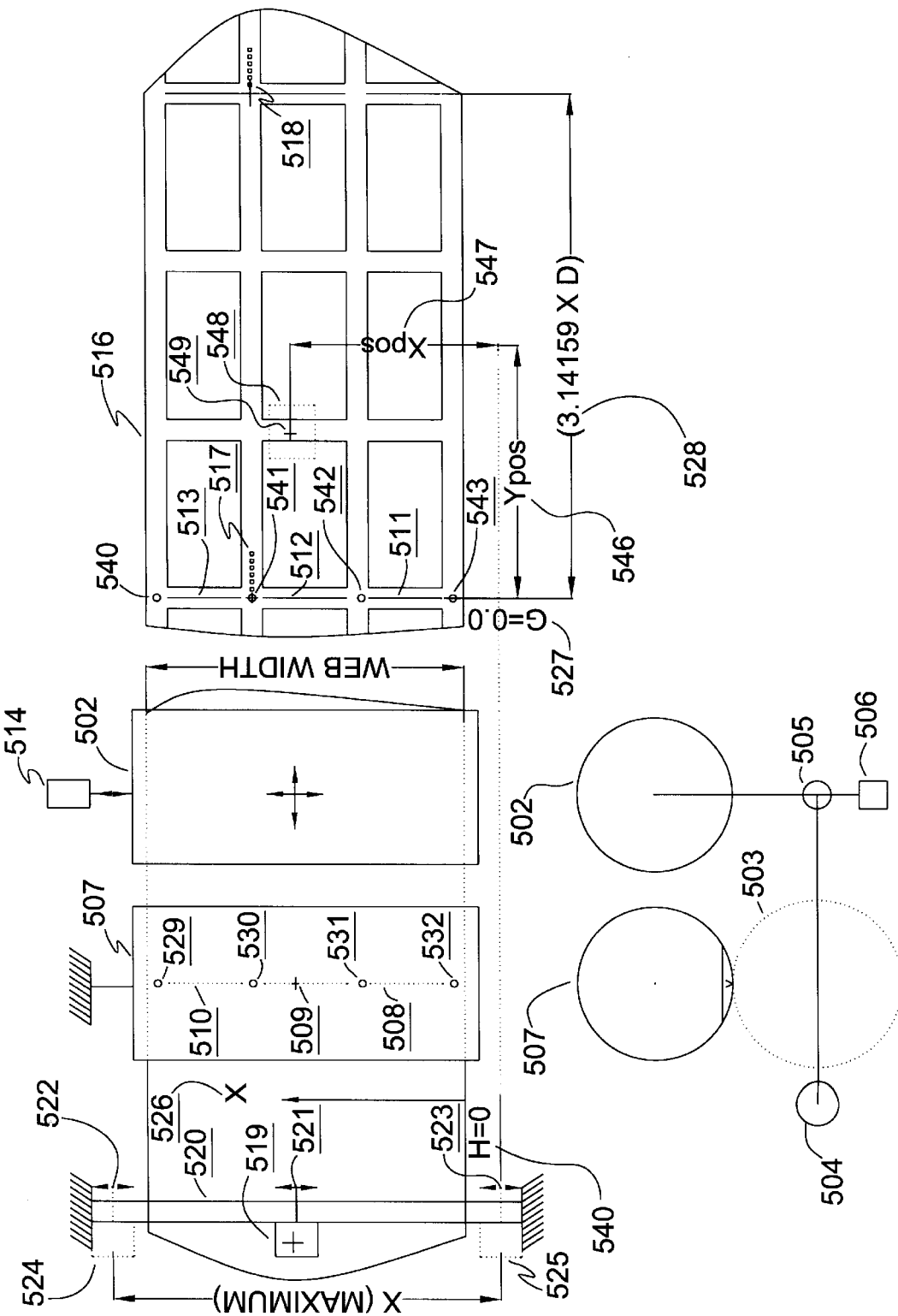
FIG. 5 illustrates a coordinate representation of the (X,Y) dimensions related to the web printing machine and printed web image.

FIG. 5 is a schematic representation of the coordinate system and nomenclature used in Table 3 to provide accurate distance measurement according to the novel teachings of the disclosed invention.

FIG. 5 illustrates an exemplary invention embodiment camera traversing unit composed of camera 519, traverse 520, and limit switch activator 521. When power is first applied the traverse motor will drive the traverse to one end with limit switch activator 521 closing limit switch 523. This position 540 represents H=0 in Table 3. The motor will then drive the traverse to the other extreme lateral position closing limit switch 522 representing the maximum travel of the camera in the lateral direction.

This maximum travel provides for moving the camera throughout the entire maximum web width plus the over-travel for the camera to view the Zoom Calibration reference plates 514 and 525 without the reference plates interfering with the edge of the web. In this manner all lateral encoder positions of the camera can be represented by a number from 0 to the maximum count determined by the maximum travel and the number of encoder holes per inch (H) (detailed in Table 3).

Die cutting cylinder 507 includes perforation rules 508, 509, and 510 which perforate the web substrate shown at 511, 512, and 513 respectively and include file hole punches 529, 530, 531, and 532 which punch the web substrate at 540, 541, 542, and 543 respectively. Cylinder 507 is fixed in both the X and Y directions which require that all printing units must be registered to the diecutting cylinder.

Encoder 504 is mechanically attached to die cutting cylinder 507 with one revolution of the die cutting cylinder corresponding to one revolution of the encoder. Encoder 504 for this discussion has one track of 1000 pulses per revolution and another track with one pulse per revolution, although other configurations and pulse counts are possible with no loss of system functionality. This track provides the zero reference so that that the same count number will already represent the same mechanical position. In FIG. 5 the zero reference pulse in the Y direction occurs at the G=0 527 cylinder hole at time of strobe trigger (detailed further in Table 3).

The image area or field of view is shown as 548 with a selected pixel 549. The distance to this pixel from Table 3 is $X_{POS}$ 547 and $Y_{POS}$ 546.

Printing cylinder 502 is mechanically coupled, one to one, with die cutting cylinder 501 and includes provisions for mechanical adjustment both laterally through motor 514 and circumferentially through motor 506. Motor 506 introduces circumferential correction to cylinder 501 thorough the mechanical differential 505 which provides 360 degree correction. In this manner printing cylinder 502 can be brought into register with die cutting cylinder 507.

Thus it can be appreciated that any object on the repeat image 516 introduced by printing cylinder 502 and die cutting cylinder 507 can be recognized by image analysis with the coordinates ($X_{POS}$,$Y_{POS}$) determined to within one pixel on the monitor and to within one count on the traverse encoder.

Register Mark Patterns—Multiple Printing Units

FIG. 6 through FIG. 9 are printed register mark patterns that are used for measurement and control of circumferential and lateral register.

Figure 6:
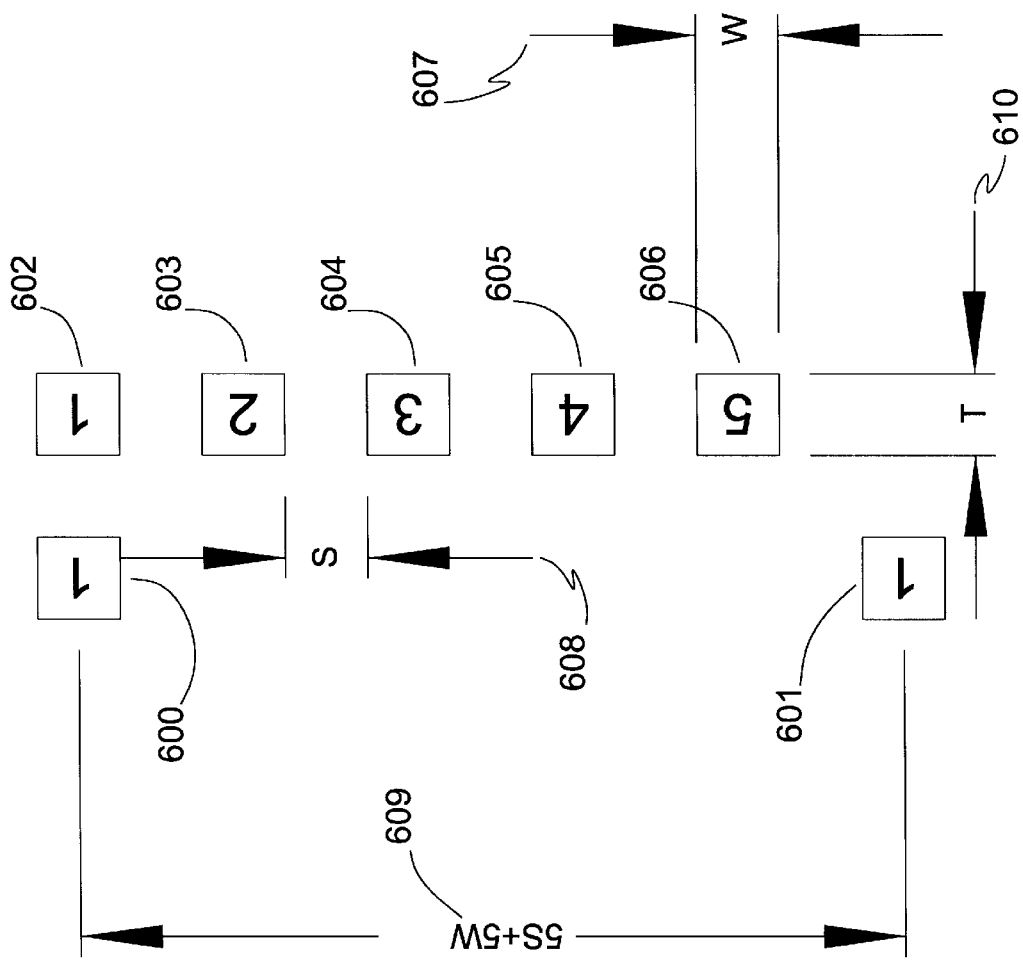
FIG. 6 illustrates a vertical web register mark pattern with a stationary distance reference. Note that FIG. 6 may be combined with any of the mark patterns illustrated in FIG. 7, FIG. 8, or FIG. 9 to form a hybrid mark pattern suitable for use with the teachings of this disclosure with no loss in generality. Specifically, the arrangement alignment (horizontal, vertical, or other) between the reference marks and web printing marks illustrated in FIG. 6 should not be limited to the configuration shown.

FIG. 6 is a register mark pattern for a total of five separate printing units. The mark pattern is arranged vertically with each mark 602, 603, 604, 605, and 606 printed by a different printing unit. While the mark pattern shows the marks and printing units arranged in sequence, any printing unit can be programmed to any mark position. Mark position 1 could just as easily be printed by printing unit 2, 3, 4, or 5. Also, marks may be omitted if there are less than five colors being printed. The distance between the reference marks would nonetheless stay the same in all configurations. Marks 600 and 601 serve as the known accurate reference distance used in the zoom lens calculation and are typically distanced and positioned as a multiple of the minimum inter-color registration distance 609. These two reference marks 600 and 601 are located on the mark Zoom Calibration reference plates 317 or 318. In this example the reference marks are spaced apart by 609 (5S+5W) as dictated by mark spacing 608 (S) and mark width 607 (W). Zoom Calibration reference mark distance 609 is the spacing between the center the two reference marks 600 and 601.

Figure 28:
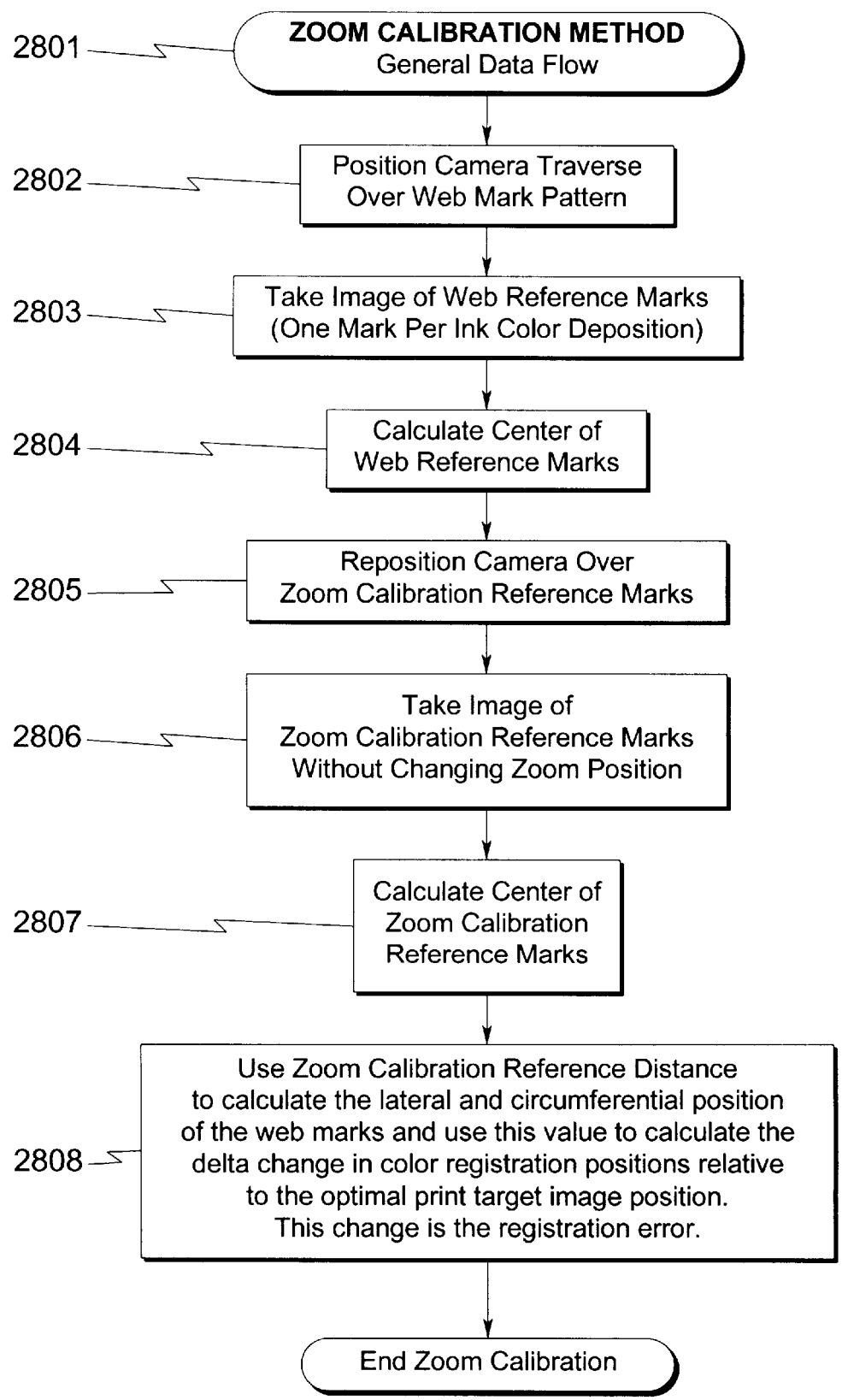
FIG. 28 illustrates a general data flow software flowchart for the Zoom Calibration Method as applied to the common production problem of initial register. The process illustrated in this software flowchart is only illustrative of the many possible embodiments of the Zoom Calibration method.

The procedure for measuring the mark distances is illustrated in the software flowchart of FIG. 28 starting at step 2801 and detailed as follows:

(1) Position the camera traverse over the mark pattern (step 2802).
(2) Take an image of marks 602, 603, 604, 605, and 606 (step 2803).
(3) Calculate the center of web reference marks using standard image processing techniques (step 2804).
(4) Reposition the camera over the reference marks 600 and 601 (step 2805).
(5) Take an image without changing the zoom position (step 2806).
(6) Calculate the center of the Zoom Calibration reference marks (step 2807 ).
(7) Use the reference distance in the calculation of the lateral and circumferential position of the marks and use this value to calculate the change in positions relative to the stored position which is the registration error (step 2808).

The distance between marks (S) shown as 608, and the size of the marks (W) 607 and (T) 610 respectively are fully programmable and can be any size consistent with the printing process and accuracy required.

Marks size ideal for the offset printing process are about 0.3 millimeters square. In the flexographic printing process the marks are larger because of the lower resolution of that process. The marks can be of any shape such as circular or polygonal. However, straight edges are preferred as they reduce computer processing time using standard image processing edge detection algorithms. Further information on image processing edge detection algorithms is available in the published art. See John C. Russ, Derivatives, THE IMAGE PROCESSING HANDBOOK, ISBN 0-8493-4233-3, pp. 119–121.

Register Mark Patterns—Inline Mark Optimization

Figure 7:
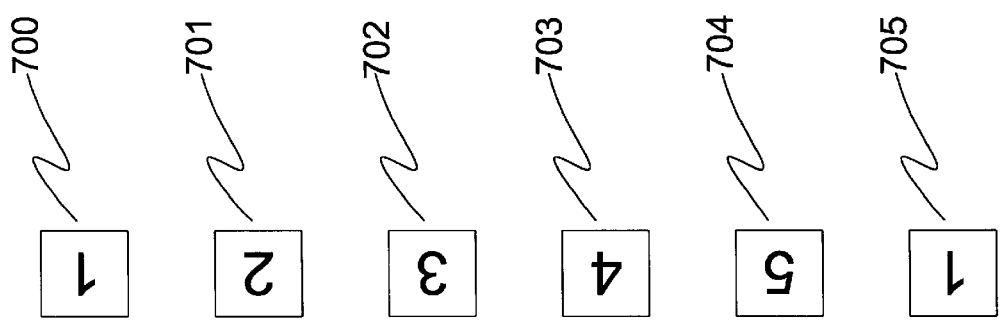
FIG. 7 illustrates a vertical web register mark pattern with the distance reference included in the mark pattern. Note that FIG. 7 may be combined with any of the mark patterns illustrated in FIG. 6, FIG. 8, or FIG. 9 to form a hybrid mark pattern suitable for use with the teachings of this disclosure with no loss in generality. Specifically, the arrangement alignment (horizontal, vertical, or other) between the reference marks and web printing marks illustrated in FIG. 7 should not be limited to the configuration shown.

FIG. 7 is a mark pattern similar to FIG. 6 but with reference mark 705 added to the mark pattern and printed by the same printing station as that which prints the mark in mark position 1. That is, the Zoom Calibration reference marks are now included in the mark pattern which enables the zoom to be calibrated using the same image as that which captures the marks. The advantage is a time saving as the traverse does not have to be repositioned over the reference mark pattern each time the zoom position is changed.

Register Mark Patterns—Horizontal Alignment

Figure 8:
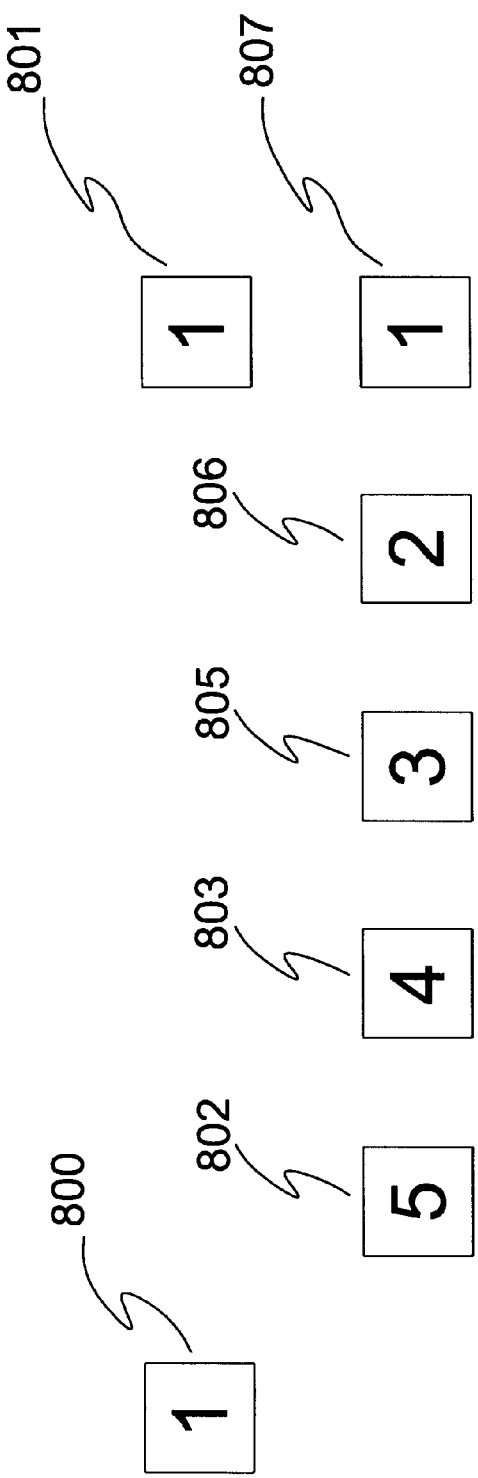
FIG. 8 illustrates a horizontal web register mark pattern with a stationary distance reference. Note that FIG. 8 may be combined with any of the mark patterns illustrated in FIG. 6, FIG. 7, or FIG. 9 to form a hybrid mark pattern suitable for use with the teachings of this disclosure with no loss in generality. Specifically, the arrangement alignment (horizontal, vertical, or other) between the reference marks and web printing marks illustrated in FIG. 8 should not be limited to the configuration shown.
Figure 9:
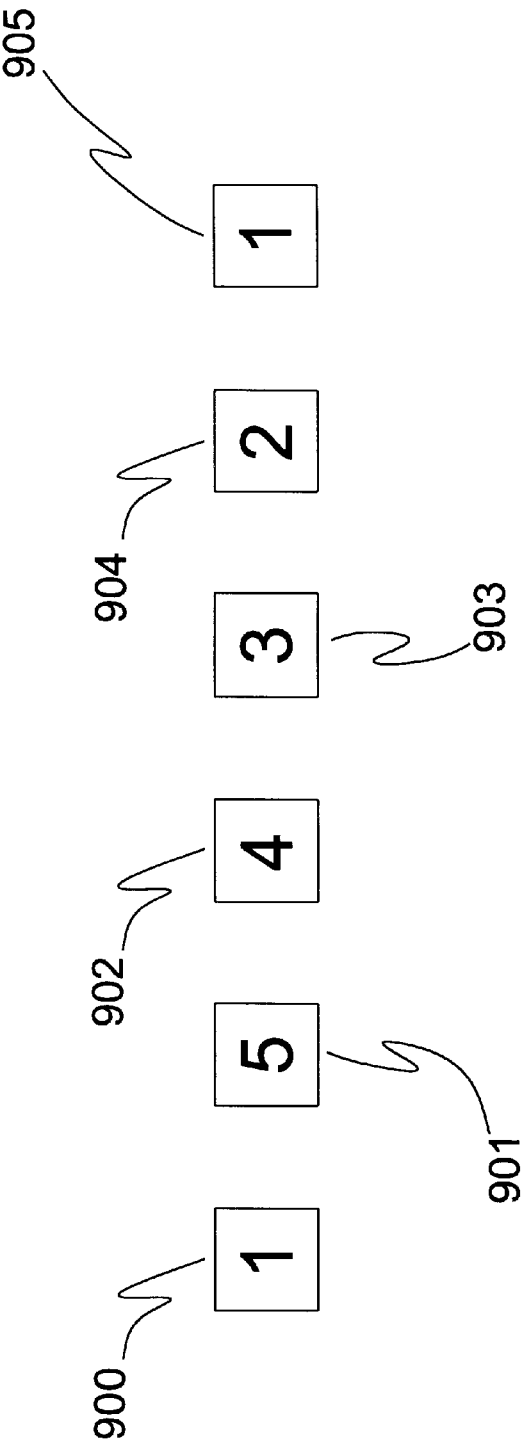
FIG. 9 illustrates a horizontal web register mark pattern with the distance reference included in the mark pattern. Note that FIG. 9 may be combined with any of the mark patterns illustrated in FIG. 6, FIG. 7, or FIG. 8 to form a hybrid mark pattern suitable for use with the teachings of this disclosure with no loss in generality. Specifically, the arrangement alignment (horizontal, vertical, or other) between the reference marks and web printing marks illustrated in FIG. 9 should not be limited to the configuration shown.

FIG. 8 shows a similar pattern to FIG. 6 but with the marks arranged in a horizontal pattern. Marks 800 and 801 are reference marks installed on the Zoom Calibration reference mark plates, 317 and 318. FIG. 9 is the same mark pattern with the Zoom Calibration reference marks 900 and 906 as part of the printed pattern.

Note that a variety of marking patterns are possible for the Zoom Calibration reference plate. While FIG. 6 through FIG. 9 provide several typical examples, the Zoom Calibration reference plate marks may also take the form illustrated in FIG. 23. Here the mark sizes and relative spacings are chosen to provide for useful calibration metrics over the entire 16:1 zoom ratio range of the zoom lens. This permits calibration at the outer zoom ratios where the resolution of the zoom optics is reduced. A significant advantage to this method of Zoom Calibration is in the ability to detect gross web features, such as perf marks, for automatic initial registration purposes.

Additionally, it must be noted that the use of both horizontal and vertical web markings within the context of FIG. 7 and FIG. 9 has the advantage of providing a method of calibrating the zoom lens to the horizontal markings 900–905 (which are relatively free from web stretch), and subsequently using this calibration with the vertical marks 700–705 (which are highly subject to web stretching) to calculate the actual amount of web stretch occurring at any instant in the manufacturing process. This information can be used to regulate the web tension and also compensate for differentials in required mechanical operations (such as perf or punching) as they relate to ink deposition. Note also that web stretching due to vertical tension is also a factor in calculating the repeat length of a given web section.

Initial Register

Manual Procedure Overview

Another feature of Zoom Calibration is the method of obtaining initial register with all printing units and the die cutter positioned randomly. During this initial register procedure a conventional web printing operation would manually adjust the mechanical aspects of the printing operation with the ink deposition machinery to ensure that color registration is accurate and that punching, perfing, and scoring operations are properly synchronized with ink deposition. Initial register is an important economic aspect of any printing process, as the time required to perform this mandatory operation requires product material which must be sacrificed until proper register is achieved. Thus, the printed web manufacturer has incentive to reduce or eliminate initial register time, as this results in less wasted material before production-worthy product may be generated.

Figure 10:
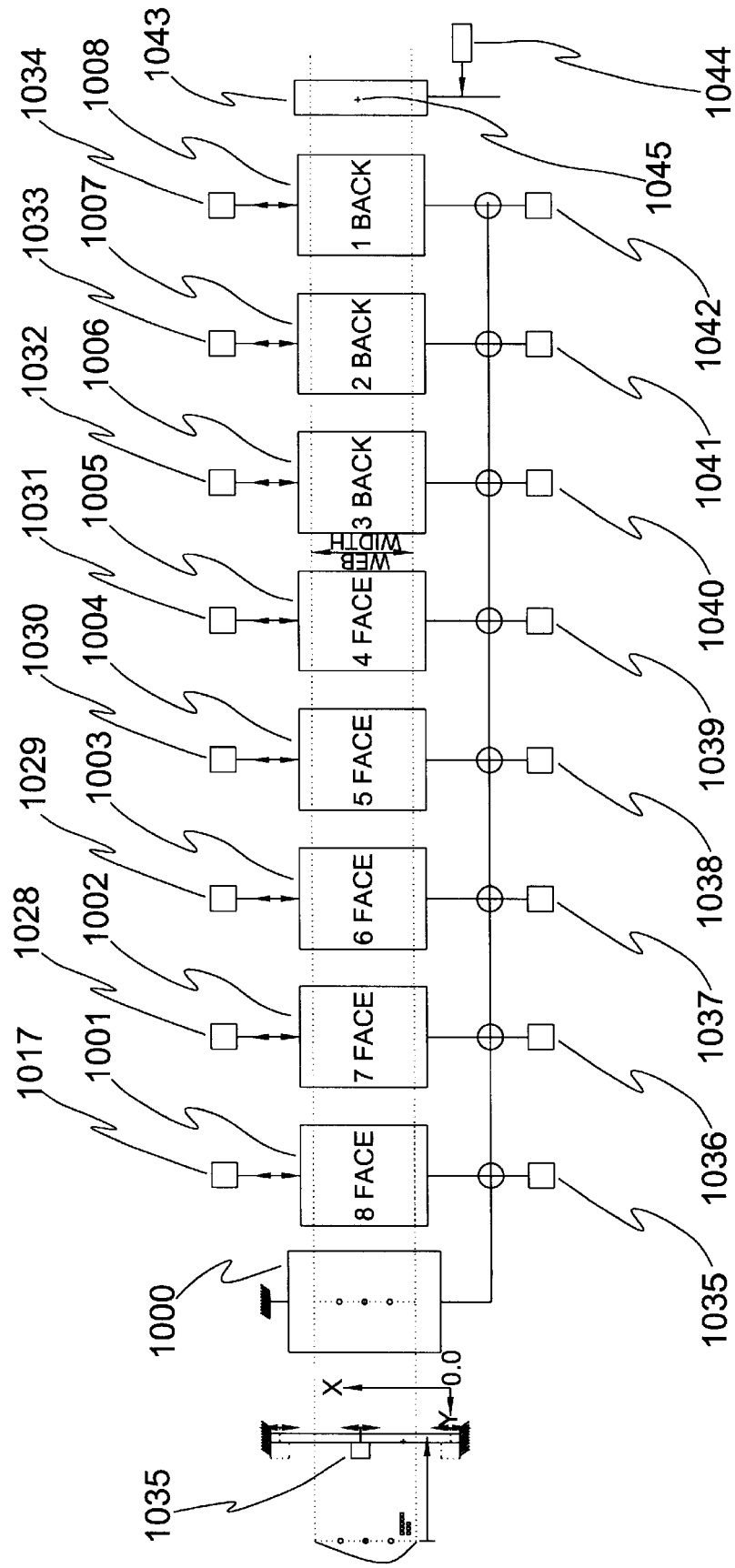
FIG. 10 illustrates a diagram used to describe complete initial register of the web printing machine, such as may be implemented when applying the innovative teachings of this disclosure to a typical multi-stage printing process. Note that nothing in the teachings of this document limit the numerical range of print stations which may be used in application of the Zoom Calibration method. The system of FIG. 10 is an exemplary production manufacturing configuration, but many other variations are possible with no loss of generality.

FIG. 10 is a schematic representation of a printing press that prints four colors on each side of a web, has a diecutting operation at the end of the printing process which might be a round hole such as used to insert a straw for liquid filled cartons, or a line hole used to pin feed printed forms into a computer. This is a common press configuration for the printing of computer forms or direct mail. These presses usually have replaceable printing cartridges which enable the printing of different repeat lengths. When changing from one repeat length to another a great deal to time is consumed in obtaining initial register of all of the printing units and the diecutting station.

FIG. 10 is representative of a printing press that prints five colors on the face side of the web with color units 1001, 1002, 1003, 1004, and 1005 and three colors 1006, 1007, and 1008 on the back side of the web in register with file holes punched by rotary punch 1000. Punching unit 1000 has no provisions for either lateral or circumferential register adjustment. All printing units must therefore be brought into register in both the lateral and circumferential directions to the fixed punching unit. Lateral steering mechanism 1043 controlled by motor 1044 provides the means for moving the web laterally to align it to the fixed punching unit.

Referring to FIG. 10, camera traversing unit 1035 (further detailed in FIG. 3 and FIG. 5) provides the means for measuring and correcting the register for all color units laterally though motors 1017, 1028, 1029, 1030, 1031, 1032, 1033 , and 1034, and circumferentially thorough motors 1035, 1036, 1037, 1038, 1039, 1040, 1041, and 1042 plus lateral alignment of the web to the die through motor 1044. These motors are used for automatic control of fine register adjustments and for initial register of the ink deposition system and punch mechanics.

Perfect Register Example

Figure 11:
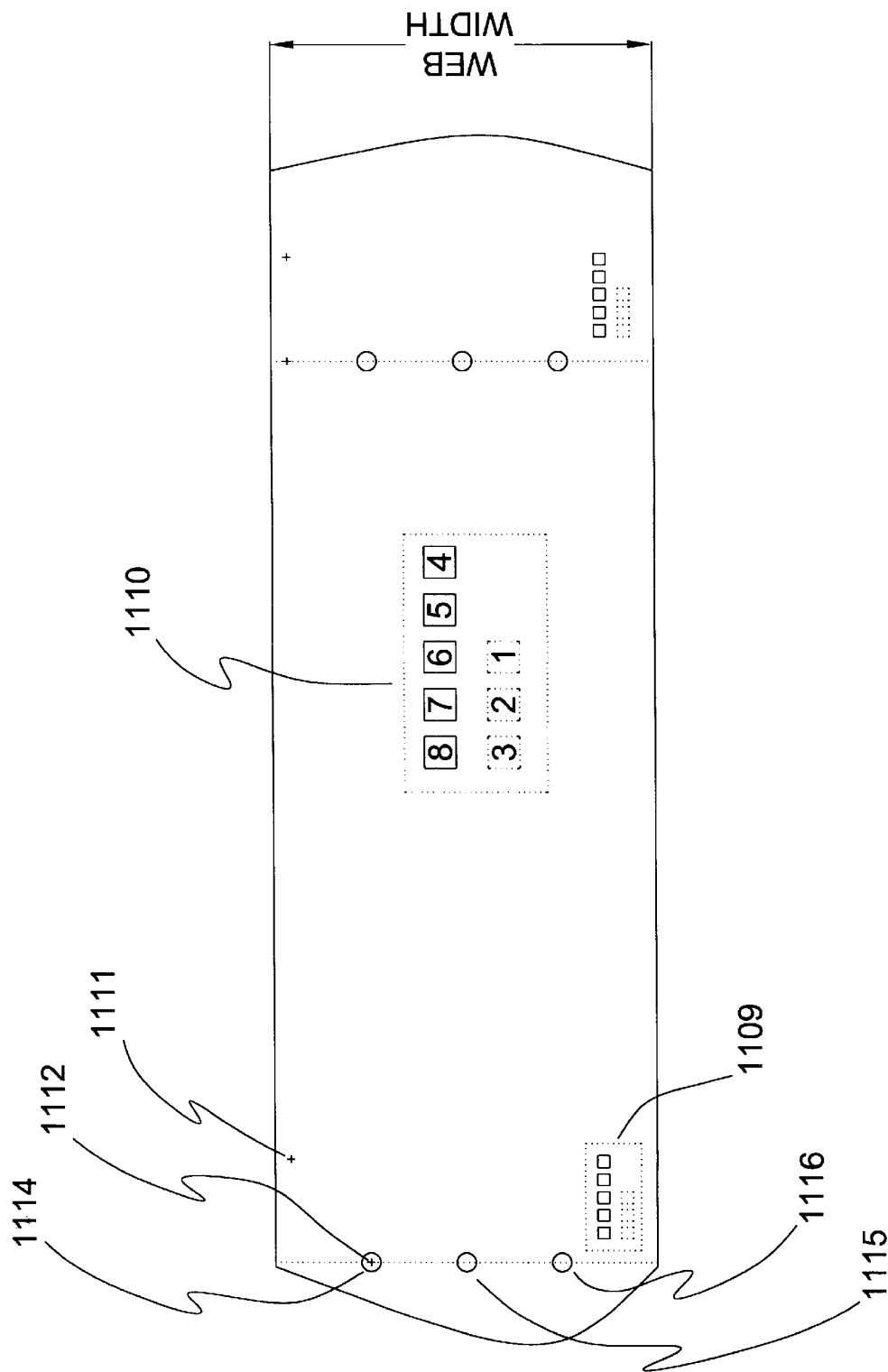
FIG. 11 illustrates the desired perfect registration in a normal printing or web production process. The registration marks presented in this example may be of arbitrary shape and position using the Zoom Calibration method as herein disclosed.

FIG. 11 illustrates a product printed by the press in FIG. 10 that is in perfect register. Referring to FIG. 11, file holes 1014, 1015, and 1016 are shown to the left of FIG. 11 and represent the reference to which all color ink deposition stations are registered. When preparing the mechanical layout for the product represented by FIG. 11, crosshair 1112 and crosshair 1111 are included on the film used to make the plate for station number 8 which is 1001 of FIG. 10. Station 8 (1001) has been chosen for illustrative purposes as any of the other stations could be used to provide this registration mark. Crosshair 1111 is also included on all other printing plates both face and back in the same location. When the product is in register, all 1111 crosshairs will be superimposed and crosshair 1112 will be centered within file hole 1114.

Startup Registration

Figure 12:
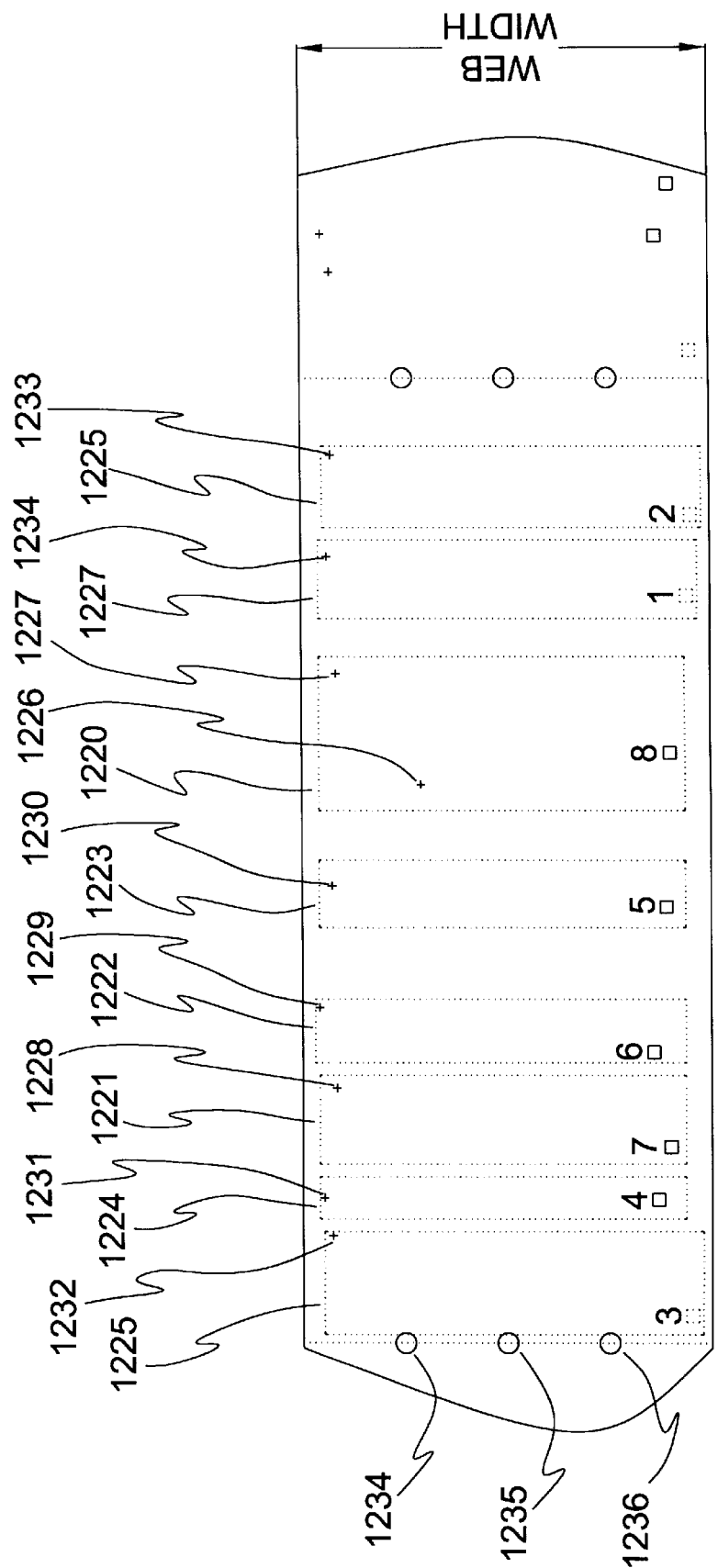
FIG. 12 illustrates the startup registration procedure stations as detailed later in this specification. Note that prior to web printing registration, the positions of the registration marks are randomly distributed throughout the surface of the printed web.

FIG. 12 is the same product as illustrated in FIG. 11 upon startup when all cylinders are inserted without regard to registration. The positions of the crosshairs and Zoom Calibration registration marks printed by each station in the example of FIG. 12 are shown within the dotted boxes with the marks printed by station 8 as box 1220, station 7 as box 1221, station 6 as box 1222, station 5 as box 1223, station 4, box 1224, station 3 as box 1225, station 2 as box 1225, and station 1 as box 1227.

The following discussion is in reference to FIG. 12. The process of registering all of the color units 1 though 8 to the file hole may be described as:

(1) Move crosshair 1226 of station 8, 1001 FIG. 10 to the center of file hole 1234.
(2) Move crosshair 1228 of station 7, 1002 of FIG. 10 to the crosshair of 1227 of station 8, 1001 of FIG. 10.
(3) Move crosshair 1229 of station 6, 1003 of FIG. 10 to crosshair of 1227 of station 8, 1001 of FIG. 10.
(4) Move crosshair 1230 of station 5, 1004 of FIG. 10 to crosshair of 1227 of station 8, 1001 of FIG. 10.
(5) Move crosshair 1231 of station 4, 1005 of FIG. 10 to crosshair of 1227 of station 8, 1001 of FIG. 10.
(6) Move crosshair 1232 of station 3, 1005 of FIG. 10 to crosshair of 1227 of station 8, 1001 of FIG. 10.
(7) Move crosshair 1233 of station 2, 1007 of FIG. 10 to crosshair of 1227 of station 8, 1001 of FIG. 10.
(8) Move crosshair 1234 of station 1, 1008 of FIG. 10 to crosshair 1227 of station 8, 1001 of FIG. 10.
(9) In addition all color units 1 through 7 must move an additional amount in the circumferential direction equal to the distance determined in step (1) above.

The following is a very simple procedure for implementing the initial registration steps (1) through (9) above using Zoom Calibration and image processing equipment as detailed and described in FIG. 2 and FIG. 3.

Automatic Initial Register Process

Background

After all plates or cylinders have been installed at random, and after the press is running in the out of register condition, the results will look similar to FIG. 12.

Figure 13:
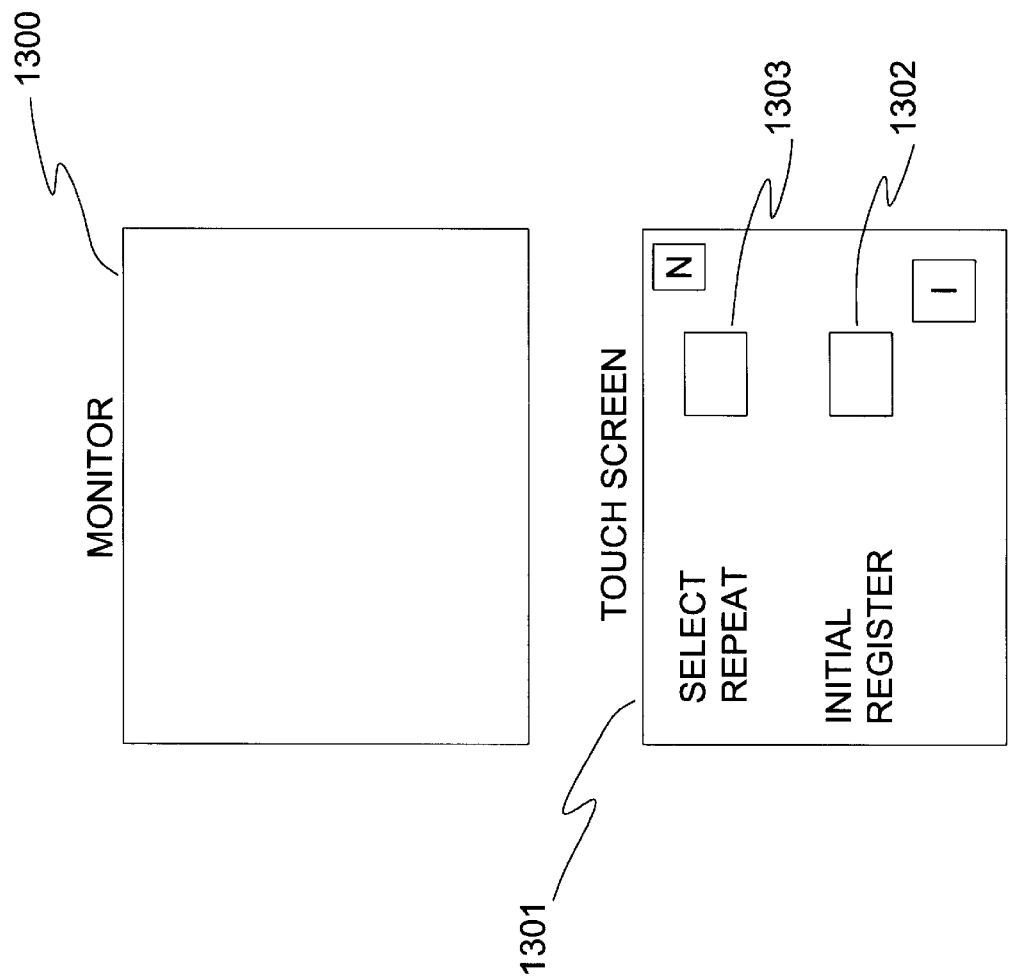
FIG. 13 through FIG. 22 represent the console interface display states depicting the interaction between an operator performing an exemplary initial register procedure and the 204 (FIG. 2) touch screen operator interface. Each step in the initial register operation when completed is entered by selecting (touching) the indicated area on the touch screen which automatically advances the touch screen menu to the next step in the initial registration process. Please note that these diagrams are meant to provide a system context depicting a preferred operator interface. Many other input/output interfaces are possible, and the teachings of the Zoom Calibration method do not depend specifically on the method of operator control (or even in fact on the presence of an operator as the system control agent). The preferred embodiment utilizes a touch screen interface because this method allows visualization of the system status on console display 205 (FIG. 2) in close proximity to the system control inputs on touch screen 204 (FIG. 2). This configuration is ergonomically efficient and results in reduced operator stress and fatigue and as such is preferred over conventional keyboard/console configurations, but does not preclude their use as alternate/additional operator interface means.

FIG. 13 includes a color display monitor 1300 for viewing the images obtained from the camera, a touch screen 1301 used to interact with the system as will be explained. Starting with FIG. 13 the first step is to enter the web repeat length by pressing 1301. A calculator menu will appear through which the operator enters the repeat length to three decimal positions. Thus a 23 inch repeat length would be entered as 23.000.

Figure 14:
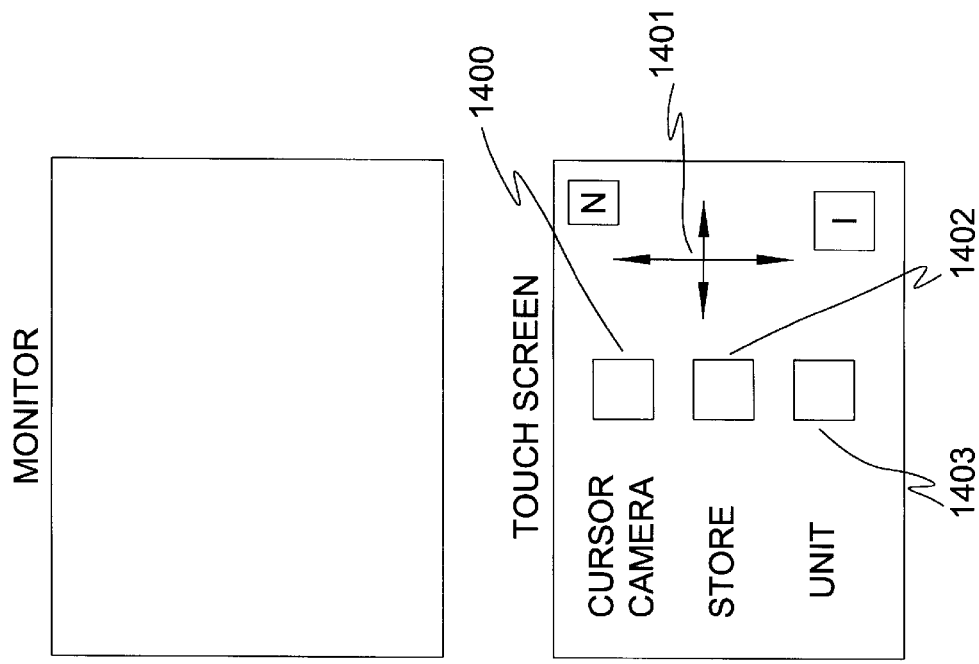

After the repeat length has been entered, the touch screen menu of FIG. 14 will appear.

By touching either CURSOR or CAMERA 1400, the arrow keys 1401 can be used to position and move a cursor crosshair on the monitor or the camera respectively. Each time this button is pressed, it will toggle from cursor to camera. A unit button 1403 is included which will toggle through and display each color unit. As additional nomenclature for this example, the following discussion assumes that R is defined as a fixed reference and Rx is defined as an offset reference entered in the same manner as the repeat length. For simplicity the R reference will be used in this example. The store button 1402 initiates an automatic Zoom Calibration cycle using the reference marks located on the reference mark plates on each side of the traverse. It also initiates the storing of the $(X_{POS}, Y_{POS})$ coordinate for that point.

Figure 15:
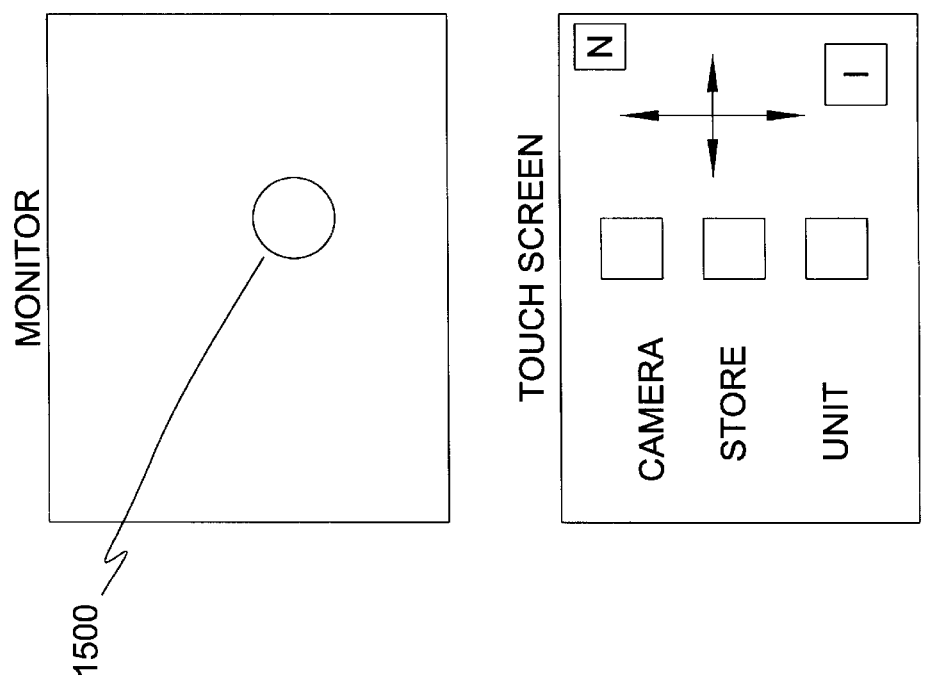

FIG. 15 shows the file hole on the monitor after it has been located using the arrow buttons in the CAMERA position.

Figure 16:
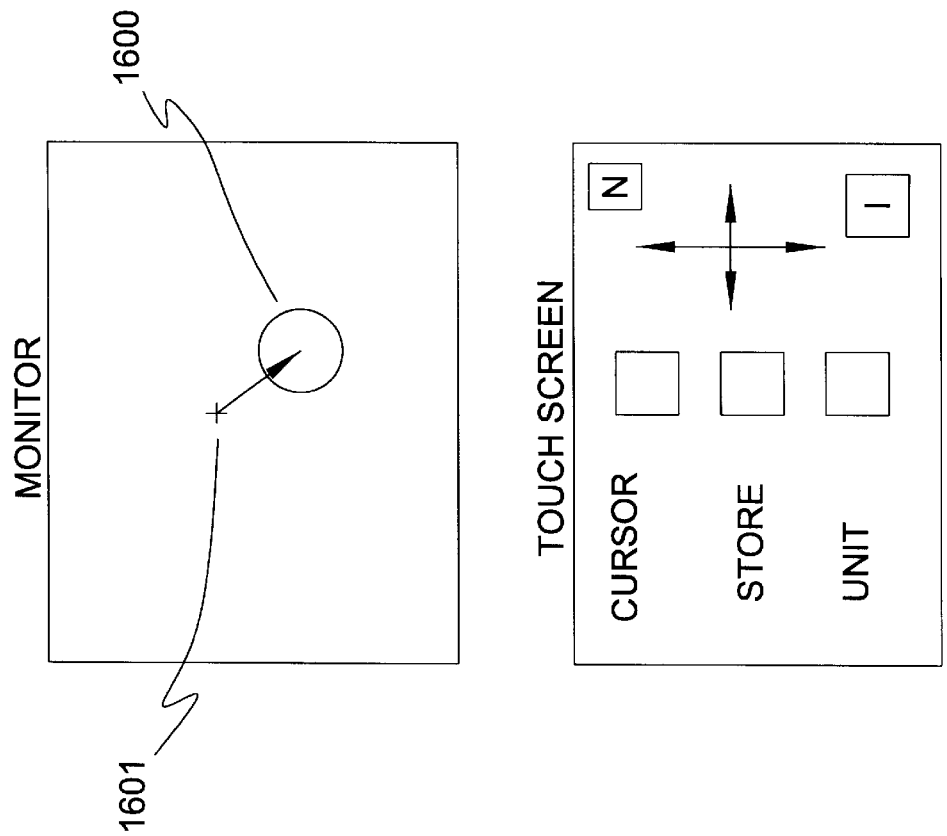

FIG. 16 shows the frozen image of the file hole 1600 and the cursor crosshair 1601 when it first appears under CURSOR.

Figure 17:
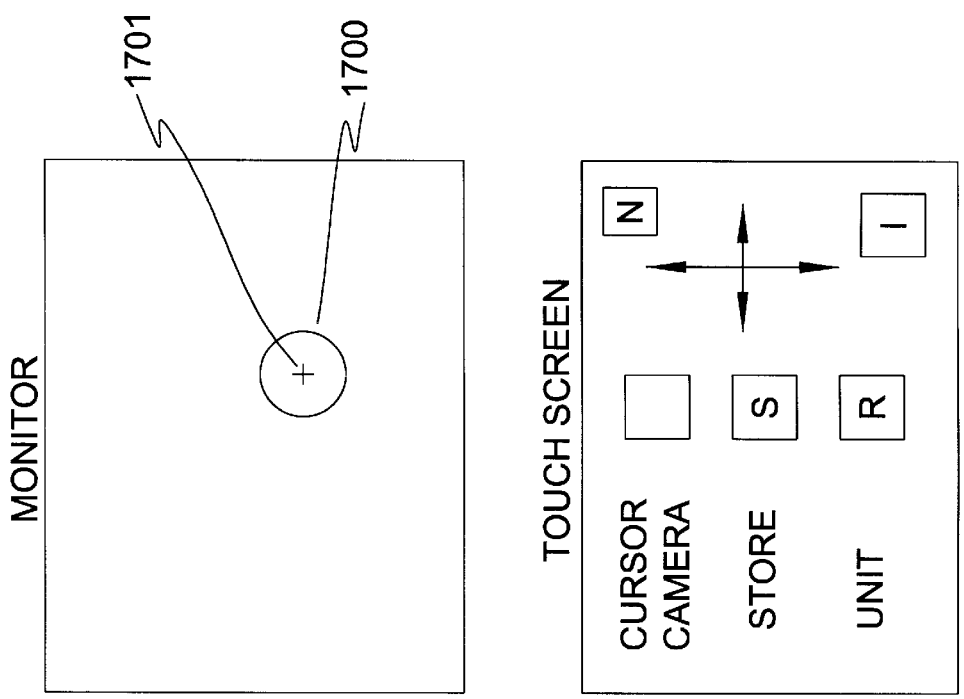

FIG. 17 shows the new location of the cursor crosshair 1701 after it has been positioned to the center of the file hole. It also shows the unit number R and S which appears when the STORE touchscreen button has been touched.

Figure 18:
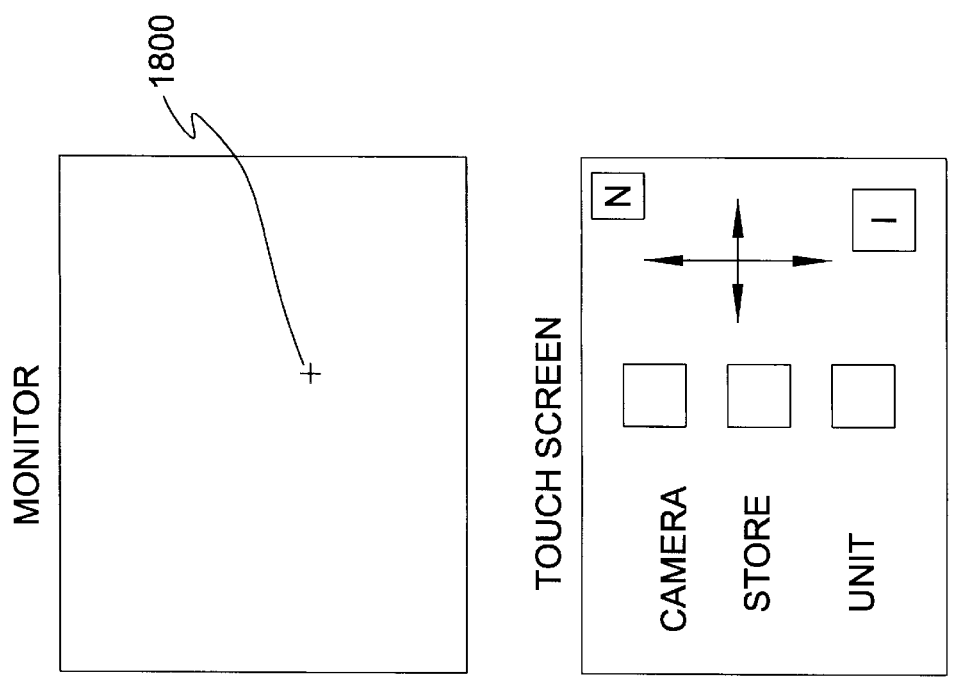

FIG. 18 shows a crosshair 1800 when roughly positioned in the center of the display monitor.

Figure 19:
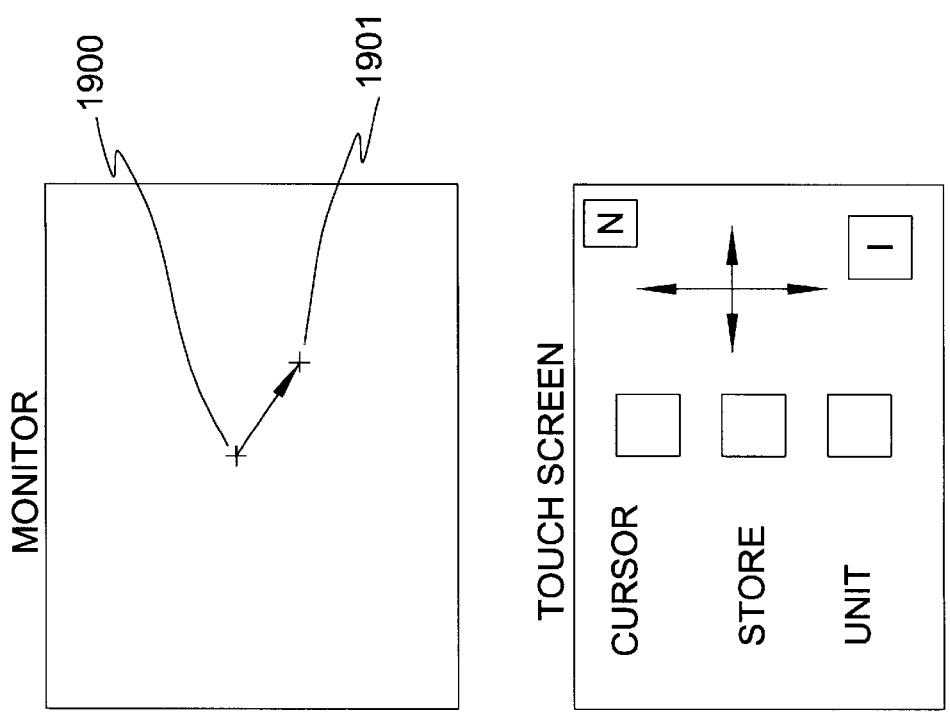

FIG. 19 shows the crosshair 1901 with the cursor crosshair 1900 when it first appears.

Figure 20:
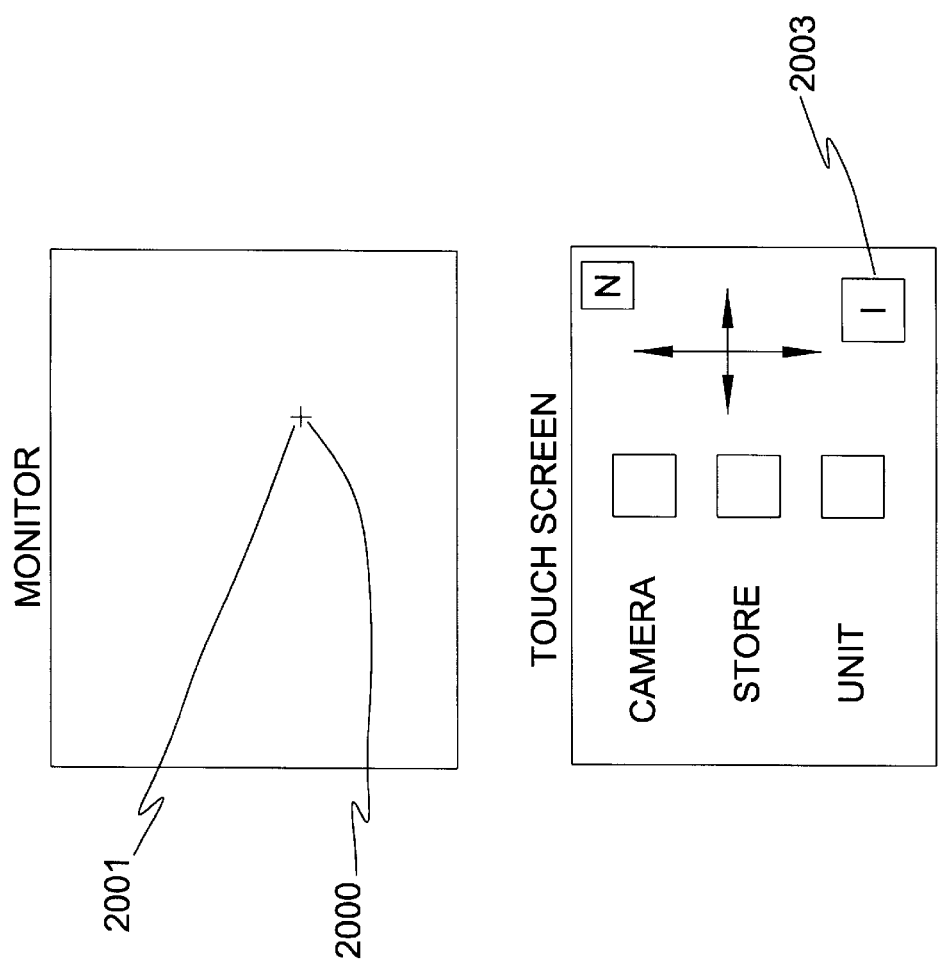

FIG. 20 shows the crosshair 2001 with the cursor crosshair 2000 superimposed on crosshair 2001. This graphic represents a completed registration process.

Process

The following discussion makes reference to FIG. 12. With this background the process and procedure for obtaining initial register can be described as follows:

(1) Location of Fixed Reference $(X_{POS}, Y_{POS})_R$ (A) Select CAMERA and move the camera so that file hole 1234 is roughly positioned to the center of the display monitor.
(B) Select CURSOR and position the cursor crosshair to the center of the file hole 1234.
(C) Select UNIT repeatedly until R appears, and select STORE.

Note: The system retains the fact that the center of the file hole at position $(X_{POS}, Y_{POS})_R$ is the reference to which all other stations will be adjusted. This serves as the web reference mark for all further process alignments.

(2) Location of Color Station Reference $(X_{POS}, Y_{POS})_8$ (A) Select CAMERA and move the camera so that crosshair 1226 is positioned roughly to the center of the display monitor.
(B) Select CURSOR and position the cursor crosshair so that it is superimposed with crosshair 1226.
(C) Select UNIT repeatedly until 8 appears and then select STORE.

Note: The system retains the fact that crosshair 1226 at position $(X_{POS}, Y_{POS})_8$ is to be centered within file hole 1234.

(3) Location of Color Station Eight $(X_{POS}, Y_{POS})_8$ (A) Select CAMERA and move the camera so that crosshair 1227 is positioned roughly to the center of the monitor.
(B) Select CURSOR and position the cursor crosshair so that it is superimposed with crosshair 1227.
(C) Select UNIT repeatedly until 8 appears and then select STORE.

Note: The system retains the fact that crosshair 1227 is also printed by station 8 and that any corrections that are made in registering station 8 to the file hole must also be added to the corrections made in all of the following stations in superimposing crosshairs 1111.

(4) Location of Color Station Seven $(X_{POS}, Y_{POS})_7$ (A) Select CAMERA and move the camera so that crosshair 1228 is positioned roughly to the center of the monitor.

(B) Select CURSOR and position the cursor crosshair so that it is superimposed with crosshair 1228.

(C) Select UNIT repeatedly until 7 appears and then select STORE.

(D) Note: The system retains the fact that crosshair 1228 is printed by station 7.

(5) Location of Color Station Six $(X_{POS}, Y_{POS})_6$ (A) Select CAMERA and move the camera so that crosshair 1229 is positioned roughly to the center of the monitor.

(B) Select CURSOR and position the cursor crosshair so that it is superimposed with crosshair 1229.

(C) Select UNIT repeatedly until 6 appears and then select STORE.

Note: The system retains the fact that crosshair 1229 is printed by station 6.

Continue the procedure SELECTing crosshairs and entering stations as indicated in Table 1.

TABLE 1

Crosshair/Color Station Correspondence Map

| Crosshair | Station |
|---|---|
| 1230 | 5 |
| 1231 | 4 |
| 1232 | 3 |
| 1233 | 2 |
| 1234 | 1 |

We have associated all crosshairs with the stations that print them and have obtained very accurate coordinates of all crosshairs to be superimposed and the fixed file hole and the crosshair to be centered within this file hole.

The distance that each station must move in both the circumferential and lateral directions are calculated from the information obtained from the initial register procedure and the repeat length which was entered through the touch screen at the beginning. The station correction calculations are summarized in Table 2.

TABLE 2

Station Correction Calculations

| Station | Correction Calculation |
|---|---|
| 8 | $(X_{POS}, Y_{POS})_R - (X_{POS}, Y_{POS})_8$ |
| 7 | $(X_{POS}, Y_{POS})_R - (X_{POS}, Y_{POS})_7 + (X_{POS}, Y_{POS})_R - (X_{POS}, Y_{POS})_8$ |
| 6 | $(X_{POS}, Y_{POS})_R - (X_{POS}, Y_{POS})_6 + (X_{POS}, Y_{POS})_R - (X_{POS}, Y_{POS})_8$ |
| 5 | $(X_{POS}, Y_{POS})_R - (X_{POS}, Y_{POS})_5 + (X_{POS}, Y_{POS})_R - (X_{POS}, Y_{POS})_8$ |
| 4 | $(X_{POS}, Y_{POS})_R - (X_{POS}, Y_{POS})_4 + (X_{POS}, Y_{POS})_R - (X_{POS}, Y_{POS})_8$ |
| 3 | $(X_{POS}, Y_{POS})_R - (X_{POS}, Y_{POS})_3 + (X_{POS}, Y_{POS})_R - (X_{POS}, Y_{POS})_8$ |
| 2 | $(X_{POS}, Y_{POS})_R - (X_{POS}, Y_{POS})_2 + (X_{POS}, Y_{POS})_R - (X_{POS}, Y_{POS})_8$ |
| 1 | $(X_{POS}, Y_{POS})_R - (X_{POS}, Y_{POS})_1 + (X_{POS}, Y_{POS})_R - (X_{POS}, Y_{POS})_8$ |

Automatic Correction of Initial Register

The procedure for accurate measurement of initial register errors in both the lateral and circumferential direction has been explained in the above discussion. Very accurate distances for both lateral and circumferential corrections have been calculated for all color units.

For correction of these initial register errors, two phase synchronous motors such as those manufactured by Superior Electric under their trade name of Slo Syn are preferred. These motors start and stop within about 0.016 seconds and run at a very precise speed that is synchronous with either the 50 or 60 cycle line frequency.

The common Syo Syn motor runs as 72 rpm. Thus, knowing the gear ratio, and the cylinder circumference, an accurate gain in inches per minute can be calculated. With the information of accurate distance that each color unit must be moved to be in register, it is easily calculated the time each motor should run to bring the units into precise register. The lateral mechanisms are first centered by running each motor to one limit and reversing for a fixed time to center each mechanism.

To initiate motor alignment using the above method and disclosed hardware configuration depicted in FIG. 1–FIG. 4, the I (initiate register) touchscreen button (2003) is depressed in the screen display illustrated in FIG. 20, at which point each motor will run for the time calculated above to bring it into alignment in both the lateral and circumferential directions.

The accuracy possible with conventional motor movement calculations as detailed above is sufficient in order to later use the Zoom Calibration reference mark patterns to bring final register into precise final register. Thus, the automatic initial register process comprises a rough motorized alignment of the web and processing stations, combined with a later refined registration procedure which makes use of the automated zoom lens calibration procedure to obtain highly accurate distance measurements across the web face.

Zoom Calibration Plate

Figure 23:
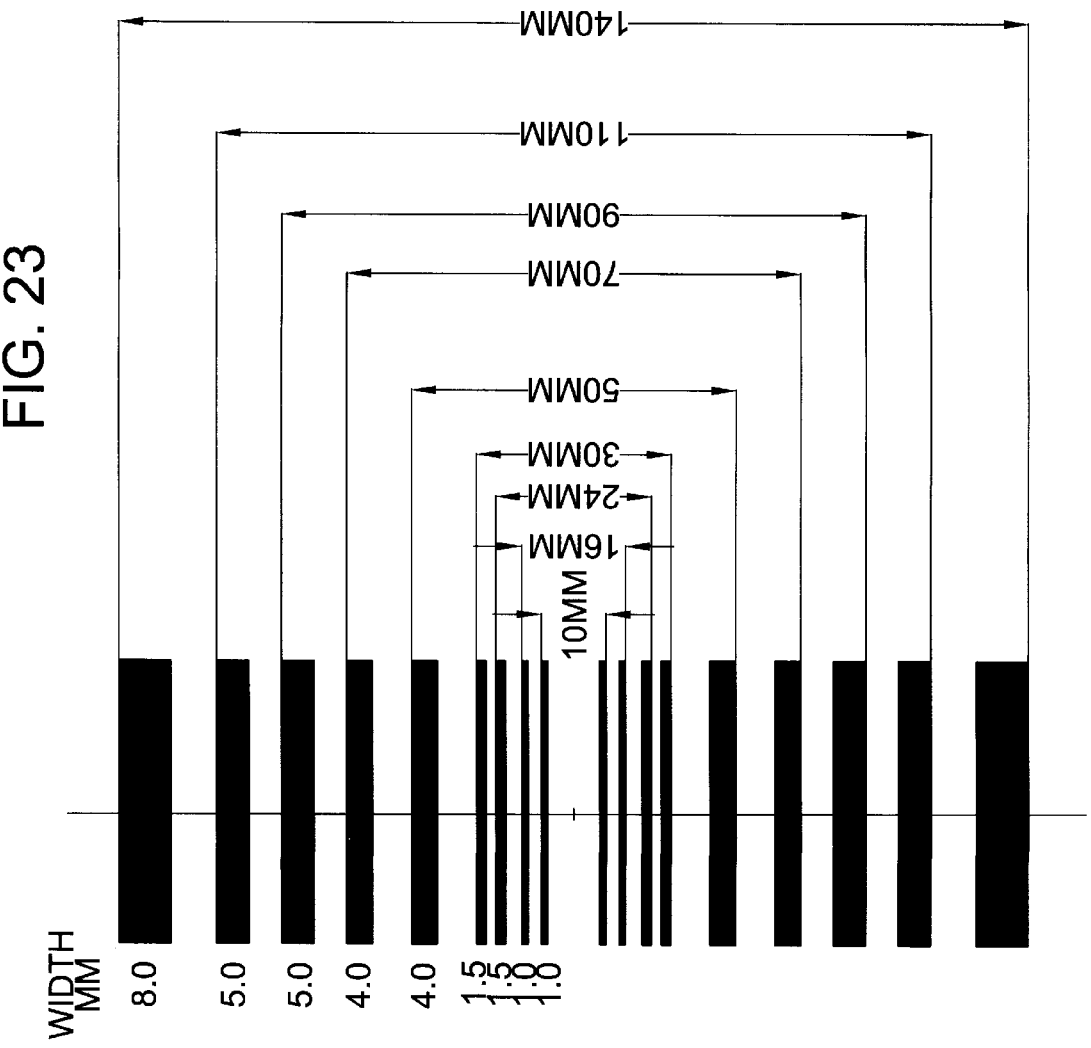
FIG. 23 illustrates a typical embodiment of a Zoom Calibration reference plate which may be used to calibrate the maximum field of view for each zoom lens setting. Note that many other types of reference plates may be used with the Zoom Calibration method, as image processing techniques may be used to operate effectively with the Zoom Calibration method and practically any reference plate marking pattern.

One ancillary aid in obtaining proper calibration for the zoom lens system is the use of a calibration plate with markings of known dimensions as illustrated in FIG. 23. The construction and use of this plate will now be explained in detail.

FIG. 23 illustrates dimensioned drawing of one possible embodiment of a Zoom Calibration reference plate mounted on each of the two calibration mounting plates 317 and 318 of FIG. 3. There are nine sets of marks which enable the calibration of the at maximum field of view for each zoom setting. The calibration plate is centered on the camera so that the outermost set of calibration marks can be selected providing the greatest accuracy for each zoom position.

The plate consists of black marks on a white background providing the greatest contrast. Edge detection image processing software provides for sub-pixel accuracy.

FIG. 23 is a calibration standard which is mounted on reference plates 317 and 318 of FIG. 3 and used for calibration of the zoom lens. The standard is mounted so that the center point of the standard is centered in the camera image. For any zoom lens setting, at least one pair of marks will appear in the image at the outer most extremes of the field of view. For the highest magnification and resolution, which for purposes of this discussion is 16× and 0.001 inch per pixel (0.025 mm), the two marks spaced 10 mm apart will appear in the image and are used to calibrate this zoom setting. For any other zoom positions a number of mark pairs will appear within the image with all nine sets of marks appearing in the image with maximum field of view.

While any number of marks pairs, different spacing, and mark widths could be used, the enclosed mark standard is designed with nine sets of marks that are used for nine discrete settings of the zoom magnification. These marks are spaced at about 80% of the maximum field of view for each zoom nominal setting. Thus up to ±20% deviation in zoom lens positioning can be accommodated with the required set of marks still appearing in the correct image.

This Zoom Calibration reference pattern has a number of advantages, including the following:

(1) The different spacing and mark thickness allow the pattern to be used in the power up diagnostics of the zoom lens. When the traverse is calibrated by moving to one end extent, activating the limit switch, a number of images can be taken of the reference to determine if the zoom lens is functioning correctly.
(2) Using a number of mark pairs, the zoom lens can be calibrated at a number of spatial positions with the result that lens distortion may be compensated across the lens target area.
(3) An entire mark pattern can be a very small width requiring a very small additional width to the overall traverse width.
(4) The vertical pattern can be used to calibrate the lateral distance as provided for in the novel teachings of this invention described elsewhere in this document.

Zoom Calibration Distance Measurement Calculations

Nomenclature Definitions

The distance measurement calculations used in the disclosed Zoom Calibration process will now be discussed. Within the context of this discussion, please note that there are a number of manufacturers of optical encoders suitable for this application. An exemplary manufacturer model is the Model H25, available from Dynamics Research Corporation, 60 Concord Street, Wilmington, Mass. 01887. This particular model has 1000 counts/revolution plus a zero reference pulse and is typical of encoders which may be used in this application.

Table 3 details the notational conventions will be used in this discussion of the Zoom Calibration method.

TABLE 3

Zoom Calculation Notational Conventions

| Notation | Desccription |
|---|---|
| | X-dimension Terminology |
| (0,Y) | origin of camera (X) (hole 0 of encoder, limit switch of traverse) |
| T | traverse encoder hole at time of strobe trigger (relative to hole 0) |
| H | traverse encoder holes per inch (743.132 counts/inch is a typical value for a suitable encoder resolution) |
| | Y-dimension Terminology |
| (X,0) | origin of camera (Y) (hole 0 of encoder-arbitrary) |
| G | cylinder encoder hole at time of strobe trigger (relative to hole 0) |
| E | cylinder encoder number of holes per repeat length |
| R | repeat length in 0.001 inch increments |
| X | X pixel value from center of image to any point on the same image measured in number of pixels |
| Y | Y pixel value from center of image to any point on the same image measured in number of pixels |
| $X_c$ | X pixel distance between DUP marks |
| $Y_c$ | Y pixel distance between DUP marks |
| DUP | duplicate marks |
| $M_D$ | absolute dimension between DUP marks in inches or millimeters |
| | Conversion Factors (Inches/Pixel) |
| $X_P = \dfrac{M_D}{X_C}$ | inches per pixel in X direction |
| $Y_P = \dfrac{M_D}{Y_C}$ | inches per pixel in Y direction |

TABLE 3-continued

Zoom Calculation Notational Conventions

| Notation | Desccription |
|---|---|
| | Conversion Factors to Absolute Position |
| $X_{POS}$ | absolute X position of a point in the image (in inches) from (0,0) origin |
| $Y_{POS}$ | absolute Y position of a point in the image (in inches) from (0,0) origin |

Discussion

The following discussion will assume that a NTSC compatible camera screen capture image is being used. Recall that the NTSC specification has a 4:3 horizontal to vertical aspect ratio with 512 scan lines and 492 pixels per raster line. Given this constraint, the pixel dimensions in the X direction are related to pixel dimensions in the Y direction for NTSC according to the following formulas:

$$X_P = \frac{4}{3} \times \frac{492}{512} \times Y_P \quad (4)$$

$$Y_P = \frac{3}{4} \times \frac{512}{492} \times X_P \quad (5)$$

Thus knowing the $X_P$, $Y_P$ can be calculated. Conversely, knowing $Y_P$, $X_P$ can be calculated. This allows vertical reference marks to be used to calibrate the X direction, and horizontal reference marks to be used to calibrate the Y direction. Note here that the use of the Zoom Calibration reference plate can adjust for imperfections in the aspect ratio of the zoom lens and make the translation from X coordinates to Y coordinates or visa versa truly accurate with respect to the actual web image.

This information can be used to calculate the absolute X position on the web surface using the relations $$X_{POS} = \frac{T}{H} + X \times X_P \quad (6)$$

where $X_P \equiv \dfrac{M_D}{X_C}$ Horizontal Marks $$X_{POS} = \frac{T}{H} + X \times \left[\frac{4}{3} \times \frac{492}{512} \times Y_P\right] \quad (7)$$

where $Y_P \equiv \dfrac{M_D}{Y_C}$ Vertical Marks

This permits accuracy of one encoder pulse or one pixel, whichever is less.

This information can be used to calculate the Y position on the web surface using the relations $$Y_{POS} = \frac{G \times R}{E} + Y \times Y_P \quad (8)$$

where $Y_P \equiv \dfrac{M_D}{Y_C}$ Vertical Marks $$Y_{POS} = \frac{G \times R}{E} + Y \times \left[\frac{3}{4} \times \frac{512}{492} \times X_P\right] \quad (9)$$

where $X_P \equiv \dfrac{M_D}{X_C}$ Horizontal Marks

This permits accuracy of one pixel.

NTSC vs. PAL Encoding

While the above examples illustrate the calculations required for NTSC camera screen resolution formats, they can be easily modified to function with PAL encoding, which has a 4:3 horizontal to vertical screen ratio and 768 horizontal scan lines, each with 582 pixels per raster line. The inches per pixel in the X ($X_P$) and Y ($Y_P$) directions are thus given by the relations $$X_{P(NTSC)} = \frac{4}{3} \times \frac{492}{512} \times Y_P \quad (10)$$
$$\approx 1.28125 \times Y_P$$

$$Y_{P(NTSC)} = \frac{3}{4} \times \frac{512}{492} \times X_P \quad (11)$$
$$\approx 0.78049 \times X_P$$

and $$X_{P(PAL)} = \frac{4}{3} \times \frac{582}{768} \times Y_P \quad (12)$$
$$\approx 1.010417 \times Y_P$$

$$Y_{P(PAL)} = \frac{3}{4} \times \frac{768}{582} \times X_P \quad (13)$$
$$\approx 0.98961 \times X_P$$

It is well understood by those skilled in the art that these calculations are most accurately evaluated by performing all required multiplications within numerator and denominator first and reserving a single division as the last arithmetic operation. This permits the arithmetic to be performed using a processor having only integer arithmetic if necessary by prescaling the numerator by an arbitrary power of 2 or 10.

Mark Pattern

This section will now explain the calculation of Zoom Calibrations values and (X,Y) position determination. The concept will be illustrated using first a vertical mark pattern for the calibration of both X and Y. A similar analysis can be provided using a horizontal mark pattern for the calibration of both X and Y.

The X and Y dimensions are always referenced to a zero position on the machine. The zero position for this example will be the one corner of the printed repeat, an example of which is illustrated as 510 with corresponding web run length 528 in FIG. 5. Storage of these unique positions enable easier and automatic setup of machine operations for new runs and repeat runs.

Calculation of Accurate X,Y with Vertical Marks

A mark or marks of known dimensions are first printed in either the X or Y direction. For this example two 1 mm marks whose centerpoints are located 16 mm apart are printed in the Y direction.

The camera is moved in the X,Y directions until the marks are recognized and centered within the image of maximum resolution (largest image with both marks still within the image capture area). Note the following calculations:

(1) The distance between the centerpoint of both marks is measured in pixels as $Y_C$.
(2) The inches per pixel in the Y direction is calculated as $M_D/Y_C$ were $M_D$ in this example is 16 mm.
(3) The position of the center point between the vertically spaced two marks is represented as: $Y_{POS}$=rough position represented by the machine mounted encoder position+ vernier position represented by calibrated zoom and number of pixels:

$$Y_{POS} = G \times \frac{R}{E} + Y \times \frac{M_D}{Y_C} \quad (14)$$

Where G is the cylinder hole where the image capture was initiated, R is the repeat length in inches or millimeters, and E is the number of encoder holes per repeat. Y is the number of pixels from the center of the image and $M_D/Y_C$ is the calibrated distance per pixel using the reference marks.

(4) The X dimension position $X_{POS}$ is calculated as using vertical marks as: $X_{POS}$=rough position represented by the traverse mounted encoder position+the vernier position represented by the calibrated zoom and number of pixels converted to the X dimension:

$$X_{POS} = \frac{T}{H} + X \times \frac{4}{3} \times \frac{492}{512} \times \frac{M_D}{Y_C} \quad (15)$$

where T is the traverse encoder hole at the time of image capture, H is the traverse encoder holes per inch, X is the number of pixels of the centerline of the vertical marks to the center of the image in the X direction. $M_D$ is the known mark dimension for this example which is 16 mm and $Y_C$ is the measurement of this mark in vertical pixels. The factor (4/3×492/512) is the conversion to a horizontal pixel dimension from the vertical pixel dimension based on the NTSC television standards to which the camera was manufactured.

Zoom Calibration Typical Printing System Context

Figure 27:
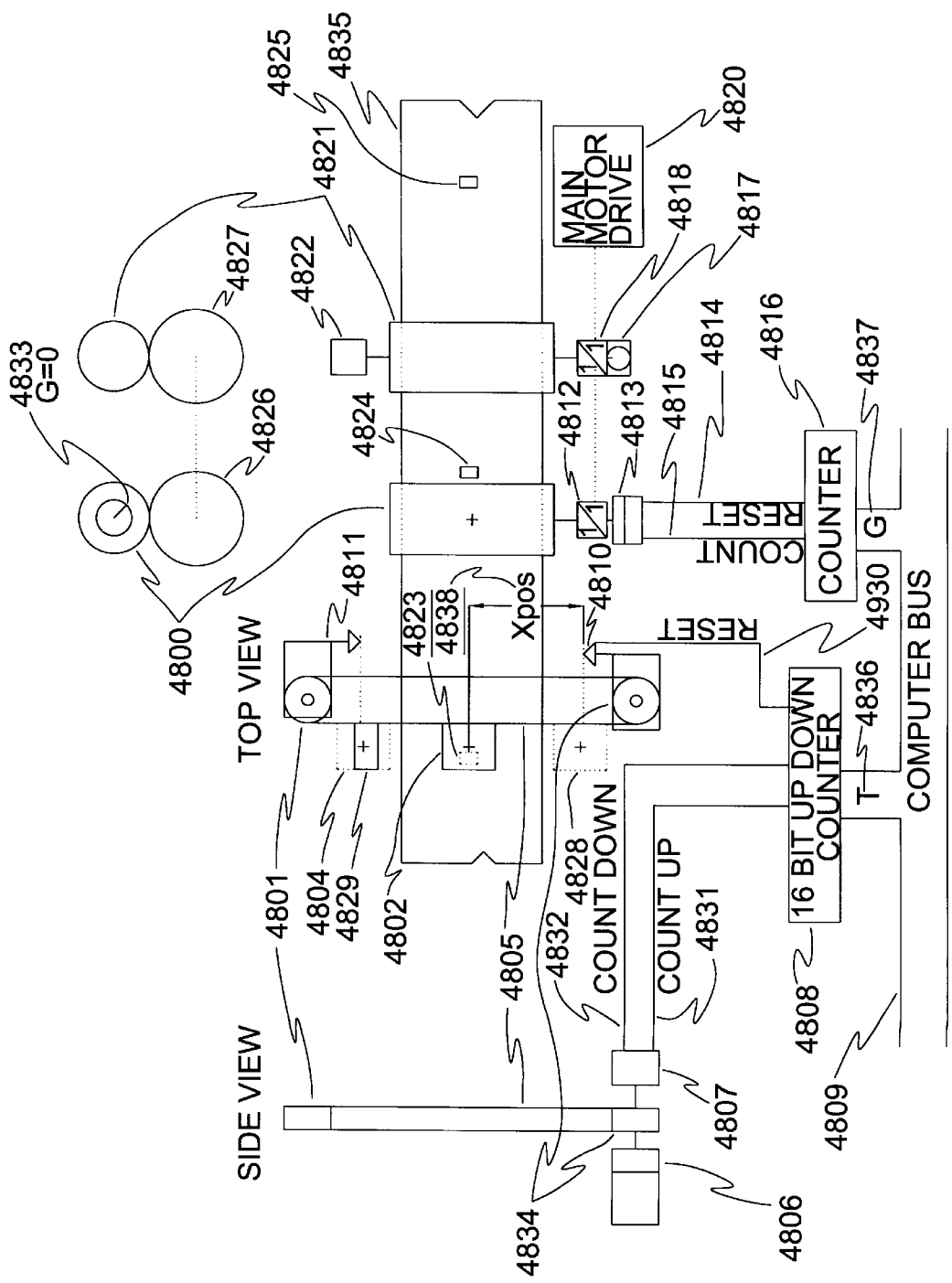
FIG. 27 illustrates the typical system context surrounding an initial register operation on a printed web surface. While other embodiments are possible, this example provides an exemplary embodiment illustrating the main system components required to utilize Zoom Calibration in the context of a traditional web printing system.

The following discussion makes reference to FIG. 27. Camera 4801 is moved laterally across web 4835 by the timing belt 4805 supported at each end by timing belt sprockets 4801 and 4834. Sprocket 4834 is driven by motor 4806 integrally connected to encoder 4807. Encoder 4807 has two lines, count down 4832, and count up 4831. These two lines control a counter 4808 that continuously received counts from encoder 4807 whenever the traverse is moved.

Figure 24:
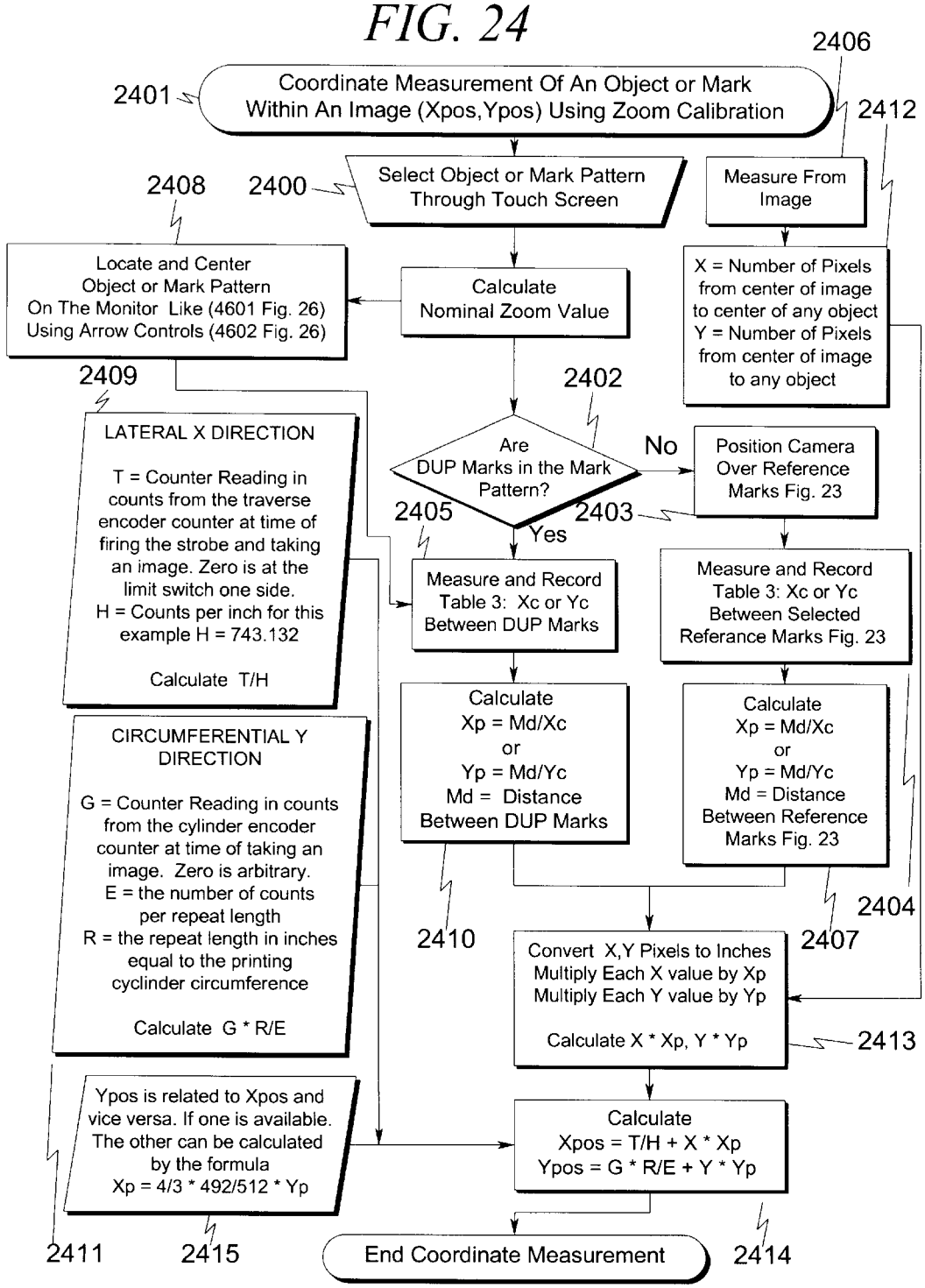
FIG. 24 illustrates a typical software flowchart used to calculate the absolute coordinate of an object on the web using the Zoom Calibration method. Note that this software flowchart assumes that an NTSC-compliant camera is used for the image capture device for the Zoom Calibration system embodiment. Those skilled in the art will recognize that the calculations in FIG. 24 may be easily modified to accommodate other video encoding standards.

This value T 4836 is used in the calculation of $X_{POS}$ in Table 3 and in the software flowcharts (2409 FIG. 24). At any time the content or position of the traverse can be read by the computer through computer bus 4809.

Counter 4808 is set to zero during the traverse power up calibration cycle. During the traverse calibration cycle, the traverse if first driven to limit switch 4810 and counter 4808 set to zero. The traverse is then positioned to the other limit switch 4811 whose position represents the maximum lateral position of the traverse in this direction.

Encoder 4832 is a low resolution encoder providing high reliability. For this discussion and in the following examples the sprocket diameter and encoder resolution provides for 743.132 counts per inch of lateral movement of the traverse. Those skilled in the art will recognize that the encoder resolution is arbitrary and a wide variety of values are suitable for the Zoom Calibration method as taught in this disclosure.

Encoder 4813 is attached to printing cylinder 4800 with one revolution of printing cylinder 4800 exactly equal to one revolution of encoder 4813. Encoder 4813 has two outputs. One is a counting frequency which provides the maximum number of counts per revolution of the encoder and the other output is a single pulse per revolution of the encoder or printing cylinder. This provides an index pulse so that the encoder will always be referenced to the same position on the machine.

The counter output of encoder 4813 goes to counter 4816 with reset pulse 4814 setting the counter to zero each revolution.

Count 4816 can be read at any time with the position in counts 4837 as represented by G. G is used in the calculation of $Y_{POS}$ in Table 3 and in flowchart 2411 FIG. 24.

The initial circumferential position of the encoder zero reference pulse is not important. The actual reference for fixed machine functions can be determined and stored in the computer for use in automatic set up operations as described.

Zoom Calibration Example

Figure 25:
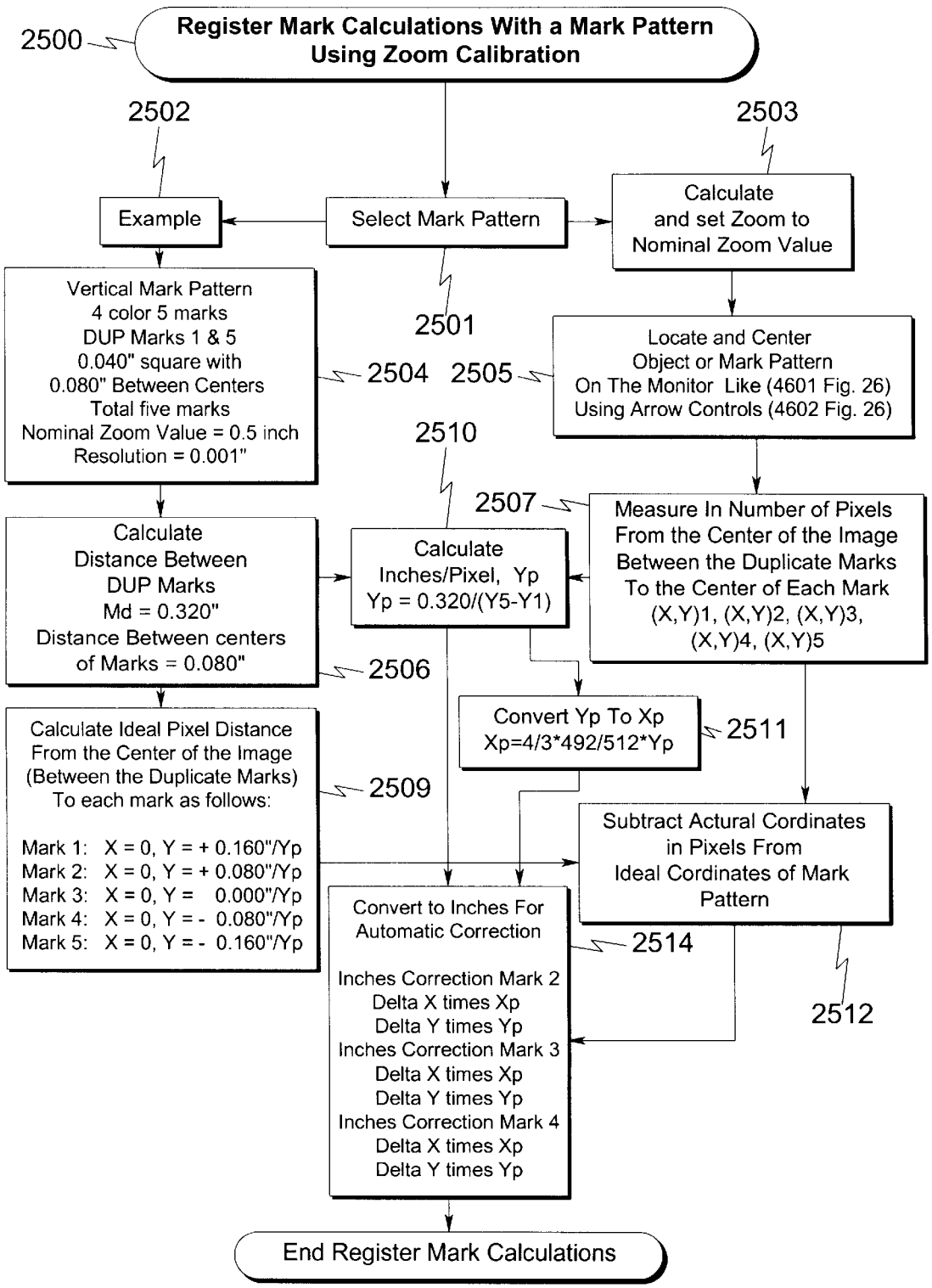
FIG. 25 illustrates a typical software flowchart used to implement register mark calculations using the Zoom Calibration method. Note that this software flowchart assumes that an NTSC-compliant camera is used for the image capture device for the Zoom Calibration system embodiment. Those skilled in the art will recognize that the calculations in FIG. 25 may be easily modified to accommodate other video encoding standards.

The following discussion makes reference to FIG. 25. FIG. 25 is a flow diagram of the register calculations using a mark pattern with a DUP duplicate mark reference. A mark pattern is selected at 2501. For this example the mark pattern chosen is a four color mark pattern with the first and fifth mark the Duplication reference marks.

The Selected mark pattern automatically provides the Nominal Zoom Value which provides the field of view and resolution requirements. The zoom lens is positioned to this Nominal Zoom Value and the mark pattern is located and centered on the screen. The colors will be out of register and look something like the pattern (4603 of FIG. 26). The coordinates from the center of the duplicate marks in pixels (X,Y) to the center of each mark is measured at 2507.

In step 2509, the nominal dimensions between mark centers of the chosen mark pattern are scaled to pixels by dividing each value by the scale factor $Y_P$. $Y_P$ is the inches per pixel calculated by dividing the known distance between DUP marks $M_D$ by the number of pixels between centers of the DUP marks obtained from image 2507.

The coordinates in pixels to the centers of all marks relative to the center of the image between the DUP marks are calculated at 2507. These values are subtracted from the ideal calibrated values 2509 and converted to inches at 2514. These values are used to drive the correction motors to bring the marks into alignment according to the mark pattern.

Figure 26:
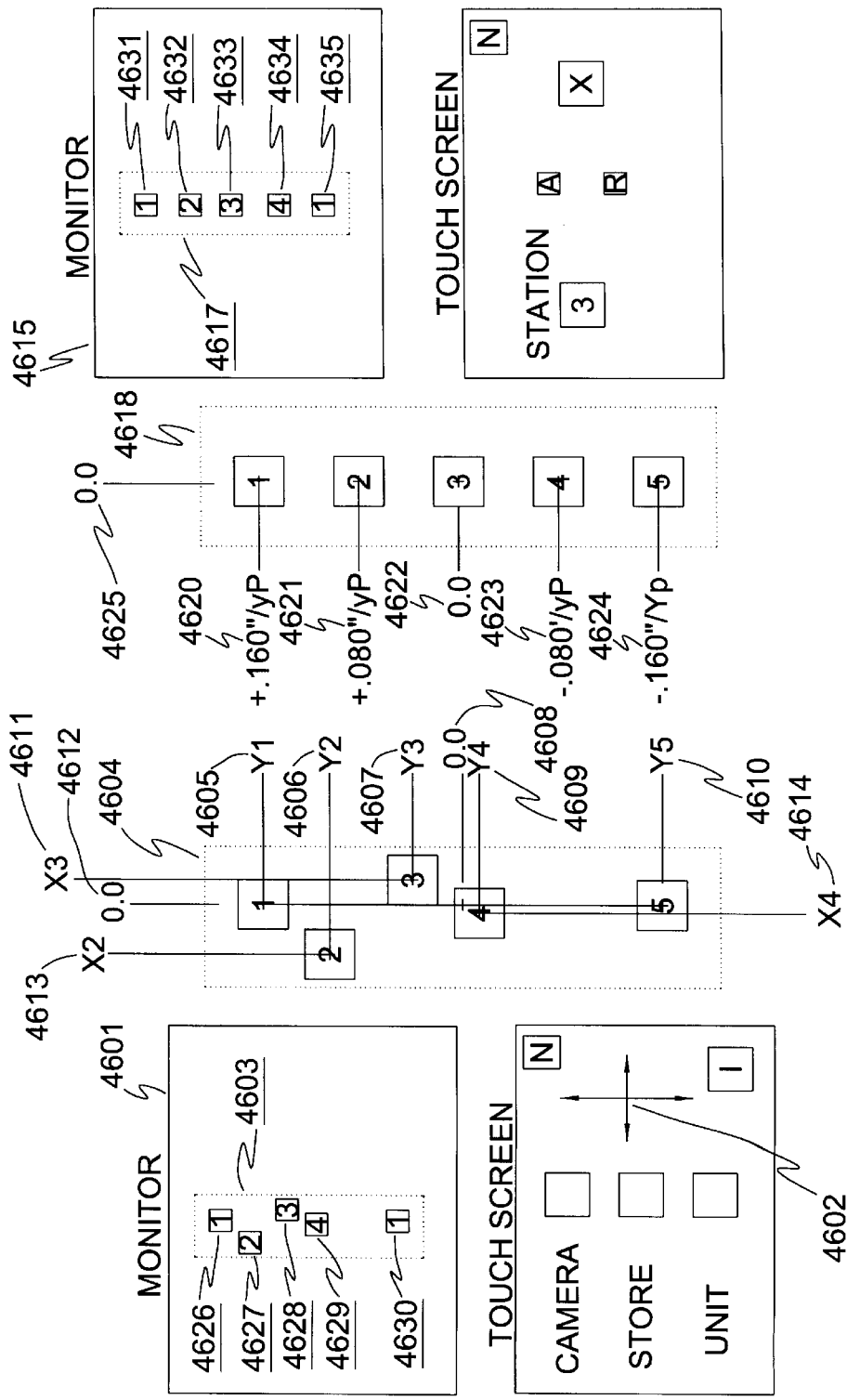
FIG. 26 illustrates the coordinate dimensions for register mark control using the Zoom Calibration method. Two views are provided: before final register of the web, and after final register of the web. The dimensions provided in this illustration correspond to the nomenclature and method description given in Table 3.

The following discussion makes reference to FIG. 26. FIG. 26 shows the same mark pattern before final register is achieved at 4603 and greatly magnified at 4604. The coordinates in pixels of the other marks relative to the center of the DUP marks 4626 and 4630 are calculated in pixels and correspond to the values obtained from the image 2507 FIG. 25.

The marks positioned as in the selected mark pattern are shown as 4617 and greatly magnified at 4618. The coordinate of each mark in pixels is corrected from the ideal values by the scale factor $Y_P$ as in 2509 FIG. 25.

The two coordinates are algebraically subtracted to provide the error in pixels in both the X and Y directions as in 2512. The final errors in inches are calculated by multiplying the pixel errors by the scale factor $Y_P$ as in 2514.

Zoom Calibration Software Flowchart

As an aid to software developers, the following discussion makes reference to FIG. 24 which is a flowchart showing the calculation of the $X_{POS}$ and $Y_{POS}$ for any object or mark pattern with a printed reference or with at fixed reference.

The selection of the mark or object pattern is made at 2400. If the selected pattern includes a duplicate reference mark, the lens is positioned to the Nominal Zoom Value and an image of the mark or object pattern is centered on the monitor.

If the known duplicate marks are in the vertical direction, the number of pixels are measured between the duplicate marks and knowing the distance, $Y_C$ can be calculated. If the duplicate marks are in the horizontal direction, the number of pixels are measured and knowing the distance between the duplicate marks, $X_C$ can be calculated.

The number of pixels from the center of the duplicate marks to the object is measured at 2412 and converted to inches at 2413.

The $X_{POS}$ distance given at 2414 is the sum of the pixel distance in inches to the center of the object given at 2413 as ($X \times X_P$) and the lateral encoder position of the traverse given at 2409 as T/H. Thus, $X_{POS}$ is calculated as $$X_{POS} = \frac{T}{H} + X \times X_P \tag{16}$$

The $Y_{POS}$ distance given at 2414 is the sum of the pixel distance in inches to the center of the object given at 2413 as ($Y \times Y_P$) and the cylinder encoder position given at 2411 as (G×R/E). Thus, $Y_{POS}$ is calculated as $$Y_{POS} = G \times \frac{R}{E} + Y \times Y_P \tag{17}$$

Horizontal and vertical scanning can be accomplished using the formula detailed in step 2415.

Important Zoom Calibration Calculation Factors

The following factors have significance in the execution of the Zoom Calibration process:

(1) Since the image capture is initiated from the beginning of a machine mounted encoder pulse, the resolution of this encoder (0.040 inch/pulse in the disclosed exemplary embodiments) is not important in the ultimate accuracy of measurement in the Y direction. As long as the two marks remain on the image the accuracy of measurement is one pixel or with the disclosed 16× zoom system configuration equivalently 0.001 inch.

(2) The image capture is initiated after the traverse comes to rest. Thus, the encoder position will be read at this time and will include the positioning inaccuracy and non repeatability of the traverse (±0.040 inch in the disclosed exemplary embodiments). The number of pixels from the center of the image will vary on repeat measurements due to the positioning error. This positioning error is automatically reduced to one encoder count.

(3) While the Zoom Calibration in the above example is performed from a printed image included on the printed image, there are a number of applications where the reference mark cannot be printed on the product. In these instances, a known reference mark is included at the side of the traverse away from the web product. The traverse will return to this mark for calibrations whenever the zoom position is moved. An exemplary embodiment of a suitable Zoom Calibration reference mark for this purpose is illustrated in FIG. 23.

PREFERRED SYSTEM CONTEXT OF THE PRESENT INVENTION

The numerous innovative teachings of the present application will be described with particular reference to the presently preferred embodiment, wherein these innovative teachings are advantageously applied to the particular problems of web printing. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Overview

The Zoom Calibration method described previously when combined with a camera traversing mechanism and encoders create a number of unique products and useful inventions. Note that while the traversing mechanism, machine mounted encoders, and image capture means are well known devices manufactured by CC1 of Manchester, N.H., USA, the use of Zoom Calibration with any of these products has heretofore not been demonstrated by any commercial product. In each of the following exemplary embodiments the purpose and means of using these components with Zoom Calibration are briefly described.

It is assumed that a known reference mark is provided either in a register mark pattern printed on the web or as a printed mark mounted at the side of the traverse used solely for the purpose of Zoom Calibration.

PREFERRED EMBODIMENT
Image Processor

The following discussion makes reference to FIG. 3. A typical Image Processor as illustrated in FIG. 3 consists of a traversing mechanism which includes a camera with zoom lens, stroboscope, and a motorized mechanism for moving the entire assembly across the width of the traverse. The assembly also includes an encoder 316 which encodes the position of the traverse in the lateral direction.

The printed web moves under the camera in this case from left to right. The traverse is manufactured to accommodate the paper width being printed plus an additional width where a calibration plate can be mounted. This calibration plate can include a color chip to calibrate the camera for color, and fixed known dimensional reference marks for the Zoom Calibration.

The remaining components of the image processor is a printing machine mounted encoder 504 (FIG. 5) and which encodes the Y position (in the running direction) of the printed image. The system also includes a console 200 (FIG. 2) in which is mounted a touch screen 204 (FIG. 2) for operational and control and a monitor 205 (FIG. 2) which displays the image taken by the camera.

The electronic computer and frame board which captures the image and provides image processing are enclosed in the console computer 206 (FIG. 2).

System Components

The preferred embodiment of the invention is best explained by describing the system context in which the invention is used.

A traversing mechanism shown in FIG. 3 shows a camera 301 to which is attached a zoom lens 303. A strobe tube 319 is attached and provides a very short light pulse which enables the camera to obtain an image that virtually freezes the high speed moving web. In this manner an image is obtained from which measurements can be calculated from marks using the Zoom Calibration method described previously.

The X dimension is obtained from an encoder 316 (FIG. 3) attached to the traversing mechanism 315 (FIG. 3) which moves across the entire web width 305 (FIG. 3).

Another encoder 132 illustrated in FIG. 1 encodes the Y position. Thus both X and Y which represents the coordinates of the printed image are obtained from the encoders with the final vernier position obtained from the image as pixels in both X and Y from the center of the image.

Register Control: Color to Color

A specially designed Zoom Calibration reference mark pattern (see FIG. 6–FIG. 9 for exemplary embodiments) is printed which includes a reference mark for the purpose of Zoom Calibration. Two reference marks, the two located furthest apart, are used as the reference marks in FIG. 6–FIG. 9. In FIG. 6 reference marks 600/601, and in FIG. 8 reference marks 800/801, are obtained from a separate image taken from the Zoom Calibration reference plate. In FIG. 7 reference marks 700/705, and in FIG. 9 reference marks 900/905, are printed by one of the color stations, and are part of the printed mark pattern on the web. Within the web printing marks illustrated in FIG. 6–FIG. 9, other marks are printed ideally one mark per color station (602–606 in FIG. 6, 701–704 in FIG. 7, 802–807 in FIG. 8, and 901–904 in FIG. 9).

Note that the orientations of the marks illustrated in FIG. 6 and FIG. 7 is such that the 5S+5W dimension is normally in the circumferential web direction of travel (Y), while the orientations of the marks illustrated in FIG. 8 and FIG. 9 is normally in the longitudinal (X) dimension which traverses the web width. These orientations are only examplary embodiments of marking patterns which may be used with the Zoom Calibration method. Combinations of marking elements in FIG. 6–FIG. 9 may be used to advantage in special printing applications which perform calibration in one dimension and distance measurement in some other dimension.

The full range of the zoom (in this exemplary embodiment 16:1) can be used allowing mark patterns having different size marks for different applications. For example, a mark pattern could be printed which would cover the entire maximum field of view of 9 inches by 7 inches. Since there are 500 pixels per image each pixel would represent 9/500 or 0.018 inch per pixel in the X direction. Another mark pattern could be used for the minimum field of view of 9/16 or 0.56 inch. Each pixel would then represent about 0.001 inch.

The flexibility of being able to use all zoom positions with accurate measurement due to Zoom Calibration provides the following unique benefits:
(1) The mark pattern and mark spacing can be selected for the specific application. This spacing is chosen to accommodate the largest initial register errors enabling automatic initial register control.
(2) Where both large initial register errors are present, and where fine resolution is also needed, two mark patterns can be used with the large one used to achieve initial register. After initial register is achieved within the accuracy of the larger pattern, the camera is switched to the smaller pattern where the higher resolution provides for greater accuracy.

Register Control Print to Perf, Line Hole, and Sheeter Cut

There are many application of register control where a mechanical operation is performed on the web other than a printed color. Examples are line hole punching, perforations, and sheeting, all of which require registration of the operation to the printed pattern. In these applications, it is highly desirable to recognize the image of the registration object through special image processing algorithms and measure positioning error from the object in question to the printed web marks as opposed to using conventional pixel inspection methods detailed in the prior art.

For these applications, an encoder is attached to the machine and provides pulse information defining the position of the operation, whether it be a perforation cylinder, sheeter knife, etc. This encoder is used to provide the trigger to the strobe from which an image is obtained that includes the image of the reference mark. By knowing the encoder number from which the strobe trigger is derived, and the number of pixels to the mark, both variations in X and Y can be accurately determined with the appropriate corrections introduced.

The same mark pattern used for color to color register control and Zoom Calibration can be used for registering any of these additional operations. It is desirable to have the camera located as close as possible to the operation to which registration is being held.

Repeat Length Measurement

In many web printing and converting operations especially where the more stretchable (elastic) material is used, the length of the printed product varies significantly due to web tension to the point that the product cannot be used in the subsequent color or mechanical manufacturing stages. Thus, it is desirable to provide a means to continuously measure the printed repeat length and provide an alarm when the repeat length is going to exceed acceptable tolerances.

This application requires two cameras located a discrete number of repeats apart. A printed mark of sufficient length to enable Zoom Calibration is printed once per repeat. A movable roller located between the two cameras provides the ability to adjust the distance between the two cameras. This roller is adjusted so that the image of the printed mark is centered in both cameras when both strobes are triggered simultaneously. Thus counting of pixels as in the color to color application provides a means for accurately measuring the repeat length variation. That is, the repeat length variation is represented by the number of pixel distances between the two images over the number of images between the two cameras.

It is recognized that the measured repeat length includes the affect of variations in infeed tension and the tension in the measurement zone as well as the affect of heat on the substrate. Mounting tension transducers at the infeed and within the measurement zone provides tension information necessary to determine the affect of tension. Tests conducted with known variations in all three parameters and entered into a lookup table enables the determination of accurate repeat lengths and the conditions under which the repeat length is being measured.

Variations of Repeat Length Measurements

Under some circumstances there is a benefit to not triggering the repeat length measurement on mechanical web features, but rather inspection of the entire circumferential web surface is desired, as in cases of continuous roll paper printing. Here there are no score/cut marks on which to trigger a repeat length measurement. In these instances the Zoom Calibration method may be used in both a synchronous and asynchronous length measurement mode, to determine the distance between arbitrary objects present on the web surface.

Asynchronous Repeat Length Measurement (Continuous Operation)

In this application, objects that are present in the Y direction of the web are distance measured using the Zoom Calibration method. This requires that there be a means of attaching an encoder to a continuous operation of the print cylinder, where each encoder pulse is represented in distance R/E, where R represents the distance of one encoder revolution and E the number of counts for this distance.

The Zoom Calibration method in this application requires a means of triggering and acquiring an image precisely at the rise of any specific encoder pulse T. Once the image has been captured, the center pixel of the image is set as the origin Y=0.

Once this origin procedure has been accomplished, this position is calibrated using Zoom Calibration. At this point each pixel represents a discrete distance in the Y-direction as YP. These pixel distances in the Y-direction may be summed using the relation G×R/E and Y×YP to equal the distance from an arbitrary circumferential position of the encoder at zero count to the object represented by a second calibrated image capture.

Synchronous Repeat Length Measurement (Repetitive Operation)

In this application, objects that are present in the Y direction of the web are distance measured using the Zoom Calibration method. This requires that there be a means of attaching an encoder to a repetitive operation such as a printing cylinder with R representing the repeat length of the repetitive operation, E the number of counts per repetitive operation, where R/E represents the distance per encoder pulse within the repeat length.

The Zoom Calibration method in this application requires a means of triggering and acquiring an image precisely at the rise of any specific encoder pulse T. Once this has been done, the center pixel of the image is identified as 0 and image processing is used to identify a pixel related to the object in question as the Y coordinate.

The zoom lens is calibrated before the images are acquired, with each pixel representing a discrete distance in the Y direction as YP. These distances are then added together using the relations G×R/E and Y×YP as giving the distance from an arbitrary circumferential position of the encoder at zero counts to the object represented by the observed Y coordinate.

Repeat Length Variation Summary

The above examples illustrate but a few of the possible variations in using the Zoom Calibration method as applied to calculating absolute or relative distances in the circumferential (Y) direction of web travel. What is significant about this and other applications of the Zoom Calibration method is the ability to precisely predict distances in the circumferential (Y) direction of web travel with no knowledge or calibration standard in that axial orientation.

For example, the Zoom Calibration reference plate may be oriented in the X direction, the Zoom Calibration method performed, and the result used to calibrate distances in the circumferential (Y) axis of web travel. The converse is also true: it is possible to Zoom Calibrate based on a Y-oriented reference and measure longitudinal (X) distances accurately across the web.

This ability to convert back and forth between different axial dimensions while retaining measurement accuracy is a key feature of the Zoom Calibration method. Note that this feature has great benefit when Zoom Calibration reference marks are placed in longitudinal alignment across the web surface, and these reference marks are then used to accurately determine circumferential (Y) web distances. Since web stretching is primarily a circumferential phenomenon, the longitudinal reference is relatively immune from stretching, making the use of this as a printing distance reference suitable in many applications. The use of this on-site distance reference permits both register control as well as rapid calibration in the same reference mark. See FIG. 8 and FIG. 9 for typical examples of horizontal Zoom Calibration reference marks suitable in this application.

Special Applications: Punched Straw Hole Print Registration

In the aseptic packaging industry, a straw hole (used for extracting the liquid beverage) is punched in the material and must be held closely in register to the pruning. Otherwise, when the container is completed the straw hole may be located in an unacceptable position on the finished beverage container.

This is a register measurement problem where the round straw hole and a small printed square are first recognized through image processing techniques. These two objects are located on the same image and measured through Zoom Calibration. The reference mark can either be printed square, or alternatively, a separate mark located at the side of the traverse that is first measured to calibrate the zoom. The camera is then moved over the image without moving the zoom, recognizing the two images (printed mark and the straw hole) and measuring the location of one to the other.

Both the dimensions of the printed mark and the straw hole are known and can be entered into the computer directly or can be measured by moving a cursor over the mark or straw hole and selecting STORE as illustrated in FIG. 16 and FIG. 17.

Web Measurement (Lateral Direction)

With Zoom Calibration and using the camera to measure the web edge extents, accurate lateral measurements can be made within one pulse of the encoder mounted on the traversing mechanism. This measurement accuracy is achieved irrespective to the positioning repeatability or accuracy of the traverse positioning mechanism.

Conventional positioning devices have a positioning accuracy which may be many times the encoder resolution. For example, an exemplary embodiment of the traverse encoder has a resolution of 0.001 inch per pulse. The repeatability and positioning accuracy of the traverse is much greater or about ±0.040 inch.

When a lateral position of the edge or a mark is measured from the image using Zoom Calibration, the position of the encoder when the camera comes to rest and before the image is taken is read. This position includes the positioning inaccuracy of the traverse mechanism. When the image is taken and the number of pixels to the edge or mark is taken, the positioning inaccuracy of the mechanism can be accounted for and this positioning inaccuracy eliminated.

Thus, the lateral position can be measured to within one encoder pulse regardless of the positioning inaccuracy of the traverse positioning mechanism.

Some new and inventive applications using this capability include:

(1) Accurate measurement of the actual web width. The edge of the web is detected from the image using edge enhancement image processing techniques. The traverse is automatically moved to first one edge where the encoder position and number of pixels to the edge is recorded. It then moves to the other edge and records the encoder position and number of pixels to the edge. The web width is the difference between these two values corrected for distance using the disclosed Zoom Calibration method. Note that for opaque substrates, a black plate can be located under the web so that the edge will be black on white which is easily detected.

(2) Mark/Image Measurement. To the above application (1) can be added the measurement of a printed mark or image from each edge. For example printed marks can be located on each side of the web. Using the above technique and recognition of the marks the same as in the register control, measurements can be automatically made and recorded of the distance from each edge to the marks, distance between marks and the web width. This information can be used to measure and control shrinkage of the material, locating the lateral position of the web within the machine and locating the position of the image on the web.

(3) Shrinkage Control. On some substrates the control of shrinkage is a very difficult problem and typically the major cause of this manufacturing anomaly is not known. Generally shrinkage is a heat and tension related problem. The ability to monitor shrinkage and web width would enable the ability to determinate the cause and control it. Using the Zoom Calibration mark pattern printed on both sides of the web enables shrinkage to be measured for every color. With this information corrective action may be taken by an operator or engineer to correct any shrinkage problems that are detected.

(4) Margin Width Control. Usually extra margin width is required for the sole purpose to accommodate variations in web lateral movement and paper width variations. With the ability to center both the web and the image, margin width could be reduced with very large economic benefits, as the extra margin width equates directly to manufactured material which must be scrapped. With a single camera measuring these parameters and located at the rewind end of the press, automatic adjustment of the lateral position of the roll stand, a web positioner, the printing cylinders and/or the rewind could be accomplished as required to optimize the lateral positioning of the process.

Initial Register

Each time a commercial printer sets up a new production run, a process termed "initial register" must be performed to initially register the printing press to ensure a quality manufactured product. This procedure must be performed each time a new production run is started, and as such, any manufacturing waste associated with the initial register must be costed out as overhead, since material consumed during the initial register phase is usually unsaleable. With shorter and shorter run lengths, most printers experience a great number of changeovers each year. Thus, the time and material expended in obtaining initial register represents a significant cost factor.

There are two stages of achieving initial register.

(1) Insetting the printing cylinders so they are within the range of the mechanism included on the machine for the purpose of adjusting initial register. All present methods addressing this first phase have concentrated on establishing procedures from the initial mounting of the plate cylinders through computerized insertion of the mounted cylinders in the correct position within the machine. These methods are cumbersome, expensive and do not always work. This method will be referred to as predictive cylinder insertion. Another approach developed as a result of the availability of the Zoom Calibration is a method which is completely devoid of any procedure. This will be referred to as random cylinder insertion. It uses Zoom Calibration and a machine mounted encoder.

(2) The second stage of initial register uses the mark pattern to automatically bring register into final salable product.

Method of Obtaining an Initial Register

All variable repeat printing machines have the difficulty of rapidly achieving initial register upon startup of a new job. On Central Impression presses which use the flexographic printing process, the plates are mounted relative to the keyway or other mechanical reference provided on the cylinder shaft. This mechanical reference is used to then insert the cylinder at the correct tooth on the bull gear where the one tooth circumferential register range of correction is sufficient for obtaining initial register.

Elaborate computers to predict, locate, and automatically insert the printing cylinders at the correct tooth are employed by all manufacturers of this type of press.

This system has been used for some time. It is expensive to implement and quite prone to error. For example the plate cylinders must be mounted very accurately relative to a mechanical reference on the cylinder shaft. This process must be adhered to or the rest of the system does not function. All too often mounting errors of the plates require a manual engaging of the gears on a trial and error basis consuming considerable time and material.

This method of cylinder insertion will be called Predictive Insertion as every step in the process from mounting the plates on the cylinder to inserting the cylinders in the press is predicted and requires a procedure that must be followed religiously for the predicted results to become a practical reality.

Predictive Insertion has been used on Central Impression presses for some time as the construction of the press provides very limited range circumferential adjustment (one tooth). Thus the gears must be meshed at a specific tooth on the bull gear and the plate cylinder gear before the job can be registered accurately. The alternative to predictive insertion is trial and error clearly a very inefficient method which consumes considerable time and material.

The mechanism for adjusting circumferential register on these presses consists of moving the helix gear attached to the plate cylinder laterally on the large helix bull gear. The helix angle provides circumferential movement. This method of circumferential adjustment limits the circumferential adjustment to the width of the bull gear and the helix angle used. For practical considerations this maximum range is equivalent to the movement provided by one tooth. Thus the use of predictive insertion for this design is the only alternative for efficient reduction of changeover (reconfiguration) time.

This press design is very expensive to build, is difficult to work on and requires lengthy changeover (reconfiguration) times.

As run lengths become shorter, the unit-to-unit press is favored as it is easy to work on, one set of printing units can be running with another set of printing units being made ready for the next job using the same crew. Any number of colors can be printed and is not limited to eight.

Unit-to-Unit Flexographic and Web Offset Presses

The unit to unit presses are equipped with 360 degree differential gearboxes for each cylinder or separate motors which act as 360 degree gearboxes. Thus once the cylinder is inserted, register can always be achieved by moving the cylinder via a small motor attached as one input to the differential or acting directly in repositioning the separate motor. The major problem using this system is getting the cylinders in register initially.

The method of doing so in this disclosure concentrates on getting the cylinders into register rapidly with Random Insertion of the cylinders instead of Predictive Insertion.

The advantages of Random Insertion include:
(1) Insertion of cylinders into the press is completely random relative to the circumferential position. All of the procedural steps of Predictive Insertion are eliminated. The plates can be mounted at random around the cylinder without regard to a keyway or some index position and the printing cylinder gear can be meshed at any tooth with the impression cylinder gear.
(2) Any combination of printing cylinders with any lengths between stations is accommodated.
(3) Complete initial rough register and final accurate initial register is obtained with the same camera based system.
(4) Make ready time and material consumed is a constant and less than predictive insertion.

The following description is how this system would provide for rapid initial register of both lateral and circumferential register. Electric motors are provided for moving both the lateral and circumferential mechanical positioning mechanisms. Lateral adjustment is limited to a specific range for example ±⅜ inch, with the circumferential adjustment continuous through 360 degrees.

NOTE

Lateral adjustment of the cylinder occurs by moving the cylinder laterally with a mechanism. In some designs the plate cylinder gear is rigidly attached to the plate cylinder and moves with it. In these instances and using helical gears, a circumferential movement is imparted when the cylinder is moved laterally. For example if the printing cylinder is moved laterally ¼ inch, with 45 degree helical gears, it is also moved circumferentially ¼ inch. It is easy to take this into consideration by making an equivalent correction in the circumferential direction whenever a lateral correction is made. The relationship of the circumferential correction relative to the lateral corrections a constant and based on the helix angle of the gears being used.

Using Random Insertion the only restriction or procedure required is to mount the plates so that any lateral adjustment will remain within the lateral adjustment mechanism that is incorporated on the printing machine. This adjustment range is about ±⅜ of an inch for most designs.

Procedure for Obtaining Initial Register With Random Insertion

The following definitions will be used within the context of this procedure:

Rough Register. Defined as the initial register of cylinders which bring register to within the specifications of some embodiment of a Zoom Calibration reference mark pattern.

Final Register. Defined as final register as defined by the alignment of some embodiment of a Zoom Calibration reference mark pattern.

Process Steps (1) Synchronize the camera to the FIG. 2 image processor 206 by entering the number of teeth on the plate cylinder through the touch screen 204.
(2) Insert all cylinders into the correct stations. Any tooth of the plate cylinder can be engaged with any tooth of the impression gear.
(3) Position the lateral adjusting mechanisms of all stations to the center position of their travel. This is accomplished by first running all lateral motors for a time equivalent for moving through the complete full travel of the mechanism to assure that the lateral mechanism is in one extreme of its travel into the limit switch. Then return all lateral motors to their center position which is half the time for full travel.
(4) Calibrate the zoom lens and the selected nominal zoom value using the disclosed Zoom Calibration method.
(5) Run the press and print all stations. Position the crosshair 1601 (FIG. 16) of any station roughly in the center of the monitor, move the cursor over it and select STORE (FIG. 17) and enter the printing unit number that prints this color. Continue on in the same manner locating the cursor over each crosshair selecting STORE and entering the number of the printing unit printing that color.

Figure 21:
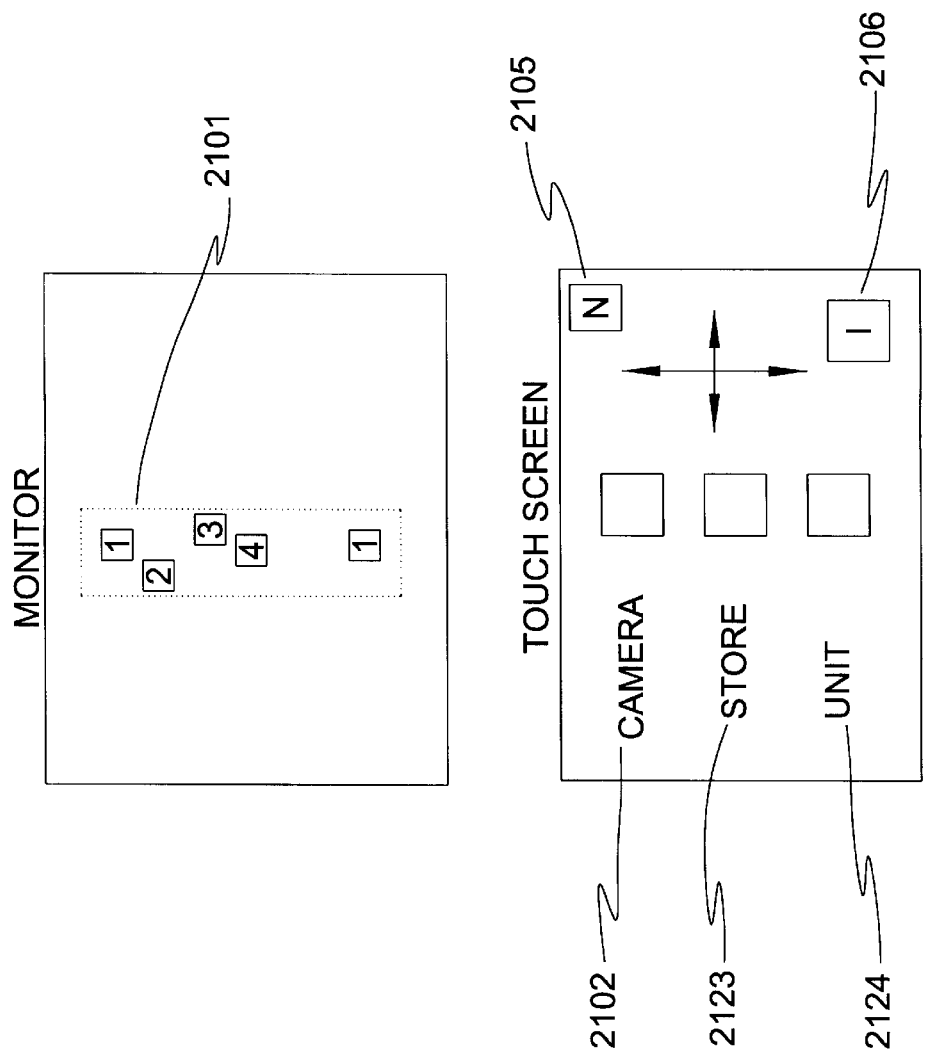
Figure 22:
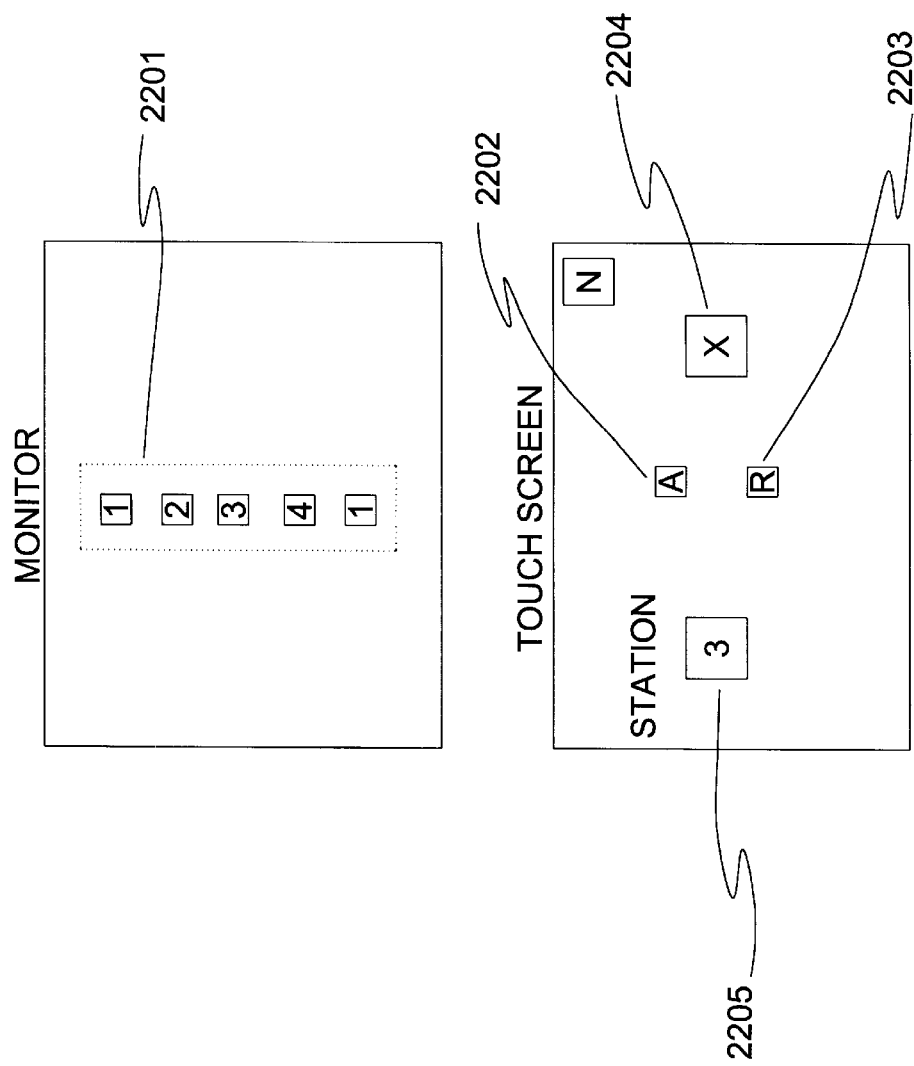

(6) Stop the press, and select I (Initialize) (2003, FIG. 20). All motors will run for the specified time to bring all color station into close register within the mark pattern specification as defined in (1109 FIG. 11).
(7) Run the press and print all colors and locate the mark pattern 2101 in the center of the monitor (205 FIG. 2) as illustrated in FIG. 21. Note the marks are not aligned exactly and include any small errors in positioning the motors.
(8) Select Initialize 2106 (FIG. 21) and the marks will be aligned automatically as per (2201 FIG. 22).
(9) Any final errors are a result of inaccuracies in making the web printing plates. These errors can be corrected though the register adjust buttons 2202 for ADVANCE, and 2203 for RETARD in FIG. 22. Any station for which a permanent correction is desired is first selected using station input 2205 with the amount of correction selected with offset input 2204. Upon selecting 2204 a calculator appears and the desired amount of correction is entered. Selecting either 2202 or 2203 will advance or retard the station selected by the amount entered into the calculator.
NOTE: Multiple Mark Patterns Depending upon the application the initial register errors and accuracy requirement may require two or more Zoom Calibration reference mark patterns. One pattern with large mark spacing for large initial register errors, and another with marks spaced closely together for better resolution. The two mark patterns would be chosen so that the large mark pattern would enable initial register to be achieved to within the specifications of the smaller mark pattern. This procedure enables large initial register errors and accuracy to be achieved simultaneously.

Calculation of Correction to Achieve Initial Register

Each time STORE is selected in FIG. 17, the position of the encoder and the number of pixels from the center of the display is stored for both X and Y using the same math as in the Zoom Calibration description with the final formula repeated here:

$$X_{POS} = \frac{T}{H} + X \times X_P \quad (18)$$

where $X_P \equiv \frac{M_D}{X_C}$ Horizontal Marks $$X_{POS} = \frac{T}{H} + X \times \left[\frac{4}{3} \times \frac{492}{512} \times Y_P\right] \quad (19)$$

where $Y_P \equiv \frac{M_D}{Y_C}$ Vertical Marks

Accuracy using this method is one encoder pulse or one pixel whichever is less.

$$Y_{POS} = \frac{G \times R}{E} + Y \times Y_P \quad (20)$$

where $Y_P \equiv \frac{M_D}{Y_C}$ Vertical Marks $$Y_{POS} = \frac{G \times R}{E} + Y \times \left[\frac{3}{4} \times \frac{512}{492} \times X_P\right] \quad (21)$$

where $X_P \equiv \frac{M_D}{X_C}$ Horizontal Marks

Accuracy using this method is one pixel.

Math Description

In initial register each crosshair position is stored as both $X_{POS}$ and $Y_{POS}$. Thus all crosshairs are represented by and X and Y position referenced to a (0,0) coordinate origin position.

By subtracting these values directly relative to some fixed position (key color, cutter creaser die position, perf cylinder, or (0,0) coordinate origin), the amount of correction required to register the crosshair of each station is determined. A shortest distance calculation compares this value with half of the repeat length driving the motor in either the advance or retard direction whichever is shortest.

NOTE

For presses equipped with fixed plate cylinder gears where lateral correction will make a circumferential correction due to the helical gears, the Y position must be corrected by subtracting or adding the correction of the lateral direction due to the helical gears.

The cylinders may be positioned in a number of ways as follows:
(1) Select a key color. When INITIALIZE is selected in FIG. 13, all stations will be positioned to the position of the key color. All circumferential stations will be positioned in the direction requiring the least travel.
(2) When INITIALIZE is selected, all stations will be positioned with the least amount of movement required.
(3) When in line with a cutter crasser, a zero reference encoder will be used with one revolution of the encoder for one repeat length. The distance from the leading edge knife under the cutter head to the printing units will be known. This distance can be taken into consideration so as to position all cylinders relative to the cutter.

Note

The zoom lens calibration can take place from a known printed mark or from a known mark located at the side of the traverse and used solely for calibration. In either case the zoom is calibrated as in the description of the Zoom Calibration method.

Automatic Low Speed Mark Scanning

By knowing the number of teeth, the pitch diameter of the gears, the circumference of the cylinder can be calculated. Through software, the image can be advanced automatically one-half of the field of view with each new image, thus making sure that all crosshairs or marks will be observed. For each crosshair the operator will center the cursor, press STORE and enter the number of the color unit that prints the color. Pressing a button on the touch screen will start the scan, and pressing it again will stop the scan. Thus, the operator will stop the scan each time a new crosshair appears on the screen and continue it after the number of the color unit printing the color is entered. Any number of crosshairs can be entered for any one picture.

The automatic picture advance button provided for a continuous scan around the entire image so that all colors can be entered. It is desirable for low speeds where a long time occurs between images.

Variations Of Initial Register

It may be helpful to superimpose the mark pattern as boxes on the monitor when identifying the crosshair. After pressing store, the cursor could be moved to the correct box that printed this color. In this manner the mark pattern can be programmed during the gross register adjustment phase instead of a separate step after gross register has been achieved.

Variations of this could include a completely automatic setup where after gross register has been attained, the Zoom Calibration reference mark pattern is located and final register is achieved.

Register Control

The art of automatic register control is advanced with Zoom Calibration, making possible numerous new applications. Different marks and spacing are software selected and are recognized through image processing techniques. Combined with Zoom Calibration, a range of marks and spacing can be selected with accuracy and repeatability that enable a number of new applications never before possible.

The following description is the significance of the marks and their use with Zoom Calibration and refers to FIG. 6–9.

These mark patterns show the use of marks that are 1 mm square and spaced 2 mm apart. FIG. 6 shows the marks aligned vertically and FIG. 8 shows the marks aligned laterally. The vertical pattern is ideal for marks that are printed in the margin and their small size enables a minimum of side trim. The horizontal mark pattern is ideal for marks that can be located within scrap areas within the printing area and can be removed later as they are in the printing of folding cartons.

Note that in both patterns the first and last mark is printed by the same color. The distance between these marks is known and is used for Zoom Calibration. Each of the remaining marks are printed by the other printing units one for each color.

The marks are incorporated within the artwork in a manner so that when they are aligned the printing is in register. In this manner the printing plates need only be initially registered to within the spacing of the marks both horizontally and vertically.

The range for initial register for example in mark pattern FIG. 6 would be ±1 mm in the vertical direction and ±1 mm in the horizontal direction. Obviously the marks must be located with some clear area around them in order to be automatically recognized by the software. In this example eight colors would occupy just over one inch in the vertical direction (29 mm). Thus with 500 pixels representing one inch, the resolution would be 0.002 inch per pixel. The Zoom Calibration would take place on the outermost marks which are printed by the same station. Since they are always aligned because they are printed by the same printing cylinder, they are easily recognized and are thus used for calibration as their distance is known and will not change.

Referring to FIG. 8, the marks are arranged horizontally. Again the first and last marks are printed by the same color with each of the other colors printed by a different color unit. The initial register error in the lateral direction is equal to ±1 mm and in the vertical direction equal to clear area both before and after the mark image that is on the monitor. In this case the resolution is slightly greater as the X-direction is greater by 4/3 the Y direction.

Mark Size

The marks are chosen for the process and for the application. The offset process is the most precise, with the highest printing resolution. Marks as small as 0.3 mm can be easily printed and used for register control. In the flexographic process, larger marks are required because of the lower printing resolution of the process. This process, however, is the most versatile, with applications that require marks as small as 1 mm and as large as 4 mm as illustrated in FIG. 5 of Provisional Application Ser. No. 60/025,592.

In FIG. 5 of Provisional Application Ser. No. 60/025,592, eight marks would require a 2 inch field of view. The zoom is presently represented with a range of 0.5 inches to 8 inch at a zoom position of 100% to 0%.

Zoom Calibration is used for all positions as the zoom is continuously moved for automatic register control. Thus, the zoom can be positioned any place in between using any size marks and mark spacing.

Initially when finding the marks the size, spacing and location of the marks are known. The two marks printed by the same station serve two purposes. First they are used for Zoom Calibration, and they identify the mark pattern as their spacing is accurately known.

Multitasking of Web Inspection/Control Functions

Overview

In addition to its use within the context of the individual web inspection/control functions, the Zoom Calibration method may be applied advantageously to the problem of multitasking these functions in novel combination within the operational scope of a single system. As contrasted with these functions as described in the prior art, the Zoom Calibration method and system permit any combination of conventional web inspection/control functions to be performed economically without a multiplication of the hardware cost associated with the function implementation.

Within the context of this multitasking ability, an exemplary list of possible functions which may be multitasked using the Zoom Calibration method and system is provided in Table 4.

TABLE 4

Typical Web Inspection/Control Multifunction Tasks

| Web Inspection/<br>Control Task<br>Identifier | Task Function/Sequence |
|---|---|
| INITIAL PRESS SETUP AND INITIAL REGISTER | During the initial set up of the machine, perform initial register according to the Zoom Calibration method disclosure. AT LEAST TWO ZOOM CALIBRATION CYCLES REQUIRED. |
| WEB WIDTH MEASUREMENT AND CENTERING CONTROL | Perform Zoom Calibration and with image processing determine the distance from the web registration marks to the edge of the web. Correct as required to maintain centering of printed image on web. Requires edge detection inspection of both web edges. ONE ZOOM CALIBRATION CYCLE REQUIRED. |
| BAR CODE VERIFICATION | Find and inspect bar codes as to their decodability according to the ANSI (American National Standards Institute) specification. Requires a field of view of 2.5 inches to read the entire code for decodability. ONE ZOOM CALIBRATION CYCLE REQUIRED. |
| COLOR REGISTER MEASUREMENT | Read register marks and calculate register errors. Requires a field of view depending on the mark size and resolution of the process. From a 0.5 inch field of view at 0.001 inch resolution for offset printing using .020" square marks to a field of view of 2 inches at 0.004 inch resolution for preprint flexographic printing using 0.125" square marks. ONE ZOOM CALIBRATION CYCLE REQUIRED. |
| OBJECT REGISTER MEASUREMENT AND CONTROL | Use image processing in conjunction with Zoom Calibration to determine the absolute coordinates of a hole, score, die cut, or other web object using as the origin an arbitrary reference mark on the web. ONE ZOOM CALIBRATION CYCLE REQUIRED. |
| 100% REPEAT AREA DEFECT DETECTION | Continuously obtain images and inspect for defects. Zoom calibration is necessary before |

TABLE 4-continued

Typical Web Inspection/Control Multifunction Tasks

| Web Inspection/<br>Control Task<br>Identifier | Task Function/Sequence |
|---|---|
| | inspection cycle is started to know how many images are necessary to inspect the entire repeat. Field of view of about 4 inches is ideal. Permits the calculation of the number of encoder steps required to step an image across the repeat length of the web surface. Permits automatic calculation of strobe sync as a function of encoder value.<br>ONE ZOOM CALIBRATION CYCLE REQUIRED. |
| REPEAT LENGTH MEASUREMENT AND CONTROL | Zoom Calibration permits accurate calculation of distances in both X and Y directions, thus this method can be used with image processing techniques to accurately determine the repeat length of the web, and additionally provide press feedback to control web stretching due to infeed/takeup tension.<br>TWO ZOOM CALIBRATION CYCLES REQUIRED. |
| LATERAL MEASUREMENT AND CONTROL | Measure the lateral distance from the edge of the web material to a printed mark and to a line hole using image processing. Requires a field of view of 1.5 inches.<br>ONE ZOOM CALIBRATION CYCLE REQUIRED. |
| CALIBRATED VISUAL INSPECTION | Zoom Calibration permits accurate determination of web coordinates for a given object that is the object of a visual web inspection.<br>ONE ZOOM CALIBRATION CYCLE REQUIRED. |

Multitasking System Web Inspection/Control Process

Figure 31:
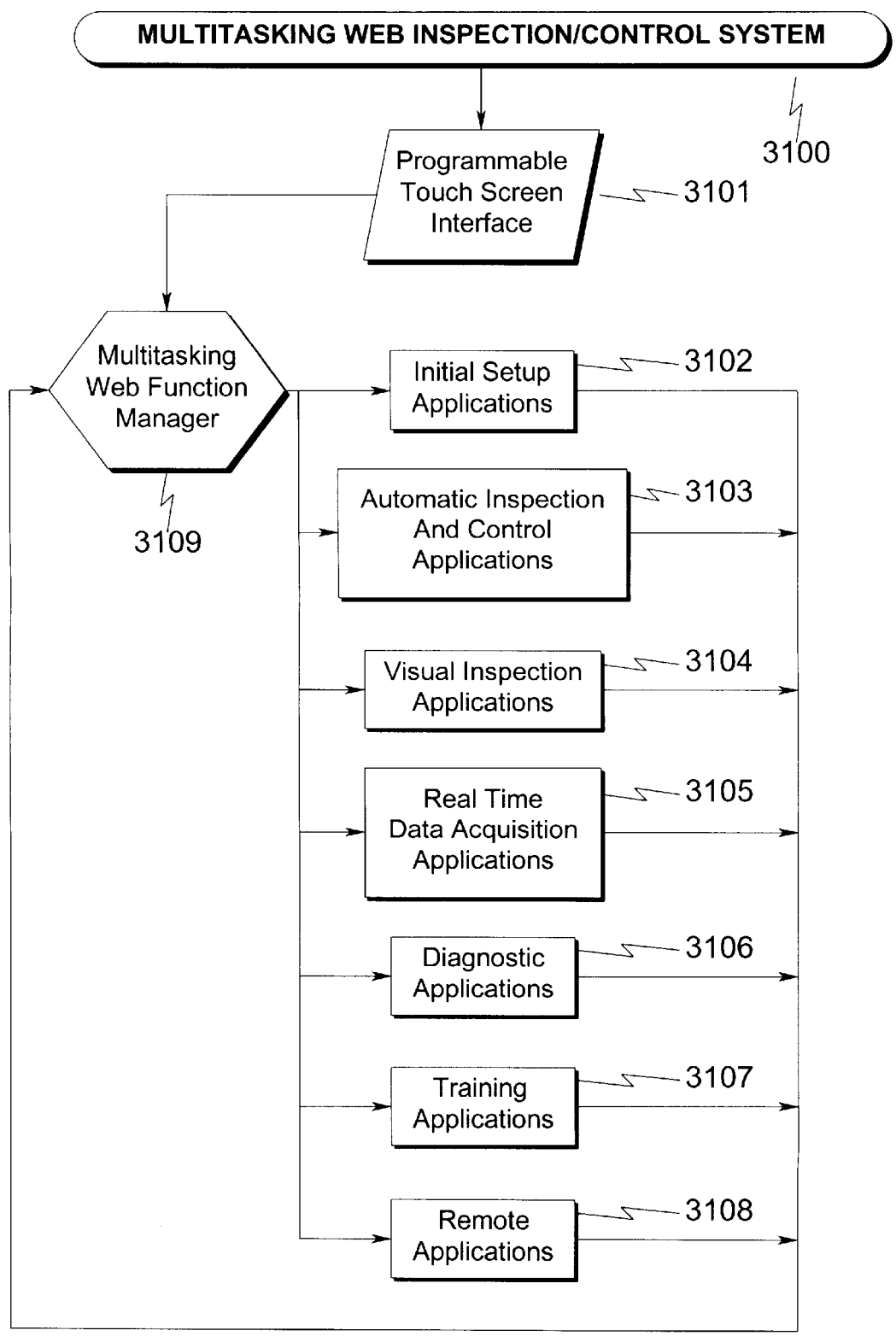
FIG. 31 illustrates a software flowchart for an exemplary embodiment of a Zoom Calibration system as applied to a multitasking web inspection control system. Note that the multitasked applications (3102–3108) are only illustrative of the many applications which can make use of the Zoom Calibration method to provide absolute coordinate accuracy over a wide field of view to permit inexpensive implementation of these functions in a web printing context.

A flowchart illustrating a possible system implementation of this multitasking system environment using the Zoom Calibration method is illustrated in FIG. 31. Note in this diagram that the Zoom Calibration method requires a minimum number of calibration cycles to accurately determine the position of any of the required web image/mechanical distances, regardless of the required field of view for the function, the position of the imaged web item, or the type of web inspection/control function to be performed. This results in a great reduction in overall operation time for a given function while at the same time providing a greater degree of overall system measurement accuracy.

FIG. 31 represents a number of individual applications that can be performed with the equipment of FIG. 2 both with and without Zoom Calibration. Only those functions which use Zoom Calibration will be discussed in detail.

At system power-up, the press is initiated at 3100, the RUN state. The control and operation for all applications are performed through touch screen 3101. The touch screen is an integral part of the system as it serves as a software configurable and programmable interface between applications and operational personnel. Note, however, that other input/output operator interfaces are possible with this embodiment.

Using this preferred touch screen configuration, any degree of improvement, additions, or new features can be added either on site or remotely as only software need be added for most functions. The versatility of touch screen technology with an almost infinite capability for interface development is well known by anyone skilled in the art and a discussion of the touch screen interface for each application will be omitted.

With Zoom Calibration a number of new applications each requiring precision measurement can be accomplished by a single system at a significant cost savings and greatly simplified operation. All of the functions 3102, 3103, 3104, 3105, 3106, 3107 and 3108 rely in some manner on Zoom Calibration. Only 3104 which is a totally visual capability of the system does not require Zoom Calibration, but can make use of Zoom Calibration to accurately position the image capture device over the web surface. This can, for example, be used to perform manual defect inspection of the printed web. An example of this requirement might be in security printing applications, to verify security printing features on the web surface.

Zoom Lens Calibration Process Detail

Figure 32:
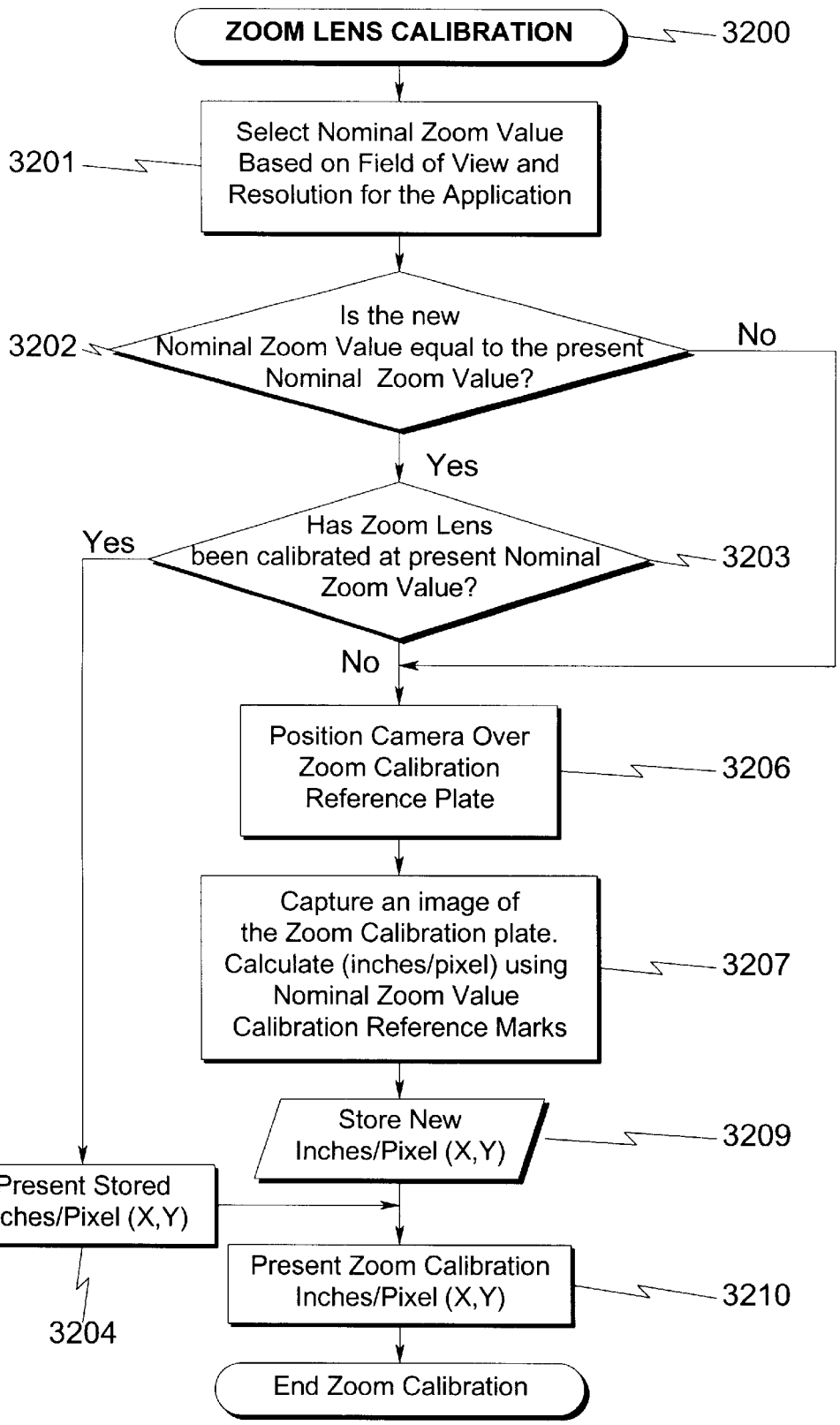
FIG. 32 illustrates a software flowchart for an exemplary implementation of the Zoom Calibration method as applied to a production web printing application. Note that this particular embodiment (or an equivalent thereof) is used as a basic subroutine in subsequent drawings (3302/3309 FIG. 33, 3506/3512 FIG. 35, 3603 FIG. 36, 3703 FIG. 37, 3805 FIG. 38, 3906 FIG. 39, 4003/4005 FIG. 40). As is evidenced by these varied applications, the Zoom Calibration method has wide applicability to the web printing process as well as any manufacturing application requiring inspection/control to be performed in a multitasking manner over one or more spatial dimensions.

FIG. 32 is a flow diagram of the procedure for calibrating the Zoom Lens. Whenever the zoom lens position is changed, the calibration procedure of FIG. 32 is required. The procedure starts with the selection of a Nominal Zoom Value 3201 which is chosen for the specific application. The Nominal Zoom Value can have a range providing a field of view of 8 inches and a pixel resolution of 0.016 inches to a field of view of 0.5 inches with a pixel resolution of 0.001 inch per pixel and anything in between. That is, if a 2 inch field of view is selected as the Nominal Zoom Value, than the pixel resolution is 0.004 inch per pixel.

If the new Nominal Zoom Value is equal to the last Nominal Zoom Value 3202 and the lens was calibrated at this Nominal Zoom Value 3203 then the present stored value of Inches/pixel 3204 can be used at 3210. If, however, the new Nominal Zoom Value is different than the previous Nominal Zoom Value, then the new Nominal Zoom Value is used to calibrate the zoom lens. The first step 3206 is to position the camera over the calibration plate, and capture an image 3207. The new inches/pixel value is calculated for the new Nominal Zoom Value. This value is stored and is used for all subsequent distance measurements for this zoom position at 3210.

Initial Setup Applications

Figure 33:
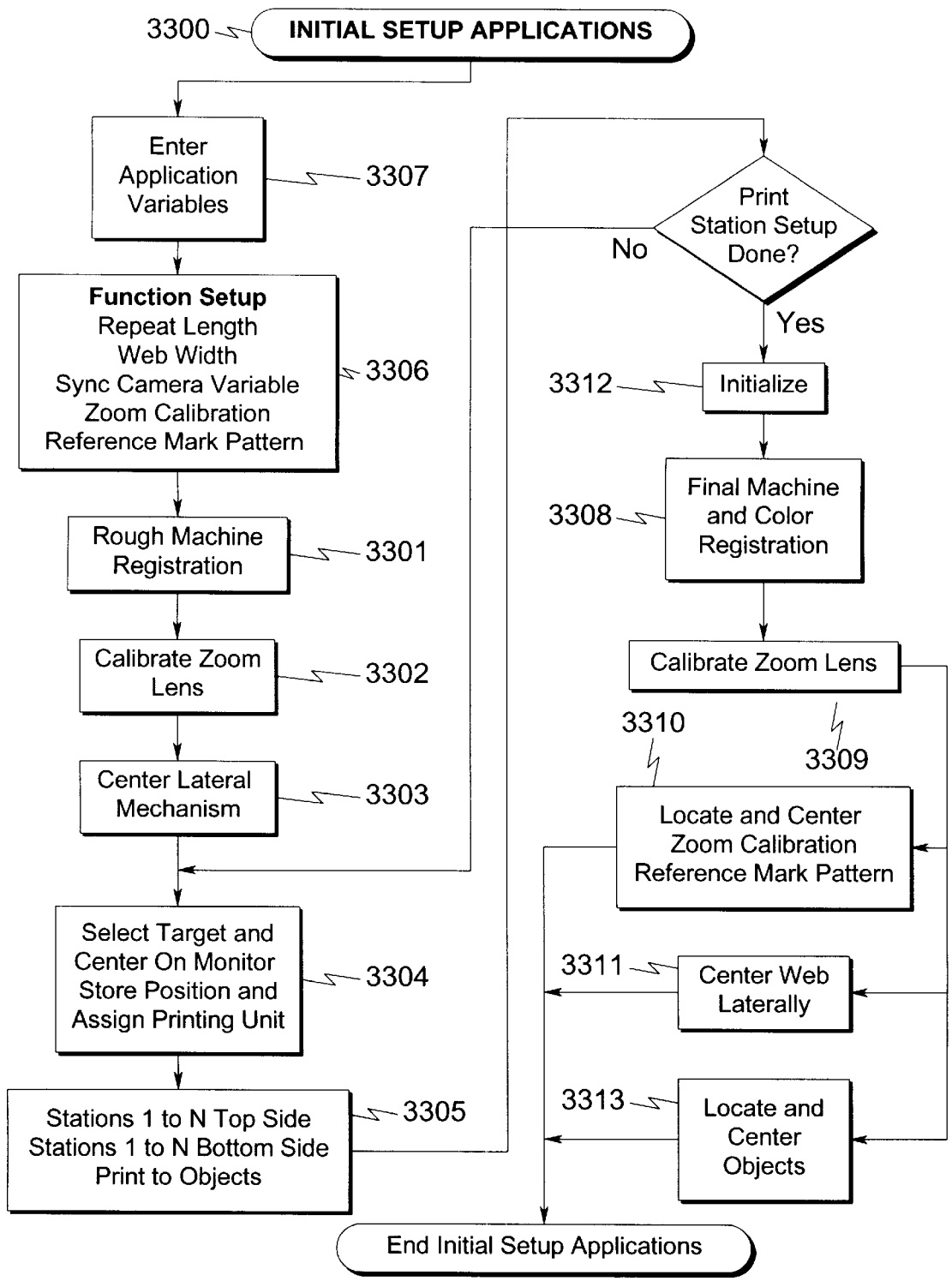
FIG. 33 illustrates a software flowchart for an exemplary embodiment of initial setup applications (referenced as process 3102 in FIG. 31) which may be used to initially configure a web printing process. The function setup step 3306 illustrates only an exemplary embodiment of the many possible setup functions possible using Zoom Calibration.

FIG. 33 is a flow diagram of the Initial Setup application (3102 FIG. 31) the first which employs Zoom Calibration for both X and Y in aligning the web, and registering the printed colors and objects that must be in register with the printing.

Initial Setup includes the method of rough machine registration of the printing units and objects such as line holes, scores, and die cut objects according to the disclosure with random insertion and special marks.

Automatic Inspection and Control Applications

Figure 34:
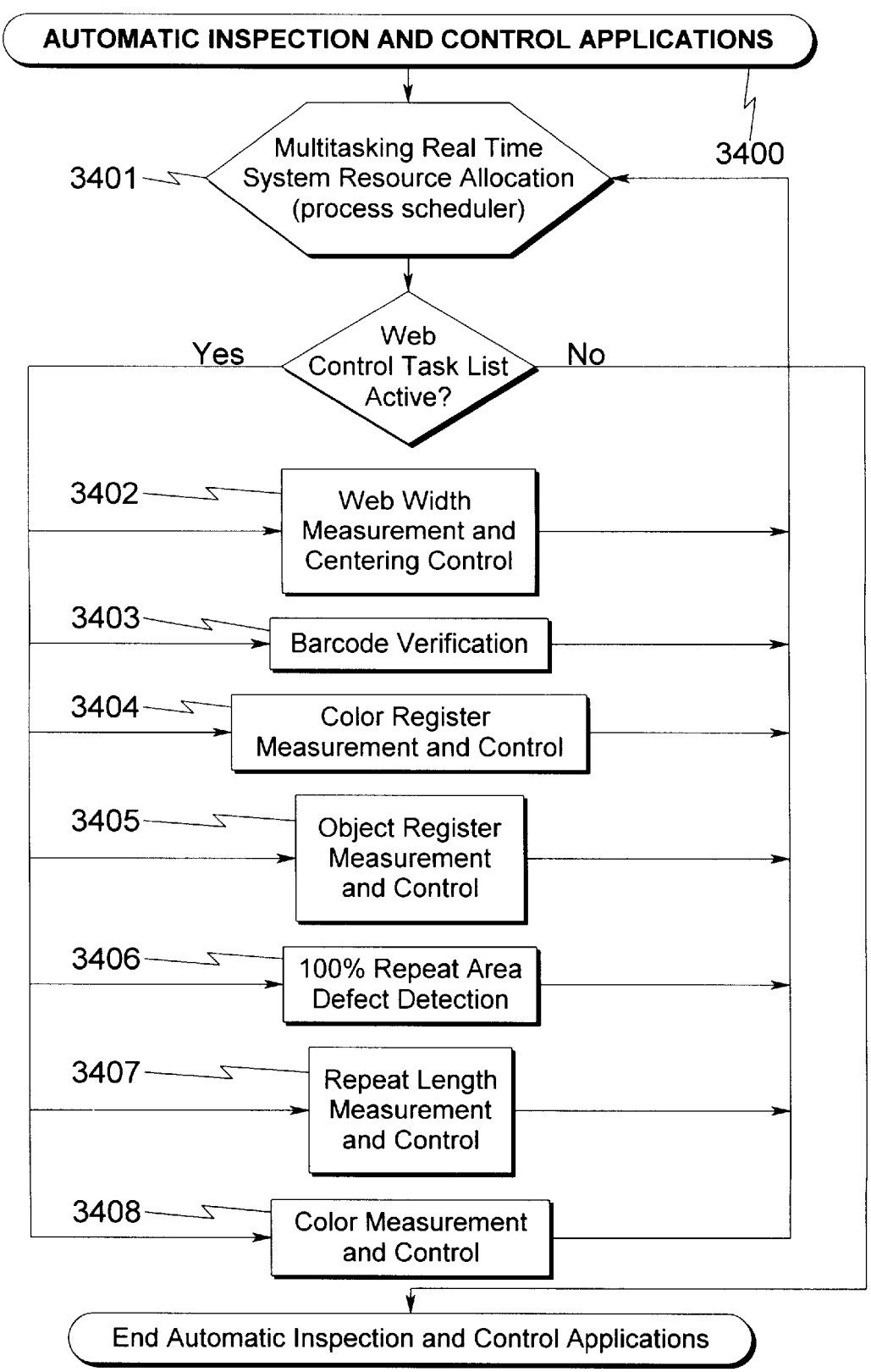
FIG. 34 illustrates a software flowchart for an exemplary web printing automatic inspection and control application (referenced as process 3103 in FIG. 31), in which a multiplicity of web inspection/control functions is multiplexed in time, each function being based on the use of Zoom Calibration to provide accurate distance and position measurements over a wide field of view. Since each of the exemplary functions listed (3402–3408) require different fields of view, the Zoom Calibration method can be used to provide this feature as well as accurate distance/position measurements in an absolute coordinate system over the entire web surface. Previous systems were capable only of fixed field of view with only relative distance measurements possible, making this type of multitasking impossible to achieve with a single image capture device.
Figure 35:
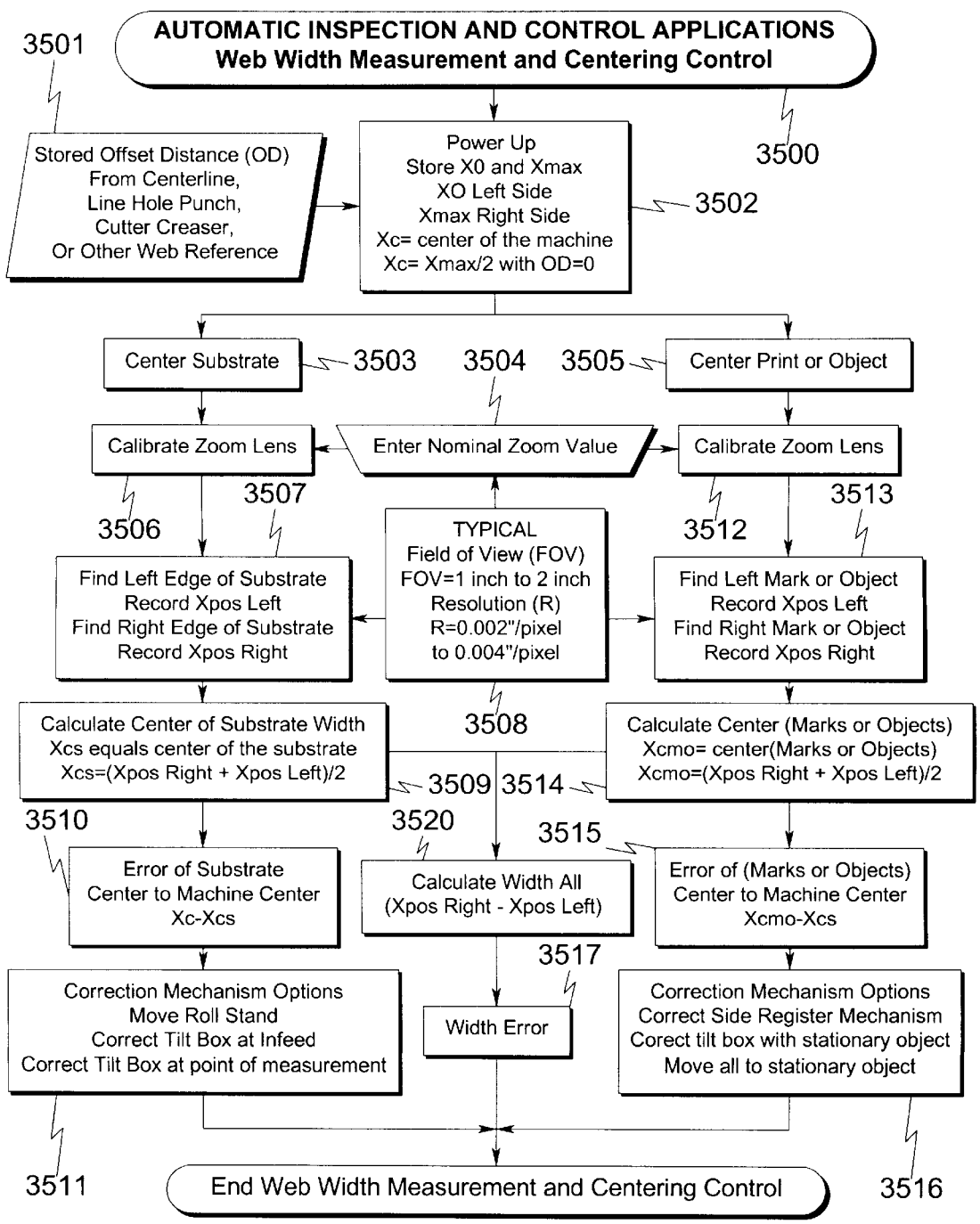
FIG. 35 illustrates a software flowchart for an exemplary web width measurement and centering control application (referenced as process 3402 in FIG. 34), which provides the capability of determining the absolute web width as well as providing a mechanism for centering the web in the printing process.

FIG. 34 is a list of the Automatic Inspection functions which require Zoom Calibration. A real time module 3401 allocates real time and the frequency of inspection based on the error profile for each function. For example, Bar Code variations are very slow and require verification about every 15 minutes where register variations are quite fast and require verification every 30 seconds or more.

Web Width Measurement and Centering Control

When power is first turned on, the power up procedure 3502 provides for automatic positioning of the camera at each end of the maximum travel. Two limit switches one located at each end of the travel are located so that the center distance between them is equal to the center position of the machine. As it is very difficult to locate and position the limit switches accurately an offset value is entered through 3501 which provides the additional benefit of locating the center at any position as may be required for running the substrate off of the center.

Step 3503 initiates the procedure for centering the substrate at the center of the machine. Zoom calibration occurs at step 3506 using the Nominal Zoom Value 3504 entered at 3508 . After Zoom Calibration, the camera traverse will locate first the left side of the web and then the right side using edge enhancement as previously explained. A direct addition of the $X_{POS}$ left and $X_{POS}$ right divided by 2 provides the location of the center of the substrate at 3509. The distance that this center must be moved to coincide with the center of the machine is Xc-Xcs at 3510. This error can be used to automatically move a motorized mechanism to move the complete unwind stand sideways, or to reposition a conventional web steering mechanism which could be located in the web path.

Step 3505 provides for the same procedure of centering the print or objects relative to the machine center. The objects could be line holes which are punched on both sides of the substrate, or a label die cutting unit or the lateral position of printed marks all of which must be centered to the machine and substrate. The lens is calibrated at 3512 based on the Nominal Zoom Value and the objects or marks are located automatically at each side of the substrate at 3513 with the center calculated at 3514 and the error calculated at step 3515. This error can be used to automatically center the objects or marks through motors and side register correction mechanisms or by moving the substrate to a stationary object through a lateral steering tilt box mechanism.

Note that the actual width of the substrate or the distance between objects or marks is calculated and is available at all times at step 3517.

Bar Code Verification

Figure 36:
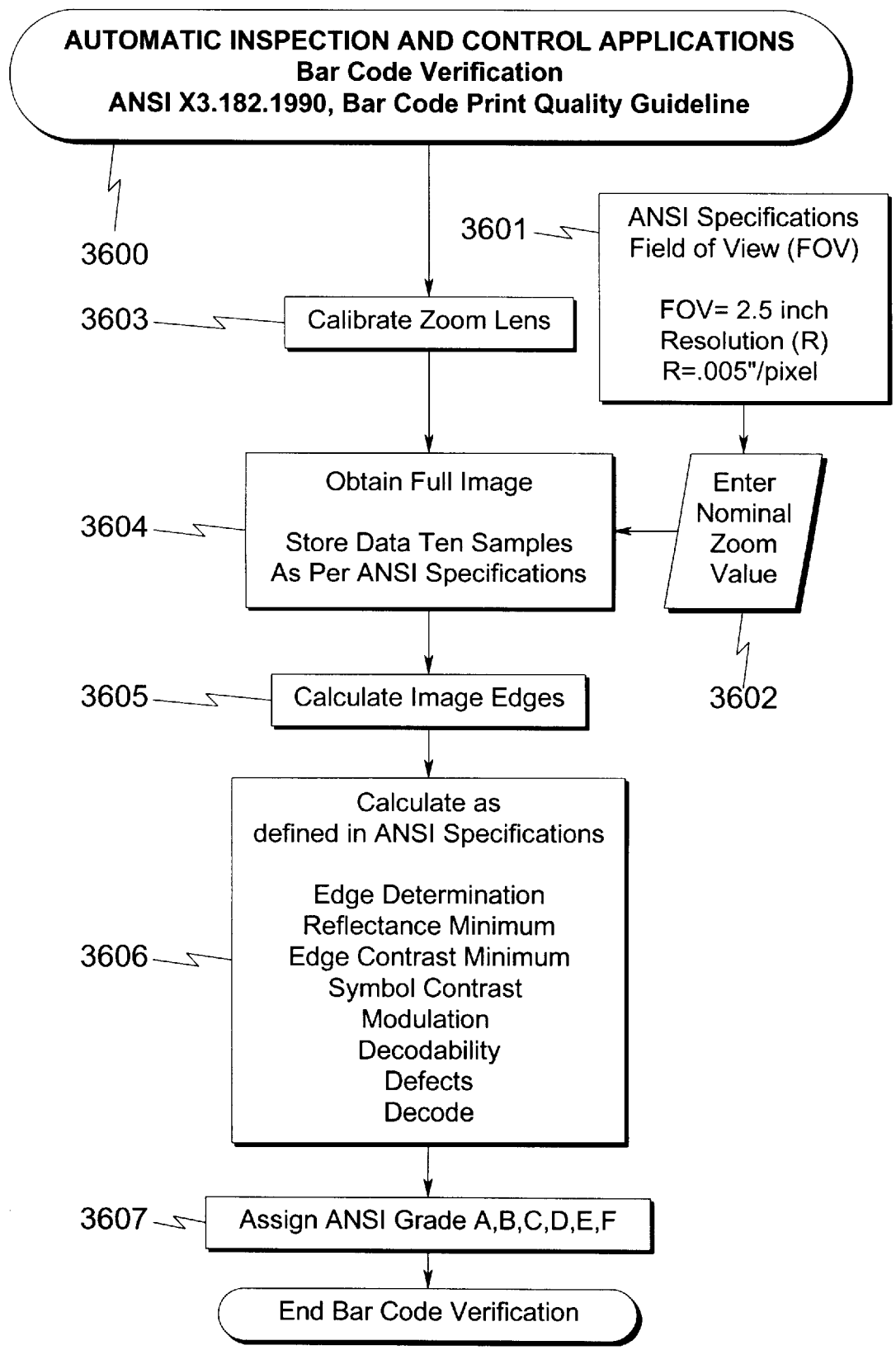
FIG. 36 illustrates a software flowchart for an exemplary barcode verification application (referenced as process 3403 in FIG. 34), which provides the capability of inspecting and decoding bar codes that are placed on the printed web by the web printing process.

Verification of bar codes to the ANSI standard is shown in FIG. 36. The ANSI standard ANSI X3.182.1990 provides the procedure and mathematics to arrive at a letter grading. The zoom is first calibrated to a nominal 2.5 inch field of view which is the smallest field of view that will accommodate a full bar code image as required by ANSI.

Image processing techniques provide an analysis of the image to determine its conformance to the eight ANSI specifications which determine the letter grade.

Color Register Measurement and Control

Figure 37:
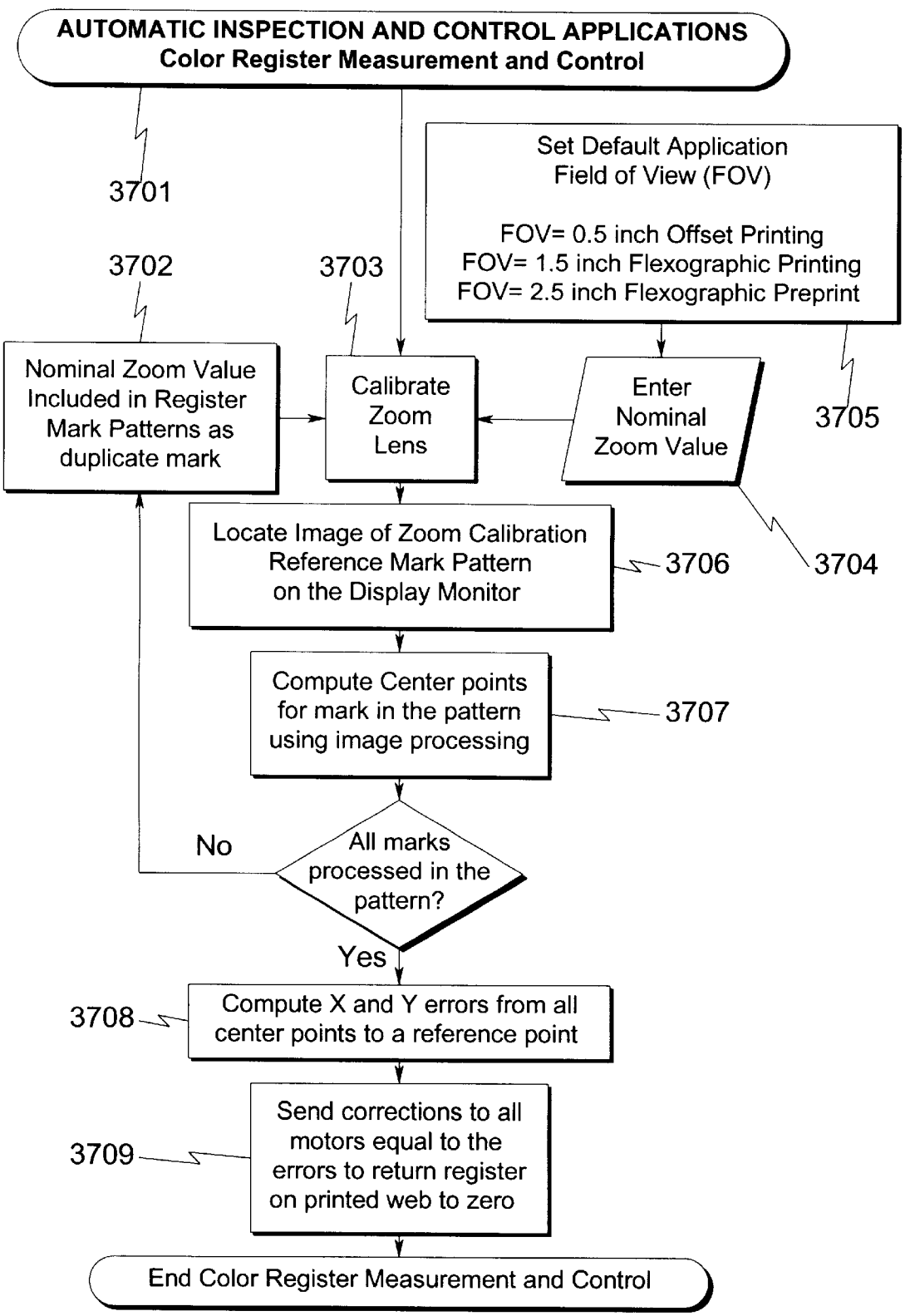
FIG. 37 illustrates a software flowchart for an exemplary color register measurement and control application (referenced as process 3404 in FIG. 34), which provides the capability of automatically re-registering a multi-color press while the press is generating printed web material. This process control task drastically reduces the requirement for operator intervention and oversight in the web printing process.

FIG. 37 is a flowchart of register control using a Zoom Calibration reference mark pattern. The Nominal Zoom value is entered at 3704 when Zoom Calibration is performed using the calibration plate, or is obtained from the mark pattern 3702 when the duplicate marks are incorporated into the mark pattern. The center points of the marks are calculated 3707 with errors calculated in both the circumferential direction Y and the lateral direction X. Corrections equal to these errors are then sent to the appropriate correction motors 3709.

Object Register Measurement and Control

Figure 38:
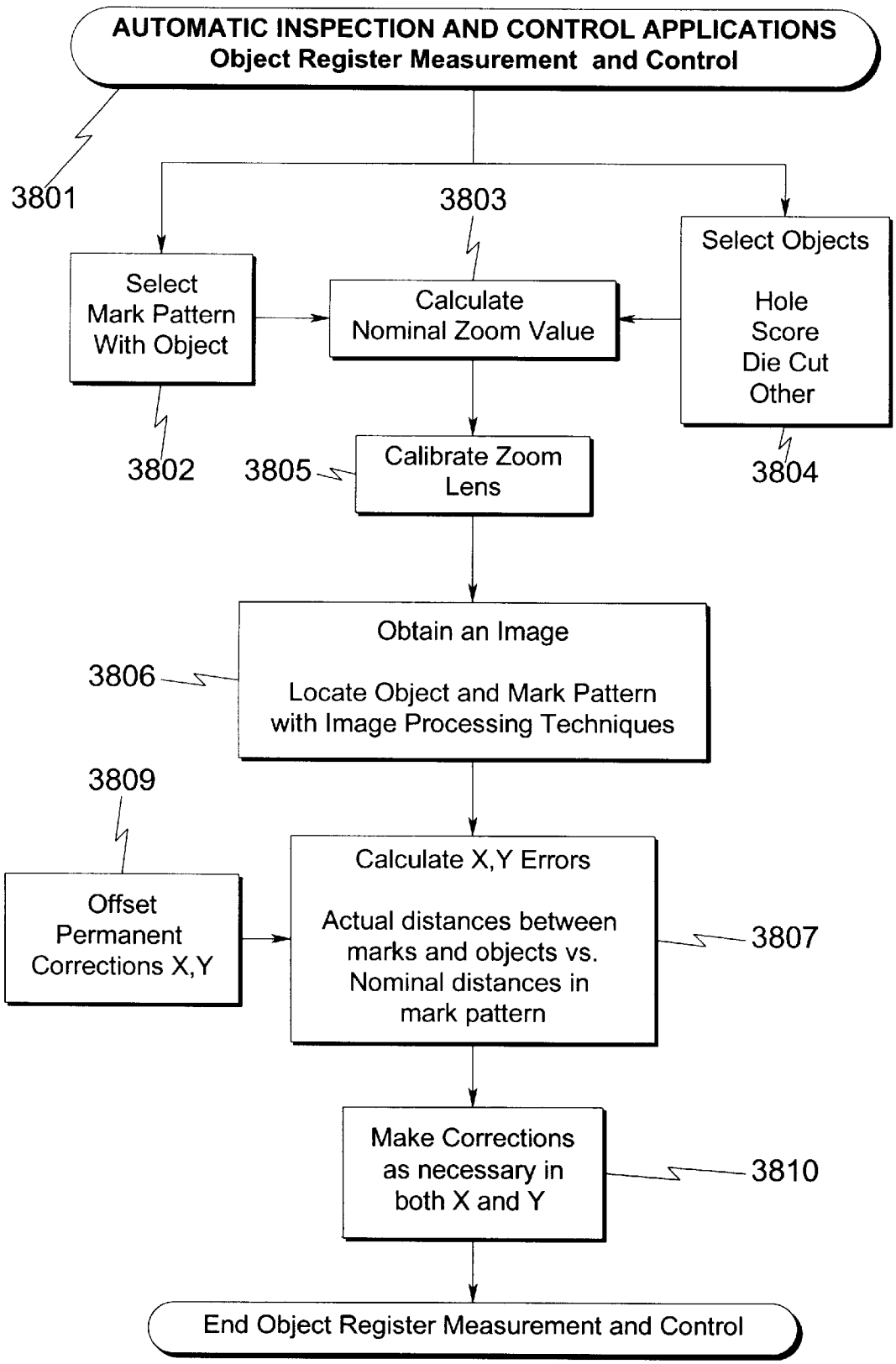
FIG. 38 illustrates a software flowchart for an exemplary object register measurement and control application (referenced as process 3405 in FIG. 34), which provides the capability of aligning arbitrary web objects at a fixed offset to reference marks either on or off the web surface. This capability is very important for non-printing web functions, such as holes, scores, die cuts, adhesive deposition, and other mechanical web functions. However, any object is capable of being registered using the Zoom Calibration method, whether a mechanical web object or a conventional printed object, as the image detection for both is done using signal processing technology in conjunction with the accurate distance/position of the object obtained using the Zoom Calibration method.

FIG. 38 is a flowchart of the method for registering objects to printed marks. The object selected at 3804 is stored in memory as is an appropriate mark pattern 3802 containing this object. The size of the pattern and the object automatically determine the Nominal Zoom Value 3803 used in the calibration of the lens 3805. An image of the mark pattern and the object is obtained at 3806. The object and the marks are located in the image. The actual X, Y dimensions between the marks and the object are compared with the nominal dimensions of the stored mark and object pattern at 3807. The differences are then used to make correction at 3810 to motors that adjust the correction mechanisms in the direction to reduce the differences to zero.

Permanent offset adjustments in either X or Y can be made at 3809 to correct for artwork or printing plate manufacturing errors.

100% Repeat Area Defect Detection

Figure 39:
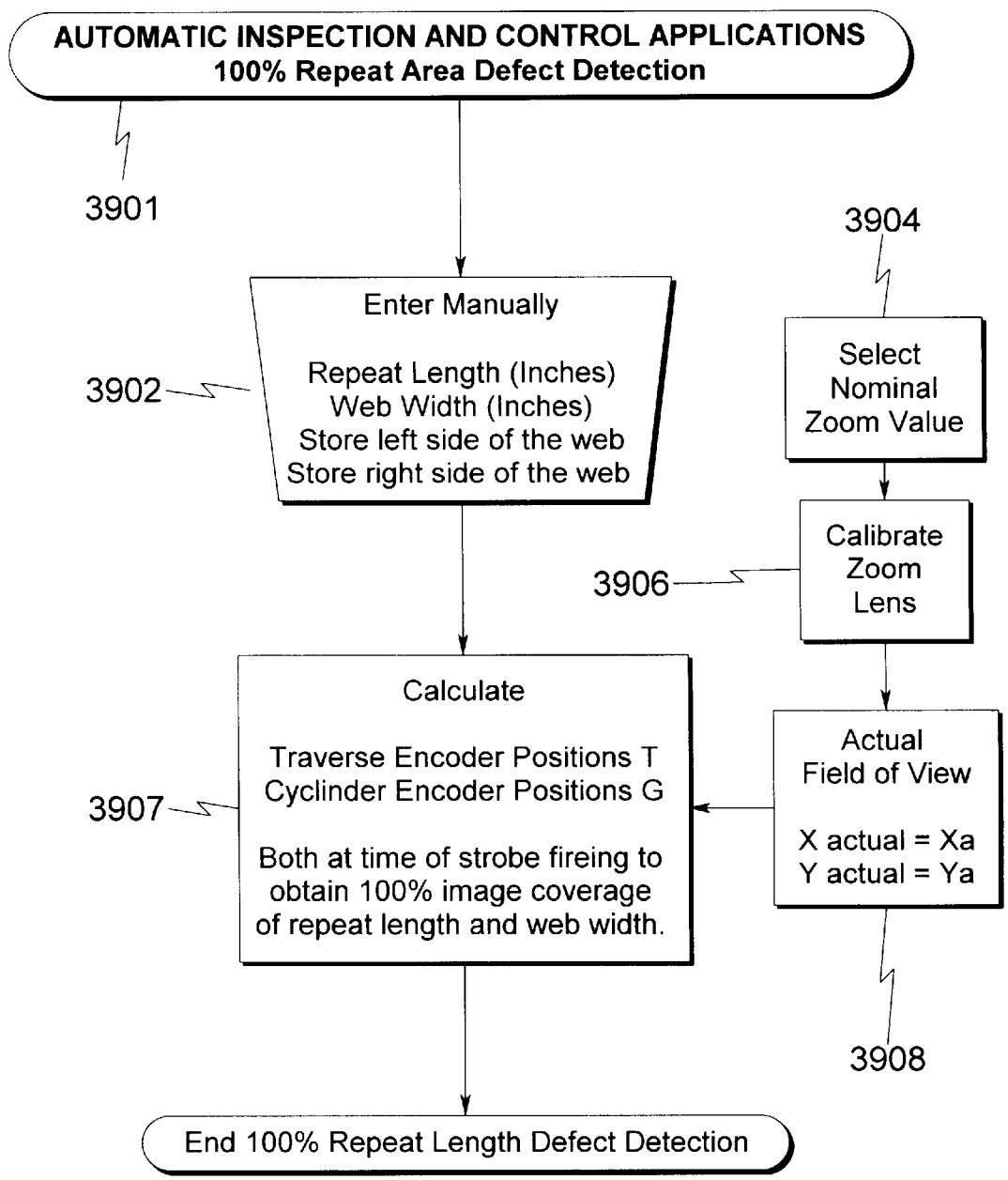
FIG. 39 illustrates a software flowchart for an exemplary 100% repeat area defect detection application (referenced as process 3406 in FIG. 34), which provides the capability of inspecting the entire web surface for defects in web manufacturing. This inspection process may be time-multiplexed with other functions and space multiplexed across the web surface, so as to permit an additional cost savings over conventional fixed-placement camera systems. Additionally, Zoom Calibration permits the field of view used for the inspection process to be continuously variable across the web surface, permitting the defect resolution to change based on the area of the web being inspected.

FIG. 39 is a means using Zoom Calibration to automatically select a number of images that will be equivalent to 100 percent of the repeat area printed by a cylinder width and circumference. This feature enables the automatic calculation of the X traverse encoder positions and the Y cylinder encoder positions where the strobe will be fired and the images obtained for any Nominal Zoom Value and field of view. This enables the image to be inspected for very fine defects when the field of view is small and for very large defects when the field of view is large.

Two methods of entering the required information are shown. In 3902 the repeat length in inches in manually entered into the touch screen. The position of the left edge of the web by manually obtained by taking and centering an image of the left side of the web and taking an image and centering the right side of the web in each instance storing the position.

In both methods, the zoom lens is calibrated 3906 based on the selected Nominal Zoom Value 3904. With a known field of view based on Zoom Calibration of $X_A$, $Y_A$, 3908, the actual edge positions of the web, and repeat length, the coordinates of both encoders can be calculated to obtain images to cover 100% of the repeat image.

Repeat Length Measurement and Control

Figure 40:
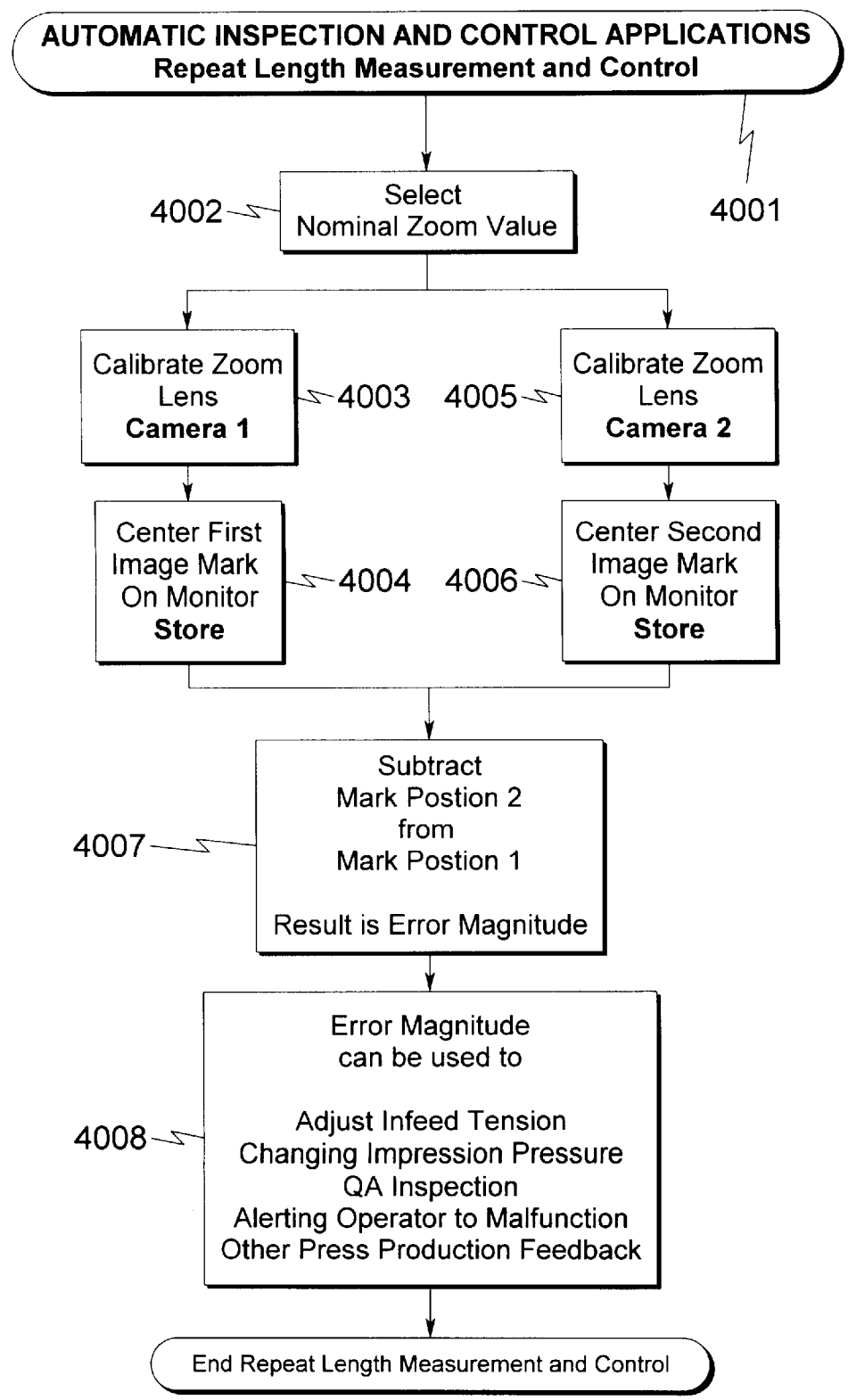
FIG. 40 illustrates a software flowchart for an exemplary web repeat length measurement and control application (referenced as process 3407 in FIG. 34), which provides the capability of accurately determining the repeat length of the web during the web printing process. This permits the true length of the web repeat to be known at all times, permitting adjustment of web print placement as well as dynamic adjustment of web tension controls during manufacturing.

FIG. 40 is a method for automatically measuring the repeat length using two cameras and the method of Zoom Calibration. The Nominal Zoom Values are selected at 4002 and used to calibrate both cameras. The cameras are positioned one repeat length apart in the Y direction. A printed mark repeated every cylinder revolution is centered on the monitor and the positioned stored with the correct repeat length. Thereafter the position of one mark will vary relative to the other and can be measured. This information can be used to change the repeat length by varying the infeed tension control or by changing the impression pressures of the printing cylinder.

Calibrated Visual Inspection

All present videos use a zoom lens with no way to measure absolute web distances. The current prior art limits all distance measurements to relative differentials, with the additional limitation that these measurements be performed only in one dimension. In contrast, the Zoom Calibration method permits absolute distance measurements to be computed on the web and as such permits absolute coordinates of any web feature to be calculated. This permits both relative distance differentials between web components to be calculated, but also permits absolute coordinates of a given web feature to be determined.

There are a number of instances where an operator would like to visually measure a distance between two objects contained within an image. With Zoom Calibration a coordinate measurement gradicle can be added to the image with numbers representing radius of a circle with its center at the center of the image. The operator would first chose the nominal zoom where the two objects would be on the same image with one centered at the center of the image. This zoom position would first be calibrated from the reference plate and the concentric calibrated circles would be overlaid with the image of the two objects. The distance between them can then be read directly from the calibrated circles.

Many types of gradicles could be programmed including a single purpose special template. The present invention envisions that while the particular gradicles would be application-specific, persons skilled in the art would have no difficulty in generating the appropriate gradicle given the accurate calibrated distance coordinates available via the Zoom Calibration method.

CLAIMS

Although a preferred embodiment of the present invention has been illustrated in the accompanying Drawings and described in the foregoing disclosure, it will be understood that the invention is not limited to the embodiments disclosed, but is capable of numerous rearrangements, modifications, and substitutions without departing from the spirit of the invention as set forth and defined by the following claims.

What is claimed is:

1. A Zoom Calibration accurate distance measurement method of using a variable field of view zoom lens having adjustable zoom magnification for accurate distance measurement between measurement objects at any position within said variable field of view, said Zoom Calibration method using reference objects as a measurement calibration standard, wherein said Zoom Calibration method comprises the steps of:

(a) capturing a first measurement image of said measurement objects for which said accurate distance measurement is required using said zoom lens at an initial zoom magnification, said first measurement image further comprising a plethora of measurement pixel values representing said measurement objects in said first measurement image;

(b) performing first measurement image signal processing on said measurement pixel values to determine accurate measurement pixel positions for each of said measurement objects in said first measurement image;

(c) calculating a measurement pixel count as the number of pixels between said measurement pixel positions for said measurement objects in said first measurement image;

(d) capturing a second reference image using said zoom lens without changing said initial zoom magnification of said zoom lens, said second reference image further comprising a plethora of reference pixel values representing said reference objects in said second reference image;

(e) performing second reference image signal processing on said reference pixel values to determine accurate reference pixel positions for each of said reference objects in said second reference image;

(f) calculating a reference pixel count as the number of pixels between said reference pixel positions corresponding to two reference objects that are present within said second reference image, said reference objects having a known reference dimension between them;

(g) calculating the reference distance per pixel from said second reference image reference pixel count; and, (h) using said reference distance per pixel to determine said accurate distance measurement between said measurement objects in said first measurement image by performing a scaling operation on said measurement pixel count using the ratio of said known reference dimension and said reference distance per pixel.

2. The Zoom Calibration accurate distance measurement method of claim 1, wherein said first measurement image contains said first measurement objects arranged orthogonally to the arrangement of said reference objects in said second reference image.

3. The Zoom Calibration accurate distance measurement method of claim 1, wherein said first measurement image contains said first measurement objects arranged parallel to the arrangement of said reference objects in said second reference image.

4. The Zoom Calibration accurate distance measurement method of claim 1, wherein said first measurement image contains said first measurement objects arranged in an orientation different than the arrangement of said reference objects in said second reference image.

5. The Zoom Calibration accurate distance measurement method of claim 1, wherein said first measurement image and said second reference image are coincident, and said first measurement objects are arranged orthogonally to the arrangement of said reference objects in said second reference image.

6. The Zoom Calibration accurate distance measurement method of claim 1, wherein said first measurement image and said second reference image are coincident, and said first measurement objects are arranged parallel to the arrangement of said reference objects in said second reference image.

7. The Zoom Calibration accurate distance measurement method of claim 1, wherein said first measurement image and said second reference image are coincident, and said first measurement objects are arranged in an orientation different than the arrangement of said reference objects in said second reference image.

8. The Zoom Calibration accurate distance measurement method of claim 1, wherein said measurement objects are mechanical or printed objects placed on the surface of a moving web, said mechanical or printed objects observable using backscatter detection of some illuminating radiation source.

9. The Zoom Calibration accurate distance measurement method of claim 8, wherein said illuminating radiation source is synchronized to movements in said measurement objects.

10. The Zoom Calibration accurate distance measurement method of claim 1 in combination with an INITIAL PRESS SETUP AND INITIAL REGISTER web inspection/control function, said web inspection/control function using the Zoom Calibration accurate distance measurement method of claim 1 as an internal sub-function to permit accurate and calibrated distance position measurements to be internally obtained automatically as the said web inspection/control function is performed and not as a result of external manual operator intervention.

11. The Zoom Calibration accurate distance measurement method of claim 1 in combination with a WEB WIDTH MEASUREMENT AND CENTERING CONTROL web inspection/control function, said web inspection/control function using the Zoom Calibration accurate distance measurement method of claim 1 as an internal sub-function to permit accurate and calibrated distance position measurements to be internally obtained automatically as the said web inspection/control function is performed and not as a result of external manual operator intervention.

12. The Zoom Calibration accurate distance measurement method of claim 1 in combination with a BAR CODE VERIFICATION web inspection/control function, said web inspection/control function using the Zoom Calibration accurate distance measurement method of claim 1 as an internal sub-function to permit accurate and calibrated distance position measurements to be internally obtained automatically as the said web inspection/control function is performed and not as a result of external manual operator intervention.

13. The Zoom Calibration accurate distance measurement method of claim 1 in combination with a COLOR REGIS- TER MEASUREMENT web inspection/control function, said web inspection/control function using the Zoom Calibration accurate distance measurement method of claim 1 as an internal sub-function to permit accurate and calibrated distance position measurements to be internally obtained automatically as the said web inspection/control function is performed and not as a result of external manual operator intervention.

14. The Zoom Calibration accurate distance measurement method of claim 1 in combination with a OBJECT REGISTER MEASUREMENT AND CONTROL web inspection/control function, said web inspection/control function using the Zoom Calibration accurate distance measurement method of claim 1 as an internal sub-function to permit accurate and calibrated distance position measurements to be internally obtained automatically as the said web inspection/control function is performed and not as a result of external manual operator intervention.

15. The Zoom Calibration accurate distance measurement method of claim 1 in combination with a 100% REPEAT AREA DEFECT DETECTION web inspection/control function, said web inspection/control function using the Zoom Calibration accurate distance measurement method of claim 1 as an internal sub-function to permit accurate and calibrated distance position measurements to be internally obtained automatically as the said web inspection/control function is performed and not as a result of external manual operator intervention.

16. The Zoom Calibration accurate distance measurement method of claim 1 in combination with a REPEAT LENGTH MEASUREMENT AND CONTROL web inspection/control function, said web inspection/control function using the Zoom Calibration accurate distance measurement method of claim 1 as an internal sub-function to permit accurate and calibrated distance position measurements to be internally obtained automatically as the said web inspection/control function is performed and not as a result of external manual operator intervention.

17. The Zoom Calibration accurate distance measurement method of claim 1 in combination with a LATERAL MEASUREMENT AND CONTROL web inspection/control function, said web inspection/control function using the Zoom Calibration accurate distance measurement method of claim 1 as an internal sub-function to permit accurate and calibrated distance position measurements to be internally obtained automatically as the said web inspection/control function is performed and not as a result of external manual operator intervention.

18. The Zoom Calibration accurate distance measurement method of claim 1 in combination with a CALIBRATED VISUAL INSPECTION web inspection/control function, said web inspection/control function using the Zoom Calibration accurate distance measurement method of claim 1 as an internal sub-function to permit accurate and calibrated distance position measurements to be internally obtained automatically as the said web inspection/control function is performed and not as a result of external manual operator intervention.

19. The Zoom Calibration accurate distance measurement method of claim 1 in multitasking combination with a web inspection/control function task list, said web inspection/control function tasks selected from more than one member of the group consisting of INITIAL PRESS SETUP AND INITIAL REGISTER, WEB WIDTH MEASUREMENT AND CENTERING CONTROL, BAR CODE VERIFICATION, COLOR REGISTER MEASUREMENT, OBJECT REGISTER MEASUREMENT AND CONTROL, 100% REPEAT AREA DEFECT DETECTION, REPEAT LENGTH MEASUREMENT AND CONTROL, LATERAL MEASUREMENT AND CONTROL, or CALIBRATED VISUAL INSPECTION.

20. The Zoom Calibration accurate distance measurement method of claim 1 wherein said reference objects which have a known dimension between them are included within said first measurement image.

21. The Zoom Calibration accurate distance measurement method of claim 1 wherein said reference pixel count and said measurement pixel count are in different spatial dimensions.

22. A Zoom Calibration accurate distance measurement system implementing the Zoom Calibration accurate distance measurement method of claim 1, wherein said Zoom Calibration accurate distance measurement system comprises:
   (a) means for capturing said first measurement image;
   (b) means for first measurement positioning said first measurement image capturing means;
   (c) means for first measurement encoding the position of said first measurement positioning means;
   (d) means for performing said first measurement image signal processing on said measurement pixel values;
   (e) means for calculating said measurement pixel count;
   (f) means for capturing said second reference image;
   (g) means for second reference positioning said second reference image capturing means;
   (h) means for second reference encoding the position of said second reference positioning means;
   (i) means for performing said second reference image signal processing on said reference pixel values;
   (j) means for calculating said reference pixel count;
   (k) means for calculating said reference distance per pixel;
   (l) means for performing said scaling operation to calculate said accurate distance measurement; and,
   (m) wherein said accurate distance measurement of claim 1 is used to accurately determine the position of said first image capturing means and thus accurately determine the coordinate position of said first measurement image.

23. The Zoom Calibration system of claim 22, wherein said means for capturing said first measurement image and said second reference image is a variable field of view zoom camera.

24. The Zoom Calibration system of claim 22, wherein said means for capturing said first measurement image and said second reference image is a mechanically linked pair of variable field of view zoom cameras.

25. The Zoom Calibration system of claim 22, wherein said means for capturing said first measurement image and said second reference image contains a stroboscopic flash synchronized in time to movement of said measurement objects.

26. The Zoom Calibration system of claim 22, wherein said means for performing said first measurement image signal processing and said means for performing said second reference image signal processing include image signal processing edge detection algorithms.

27. A Zoom Calibration absolute coordinate measurement method of using a variable field of view zoom lens having adjustable zoom magnification and adjustable zoom lens traverse position, said measurement method permitting the calculation of absolute (X,Y) coordinate positions of measurement objects within any said variable field of view over the range of said traverse position, said measurement method utilizing reference objects as a measurement calibration standard, wherein said Zoom Calibration absolute coordinate measurement method comprises the steps of:

(a) obtaining the lateral X coarse absolute X coordinate offset by
  (1) obtaining value T corresponding to a traverse counter reading that relates to the X coordinate of said measurement object;
  (2) obtaining value H corresponding to the number of said traverse counter readings per inch; and,
  (3) calculating the lateral X coarse absolute X coordinate offset by dividing said value T by said value H;

(b) obtaining the circumferential Y coarse absolute Y coordinate offset by
  (1) obtaining value G corresponding to a cylinder counter reading that relates to the Y coordinate of said measurement object;
  (2) obtaining value E corresponding to the number of said cylinder counter readings per repeat length;
  (3) obtaining value R corresponding to the repeat length of said cylinder in inches; and,
  (4) calculating the circumferential Y coarse absolute Y coordinate offset by multiplying said value G by the ratio of said value R and said value E;

(c) relating, if necessary, said X-coordinate position to said Y-coordinate position by:
  (1) scaling said Y-coordinate position by the aspect ratio of said variable field of view lens if the X-coordinate position is known; and,
  (2) scaling said X-coordinate position by the aspect ratio of said variable field of view lens if the Y-coordinate position is known;

(d) selecting and identifying said measurement objects as the web object or mark pattern for which said absolute coordinate positions are to be determined;

(e) calculating a nominal zoom value for said variable field of view zoom lens;

(f) locating and centering said measurement objects within said variable field of view zoom lens;

(g) capturing a first measurement image of said measurement objects for which said absolute coordinate position is required using said zoom lens at an initial zoom magnification, said first measurement image further comprising a plethora of measurement pixel values representing said measurement objects in said first measurement image;

(h) performing first measurement image signal processing on said measurement pixel values to determine accurate measurement pixel positions for each of said measurement objects in said first measurement image;

(i) capturing a second reference image using said zoom lens without changing said initial zoom magnification of said zoom lens, said second reference image further comprising a plethora of reference pixel values representing said reference objects in said second reference image;

(j) performing second reference image signal processing on said reference pixel values to determine accurate reference pixel positions for each of said reference objects in said second reference image;

(k) making a determination if said reference objects are components of or proximal to said measurement objects, said reference objects normally being within the image capture range of said variable field of view lens if said reference objects are components of or proximal to said measurement objects, said determination resulting in:
  (1) use of said reference objects which are within said variable field of view to
    (A) measure and record said cylinder counts between said proximal measurement objects and save as X-coordinate value XC or Y-coordinate value YC;
    (B) calculate the X-coordinate pixel distance value XP by dividing the distance between said measurement objects by said XC value; and,
    (C) calculate the Y-coordinate pixel distance value YP by dividing the distance between said measurement objects by said YC value; and,
  (2) use of said reference objects which are not within said variable field of view to
    (A) position said adjustable zoom lens traverse over said reference objects;
    (B) measure and record said cylinder counts between said proximal reference objects and save as X-coordinate value XC or Y-coordinate value YC;
    (C) calculate the X-coordinate pixel distance value XP by dividing the distance between said reference objects by said XC value; and,
    (D) calculate the Y-coordinate pixel distance value YP by dividing the distance between said reference objects by said YC value;

(1) converting said (X,Y) coordinate pixel distances to inches by multiplying each said X value by said XP value and each said Y value by said YP value;

(m) calculating said absolute coordinate positions for the X-dimension by summing the quotient of said T value divided by said H value and the product of said X value and said XP value; and, (n) calculating said absolute coordinate positions for the Y-dimension by summing the product of said G value multiplied by the quotient of said R value divided by said E value and the product of said Y value and said YP value.

28. The Zoom Calibration absolute coordinate measurement method of claim 27, wherein said first measurement image contains said first measurement objects arranged orthogonally to the arrangement of said reference objects in said second reference image.

29. The Zoom Calibration absolute coordinate measurement method of claim 27, wherein said first measurement image contains said first measurement objects arranged parallel to the arrangement of said reference objects in said second reference image.

30. The Zoom Calibration absolute coordinate measurement method of claim 27, wherein said first measurement image contains said first measurement objects arranged in an orientation different than the arrangement of said reference objects in said second reference image.

31. The Zoom Calibration absolute coordinate measurement method of claim 27, wherein said first measurement image and said second reference image are coincident, and said first measurement objects are arranged orthogonally to the arrangement of said reference objects in said second reference image.

32. The Zoom Calibration absolute coordinate measurement method of claim 27, wherein said first measurement image and said second reference image are coincident, and said first measurement objects are arranged parallel to the arrangement of said reference objects in said second reference image.

33. The Zoom Calibration absolute coordinate measurement method of claim 27, wherein said first measurement image and said second reference image are coincident, and said first measurement objects are arranged in an orientation different than the arrangement of said reference objects in said second reference image.

34. The Zoom Calibration absolute coordinate measurement method of claim 27, wherein said measurement objects are mechanical or printed objects placed on the surface of a moving web, said mechanical or printed objects observable using backscatter detection of some illuminating radiation source.

35. The Zoom Calibration absolute coordinate measurement method of claim 34, wherein said illuminating radiation source is synchronized to movements in said measurement objects.

36. The Zoom Calibration absolute coordinate measurement method of claim 27 in combination with an INITIAL PRESS SETUP AND INITIAL REGISTER web inspection/control function, said web inspection/control function using the Zoom Calibration absolute coordinate measurement method of claim 27 as an internal sub-function to permit accurate and calibrated distance position measurements to be internally obtained automatically as the said web inspection/control function is performed and not as a result of external manual operator intervention.

37. The Zoom Calibration absolute coordinate measurement method of claim 27 in combination with a WEB WIDTH MEASUREMENT AND CENTERING CONTROL web inspection/control function, said web inspection/control function using the Zoom Calibration absolute coordinate measurement method of claim 27 as an internal sub-function to permit accurate and calibrated distance position measurements to be internally obtained automatically as the said web inspection/control function is performed and not as a result of external manual operator intervention.

38. The Zoom Calibration absolute coordinate measurement method of claim 27 in combination with a BAR CODE VERIFICATION web inspection/control function, said web inspection/control function using the Zoom Calibration absolute coordinate measurement method of claim 27 as an internal sub-function to permit accurate and calibrated distance position measurements to be internally obtained automatically as the said web inspection/control function is performed and not as a result of external manual operator intervention.

39. The Zoom Calibration absolute coordinate measurement method of claim 27 in combination with a COLOR REGISTER MEASUREMENT web inspection/control function, said web inspection/control function using the Zoom Calibration absolute coordinate measurement method of claim 27 as an internal sub-function to permit accurate and calibrated distance position measurements to be internally obtained automatically as the said web inspection/control function is performed and not as a result of external manual operator intervention.

40. The Zoom Calibration absolute coordinate measurement method of claim 27 in combination with a OBJECT REGISTER MEASUREMENT AND CONTROL web inspection/control function, said web inspection/control function using the Zoom Calibration absolute coordinate measurement method of claim 27 as an internal sub-function to permit accurate and calibrated distance position measurements to be internally obtained automatically as the said web inspection/control function is performed and not as a result of external manual operator intervention.

41. The Zoom Calibration absolute coordinate measurement method of claim 27 in combination with a 100 % REPEAT AREA DEFECT DETECTION web inspection/control function, said web inspection/control function using the Zoom Calibration absolute coordinate measurement method of claim 27 as an internal sub-function to permit accurate and calibrated distance position measurements to be internally obtained automatically as the said web inspection/control function is performed and not as a result of external manual operator intervention.

42. The Zoom Calibration absolute coordinate measurement method of claim 27 in combination with a REPEAT LENGTH MEASUREMENT AND CONTROL web inspection/control function, said web inspection/control function using the Zoom Calibration absolute coordinate measurement method of claim 27 as an internal sub-function to permit accurate and calibrated distance position measurements to be internally obtained automatically as the said web inspection/control function is performed and not as a result of external manual operator intervention.

43. The Zoom Calibration absolute coordinate measurement method of claim 27 in combination with a LATERAL MEASUREMENT AND CONTROL web inspection/control function, said web inspection/control function using the Zoom Calibration absolute coordinate measurement method of claim 27 as an internal sub-function to permit accurate and calibrated distance position measurements to be internally obtained automatically as the said web inspection/control function is performed and not as a result of external manual operator intervention.

44. The Zoom Calibration absolute coordinate measurement method of claim 27 in combination with a CALIBRATED VISUAL INSPECTION web inspection/control function, said web inspection/control function using the Zoom Calibration absolute coordinate measurement method of claim 27 as an internal sub-function to permit accurate and calibrated distance position measurements to be internally obtained automatically as the said web inspection/control function is performed and not as a result of external manual operator intervention.

45. The Zoom Calibration absolute coordinate measurement method of claim 27 in multitasking combination with a web inspection/control function task list, said web inspection/control function tasks selected from more than one member of the group consisting of INITIAL PRESS SETUP AND INITIAL REGISTER, WEB WIDTH MEASUREMENT AND CENTERING CONTROL, BAR CODE VERIFICATION, COLOR REGISTER MEASUREMENT, OBJECT REGISTER MEASUREMENT AND CONTROL, 100% REPEAT AREA DEFECT DETECTION, REPEAT LENGTH MEASUREMENT AND CONTROL, LATERAL MEASUREMENT AND CONTROL, or CALIBRATED VISUAL INSPECTION.

46. The Zoom Calibration absolute coordinate measurement method of claim 27 wherein said reference objects which have a known dimension between them are included within said first measurement image.

47. The Zoom Calibration absolute coordinate measurement method of claim 27 wherein said reference objects provide a known reference distance in the X-dimension which is used by said method to calculate said absolute X coordinate position of said measurement objects.

48. The Zoom Calibration absolute coordinate measurement method of claim 27 wherein said reference objects provide a known reference distance in the Y-dimension which is used by said method to calculate said absolute Y coordinate position of said measurement objects.

49. The Zoom Calibration absolute coordinate measurement method of claim 27 wherein said reference objects provide a known reference distance in the X-dimension which is used by said method to calculate said absolute Y coordinate position of said measurement objects.

50. The Zoom Calibration absolute coordinate measurement method of claim 27 wherein said reference objects provide a known reference distance in the Y-dimension which is used by said method to calculate said absolute X coordinate position of said measurement objects.

51. A Zoom Calibration absolute coordinate measurement system implementing the Zoom Calibration absolute coordinate measurement method of claim 27, wherein said Zoom Calibration absolute coordinate measurement system comprises:
   (a) means for capturing said first measurement image;
   (b) means for first measurement positioning said first measurement image capturing means;
   (c) means for first measurement encoding the position of said first measurement positioning means;
   (d) means for performing said first measurement image signal processing on said measurement pixel values;
   (e) means for calculating said (X,Y) pixel distance values;
   (f) means for capturing said second reference image;
   (g) means for second reference positioning said second reference image capturing means;
   (h) means for second reference encoding the position of said second reference positioning means;
   (i) means for performing said second reference image signal processing on said reference pixel values;
   (j) means for calculating said distance between said reference objects;
   (k) wherein said absolute coordinate measurement of claim 27 is used to accurately determine the absolute coordinate position of said first image capturing means and thus accurately determine the coordinate position of said first measurement image.

52. The Zoom Calibration system of claim 51, wherein said means for capturing said first measurement image and said second reference image is a variable field of view zoom camera.

53. The Zoom Calibration system of claim 51, wherein said means for capturing said first measurement image and said second reference image is a mechanically linked pair of variable field of view zoom cameras.

54. The Zoom Calibration system of claim 51, wherein said means for capturing said first measurement image and said second reference image contains a stroboscopic flash synchronized in time to movement of said measurement objects.

55. The Zoom Calibration system of claim 51, wherein said means for performing said first measurement image signal processing and said means for performing said second reference image signal processing include image signal processing edge detection algorithms.

* * * * *